United States Patent
Jones et al.

(10) Patent No.: US 8,977,230 B2
(45) Date of Patent: Mar. 10, 2015

(54) INTERACTIVE PERSONAL SURVEILLANCE AND SECURITY (IPSS) SYSTEMS AND METHODS

(71) Applicants: Martin Kelly Jones, Vancouver (CA); Scott Andrew Horstemeyer, Atlanta, GA (US)

(72) Inventors: Martin Kelly Jones, Vancouver (CA); Scott Andrew Horstemeyer, Atlanta, GA (US)

(*) Notice: Subject to any disclaimer, the term of this patent is extended or adjusted under 35 U.S.C. 154(b) by 0 days.

(21) Appl. No.: 14/246,469

(22) Filed: Apr. 7, 2014

(65) Prior Publication Data
US 2014/0235195 A1    Aug. 21, 2014

Related U.S. Application Data

(60) Division of application No. 14/049,527, filed on Oct. 9, 2013, now Pat. No. 8,737,951, which is a continuation-in-part of application No. 12/354,927, filed on Jan. 16, 2009, now Pat. No. 8,559,914, application No. 14/246,469, which is a continuation-in-part of application No. 13/935,672, filed on Jul. 5, 2013, application No. 14/246,469, which is a continuation-in-part of application No. PCT/US2013/056753, filed on Aug. 27, 2013.

(60) Provisional application No. 61/021,447, filed on Jan. 16, 2008, provisional application No. 61/694,981, filed on Aug. 30, 2012, provisional application No. 61/695,001, filed on Aug. 30, 2012, provisional application No. 61/695,044, filed on Aug. 30, 2012, provisional application No. 61/843,077, filed on Jul. 5, 2013.

(51) Int. Cl.
H04M 9/00 (2006.01)
H04W 4/22 (2009.01)
G08B 13/196 (2006.01)
G08B 25/08 (2006.01)
H04M 11/04 (2006.01)
H04M 1/725 (2006.01)

(52) U.S. Cl.
CPC ............... *H04W 4/22* (2013.01); *G08B 13/196* (2013.01); *G08B 25/08* (2013.01); *H04M 11/04* (2013.01); *H04M 1/72536* (2013.01)
USPC .................. 455/404.2; 455/404.1; 455/414.1; 455/456.3; 340/540; 340/573.1; 340/539.11; 340/988

(58) Field of Classification Search
CPC ...................................................... H04W 4/22
USPC ................. 455/404.1, 404.2, 456.3; 340/540, 340/573.1, 539.11, 988
See application file for complete search history.

(56) References Cited

U.S. PATENT DOCUMENTS 6,522,265 B1    2/2003   Hillman et al.
7,499,797 B2    3/2009   Mok (Continued)

*Primary Examiner* — Amancio Gonzalez
(74) *Attorney, Agent, or Firm* — Thomas | Horstemeyer, LLC

(57) ABSTRACT

Embodiments relating to an interactive personal surveillance and security (IPSS) system are provided for one or more users carrying one or more respective wireless personal communication devices (WCDs) that are capable of capturing and sending surveillance information (e.g., video, images, audio, sensor data, etc.) to one or more remotely located servers (RLSs). From the information, the RLSs can identify and secure dangerous environments, encounters, etc., and log events or take other actions. In some embodiments, the RLS is designed to follow user-definable parameters that establish the level or type of interactivity and that determine when alarms or messages to third parties are needed.

21 Claims, 41 Drawing Sheets

(56) References Cited

U.S. PATENT DOCUMENTS

| | | |
|---|---|---|
| 2002/0070856 A1 | 6/2002 | Wolfe |
| 2002/0072348 A1 | 6/2002 | Wheeler et al. |
| 2004/0155781 A1 | 8/2004 | DeOme |
| 2005/0075116 A1 * | 4/2005 | Laird et al. ................ 455/456.3 |
| 2007/0293186 A1 | 12/2007 | Lehmann |
| 2009/0181640 A1 | 7/2009 | Jones |
| 2009/0191839 A1 | 7/2009 | Cannon, Jr. |
| 2009/0215426 A1 | 8/2009 | Dimsdale |
| 2010/0156788 A1 | 6/2010 | Nakaoka |
| 2011/0130112 A1 | 6/2011 | Saigh et al. |
| 2011/0227788 A1 | 9/2011 | Lundgren et al. |

\* cited by examiner

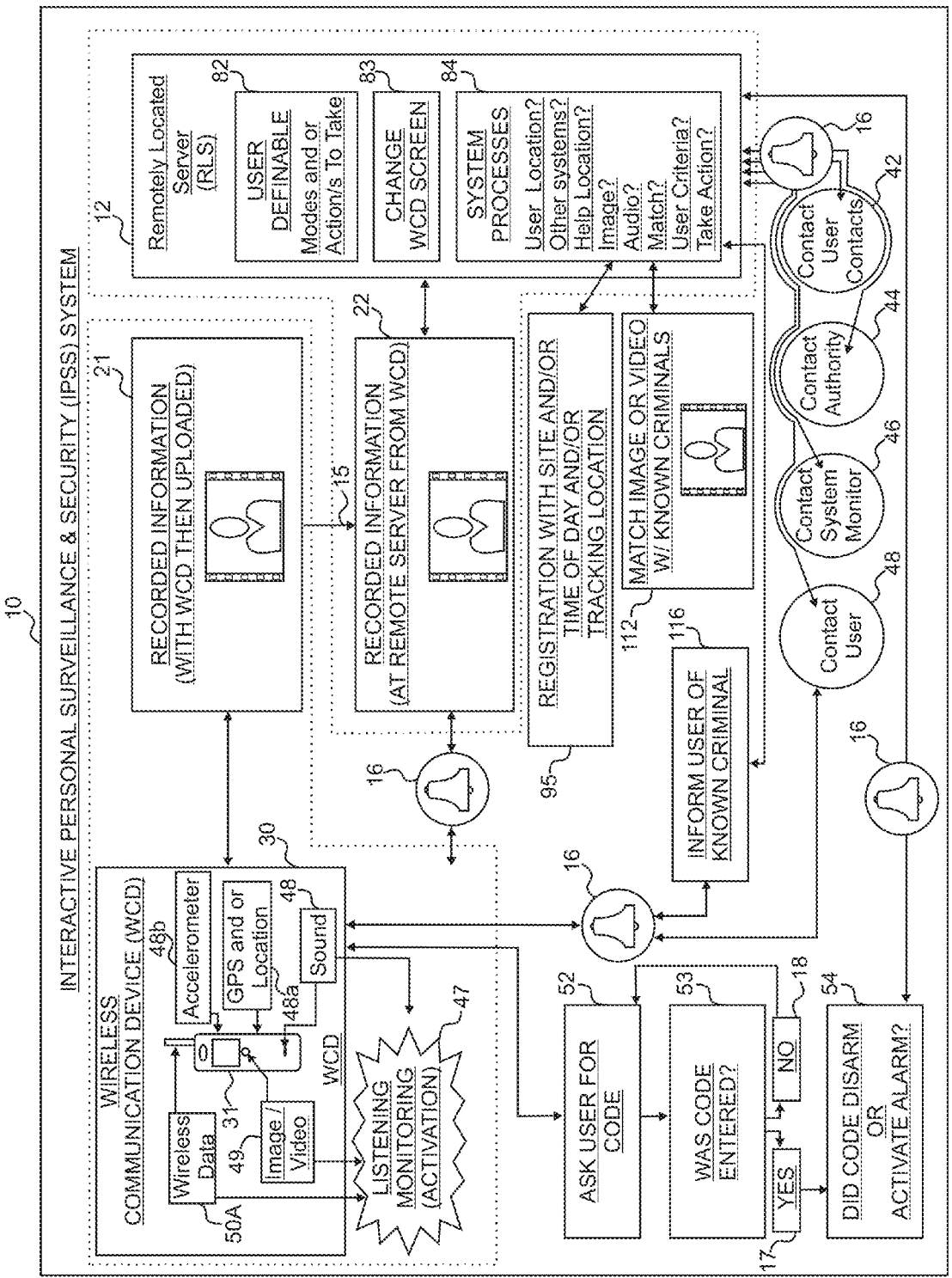

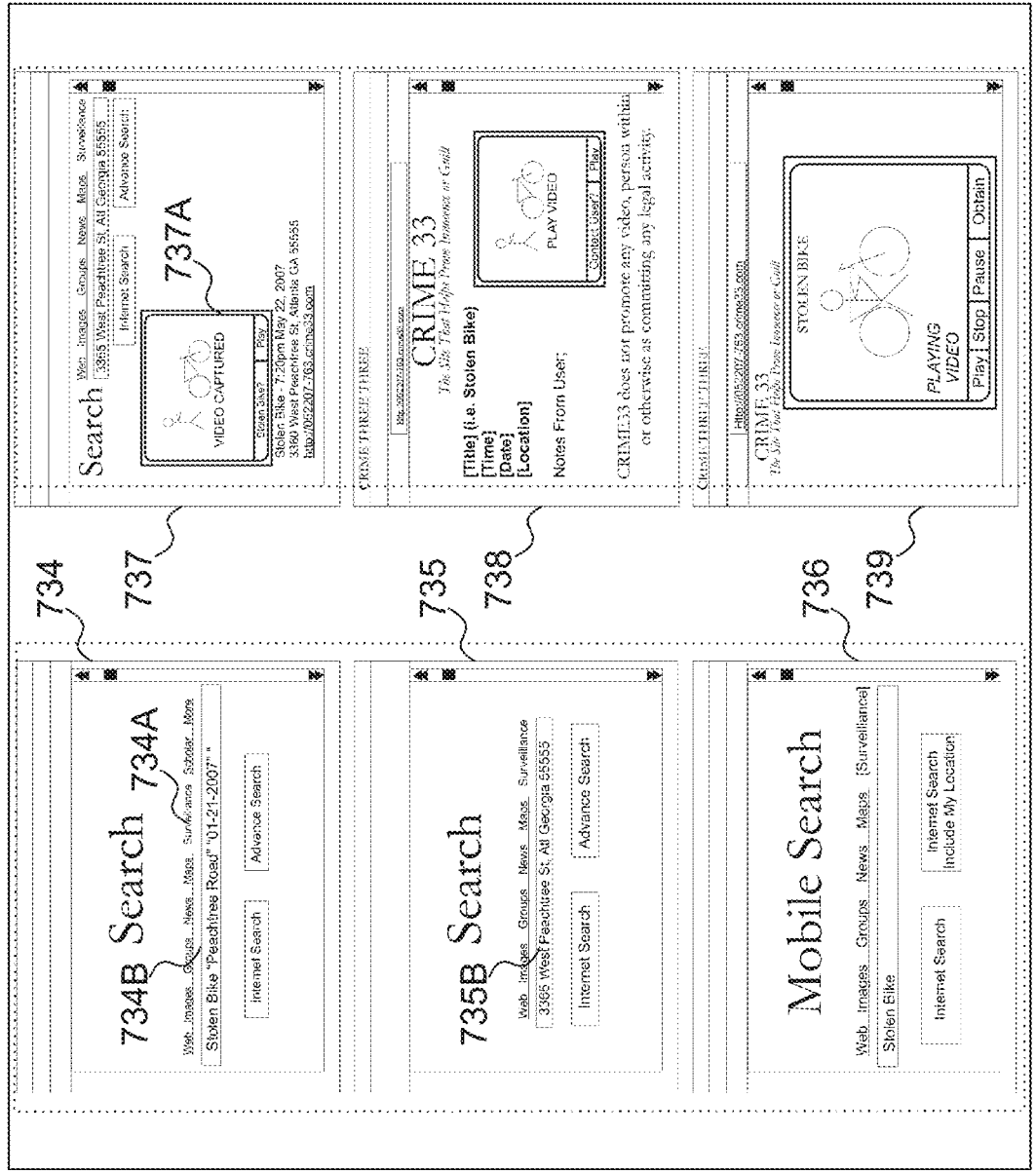

WCD Screens
740

741 TRANSIT TO/FROM WORK
742 TRAVELING (HOTEL)
743 TRAVELING (IN TRANSIT)
744 WEEKENDS (Days)
745 EVENINGS (Not Home)
746 WORK LUNCH
747 NIGHTS AT HOME

M T W T F S S
X X X X X

For Calender Click Here

Enter Time Period/s
Each Day Different? Y N

Start Stop   Start Stop
6:50AM 8:00AM  6:50AM 8:00AM
Add Time Periods Click Here 748 Define By Location? Y N
Map Click Here    High Crime Matching?

FIG 18

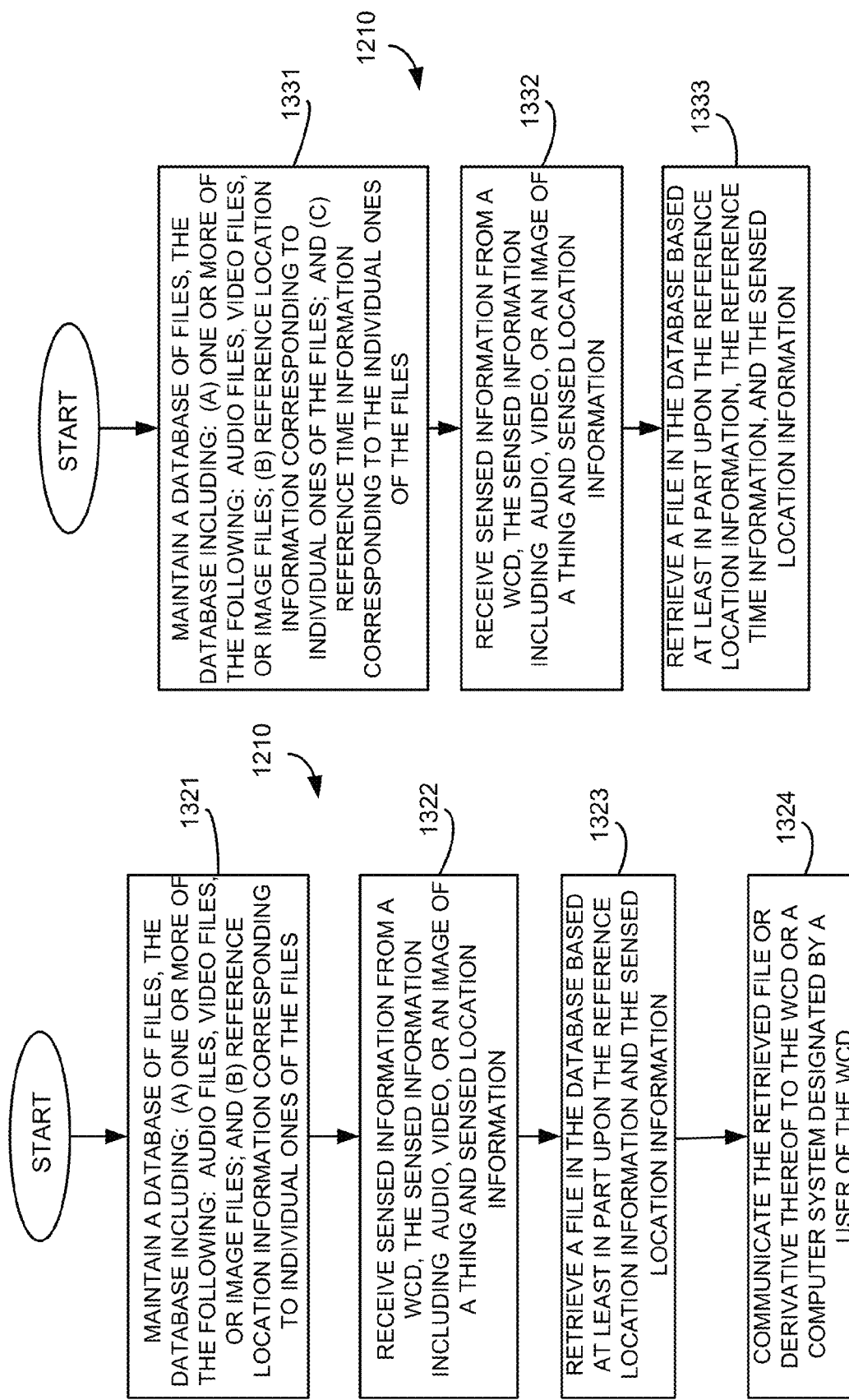

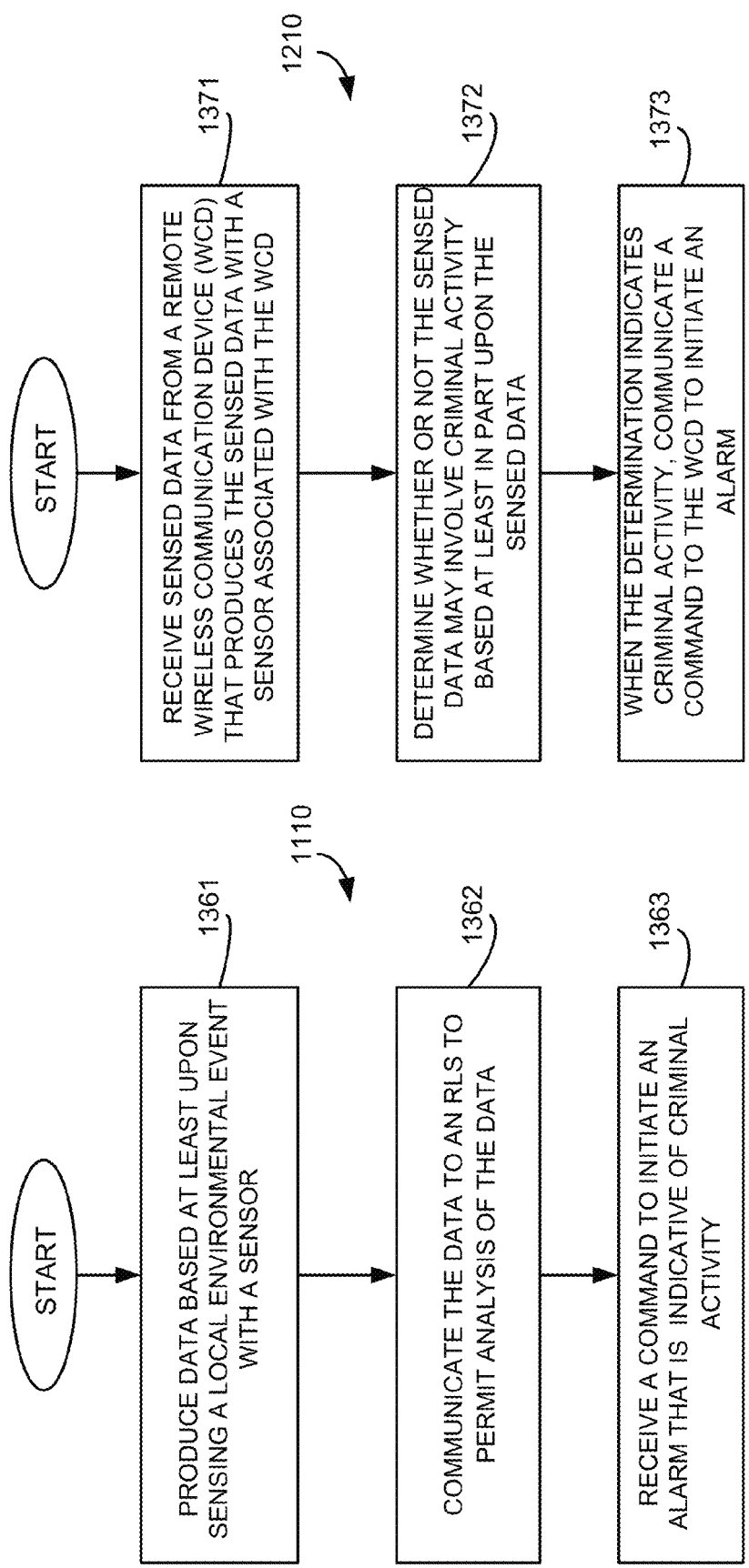

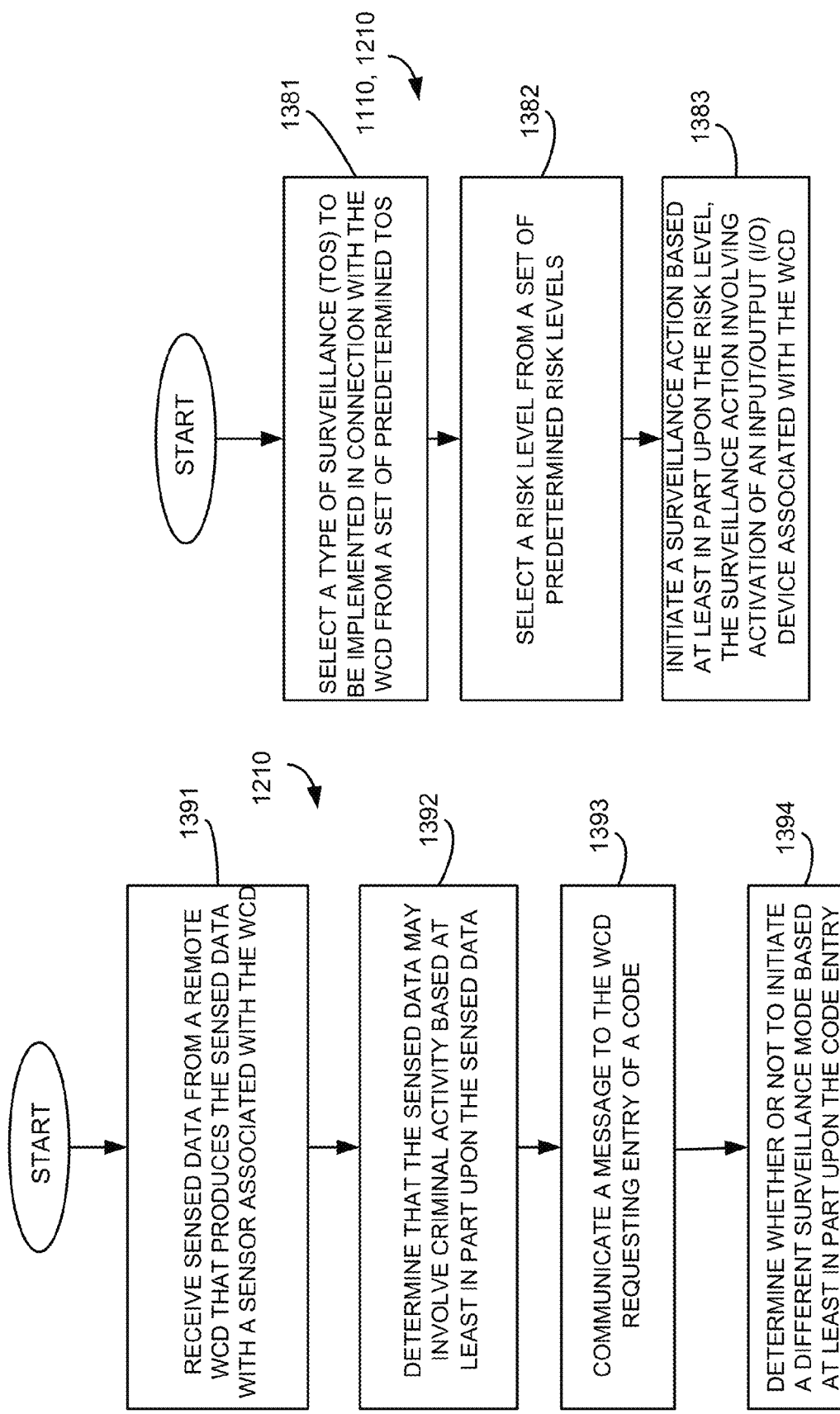

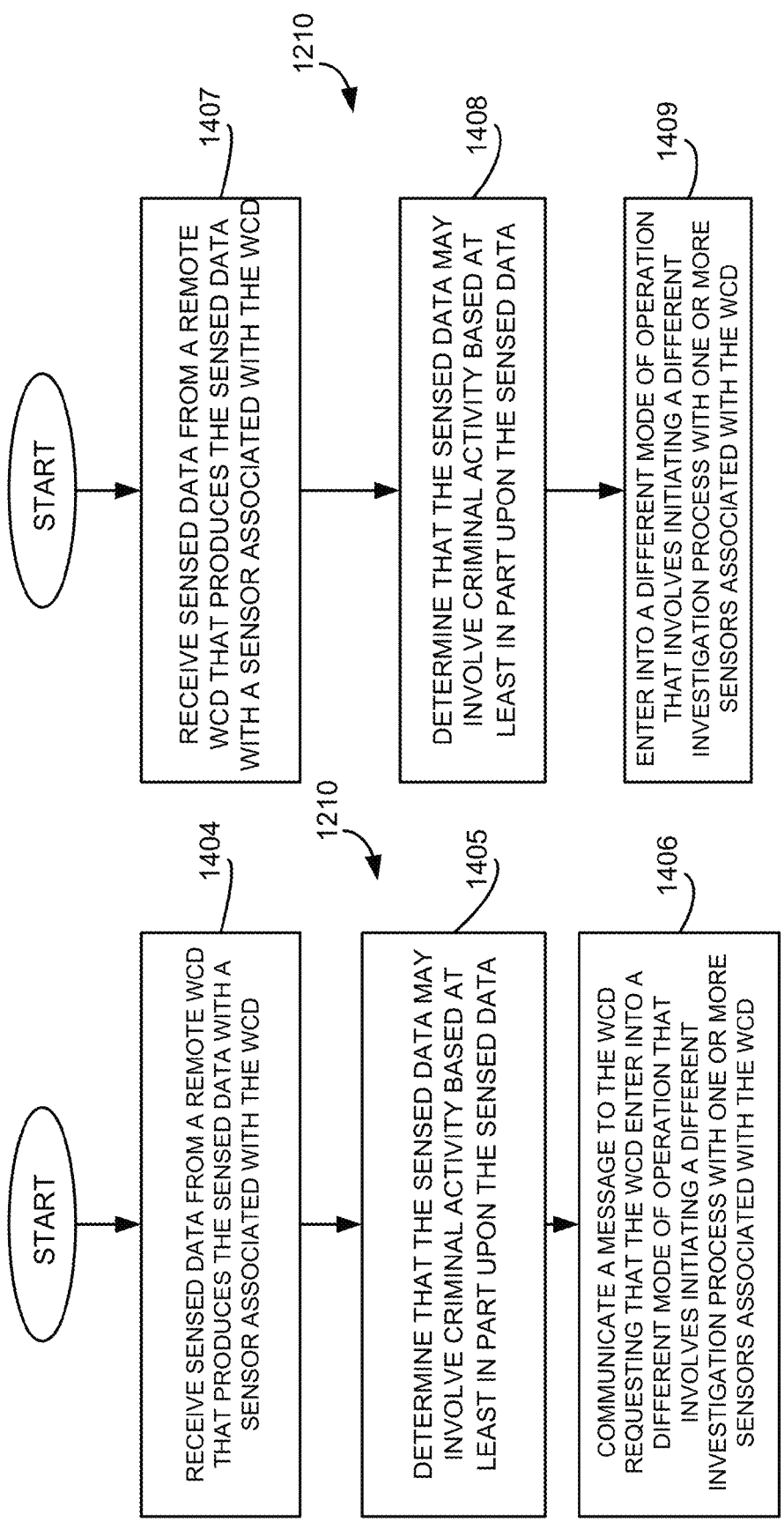

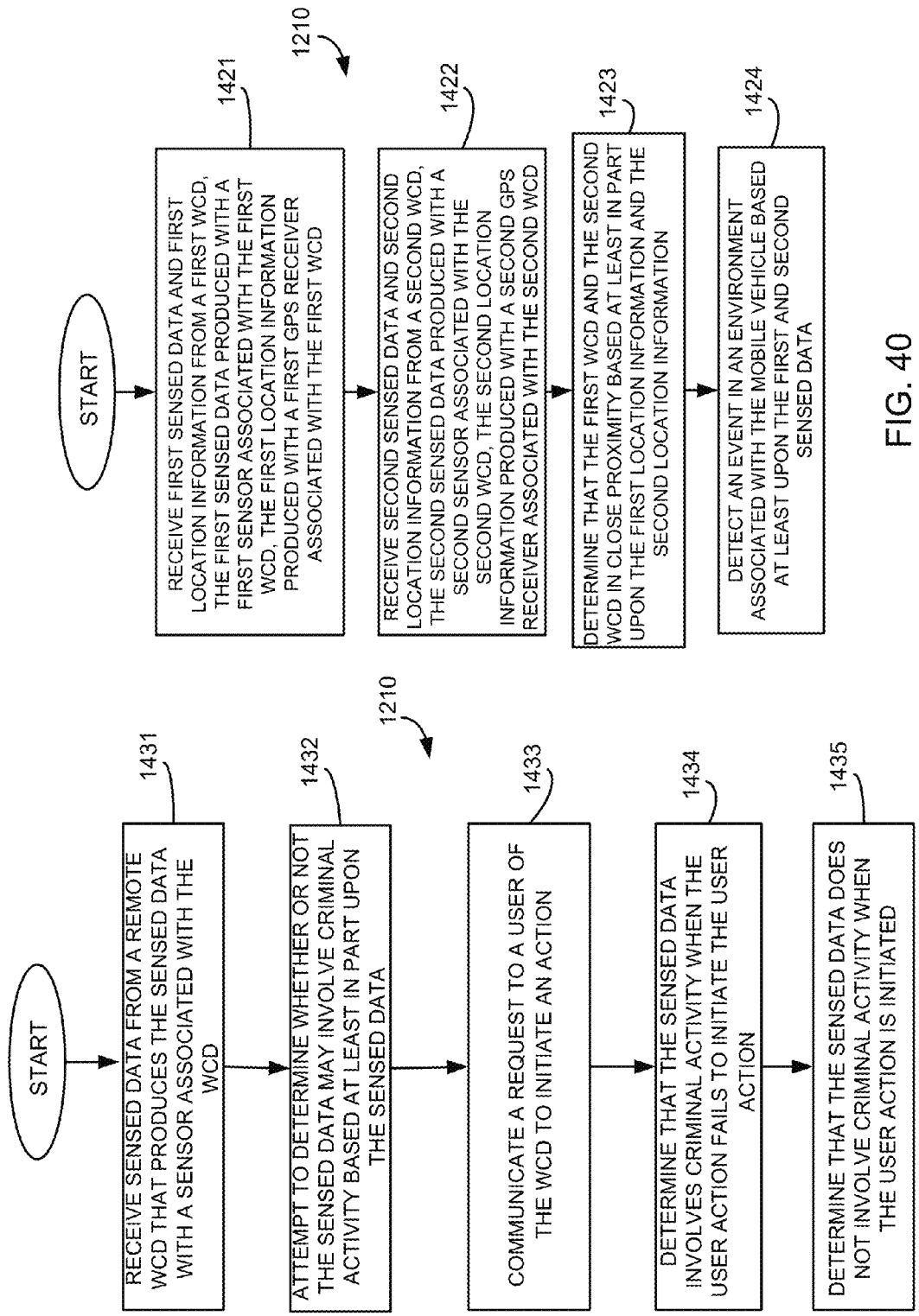

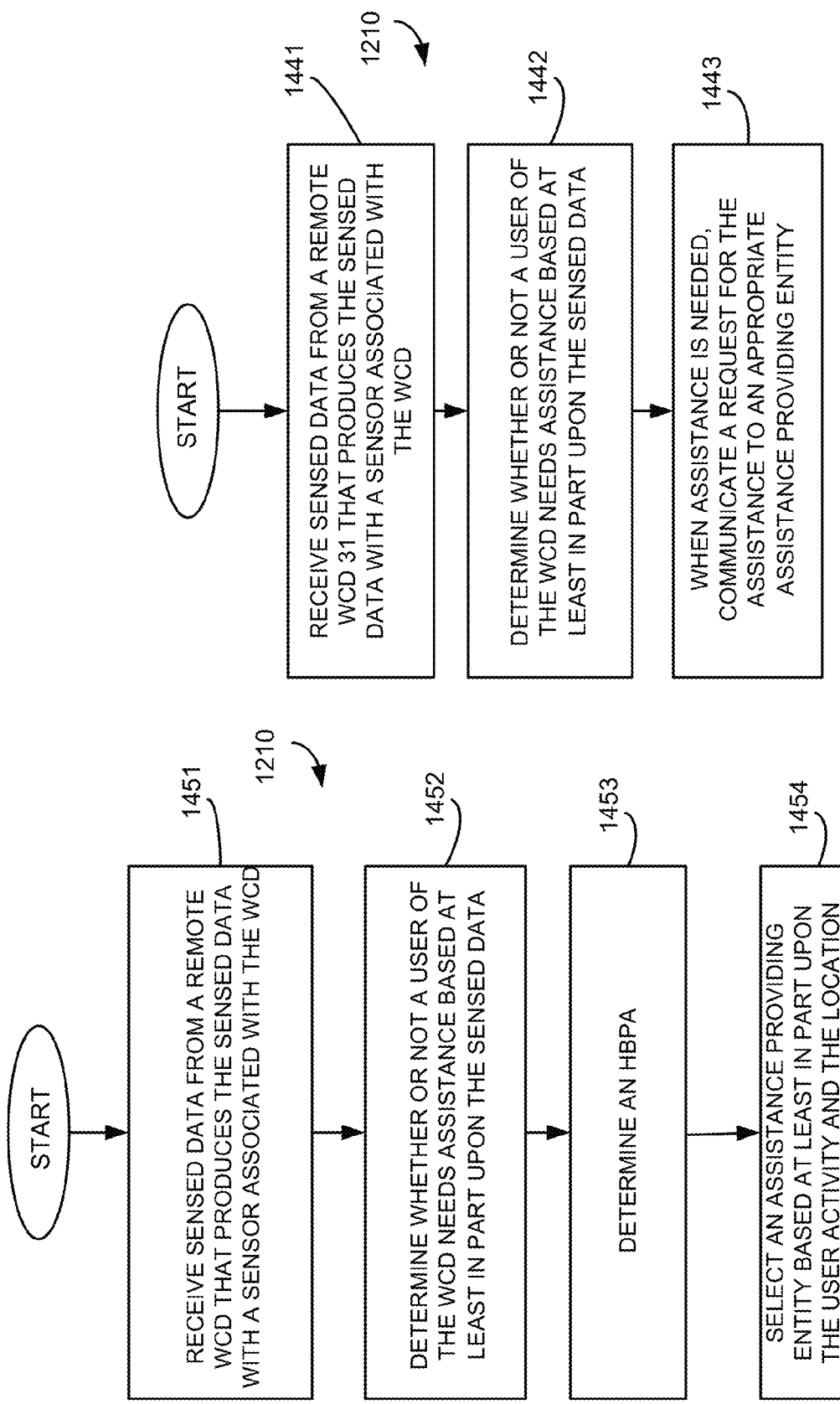

INTERACTIVE PERSONAL SURVEILLANCE AND SECURITY (IPSS) SYSTEMS AND METHODS

CLAIM OF PRIORITY

This application a divisional application of U.S. application Ser.No. 14/049,527, filed Oct. 9, 2013, now U.S. Pat. No. 8,737,951, which is a continuation-in-part (CIP) of U.S. application Ser. No. 12/354,927, filed on Jan. 16, 2009, now U.S. Pat. No. 8,559,914, which claims the benefit of U.S. provisional application No. 61/021,447, filed Jan. 16, 2008, all of the foregoing of which are entirely incorporated herein by reference.

This application is a CIP of U.S. application Ser. No. 13/935,672, filed Jul. 5, 2013, which is incorporated here by reference in its entirety. The foregoing application Ser. No. 13/935,672 claims priority to and the benefit of the following applications, all of which are incorporated by reference herein in their entireties: U.S. provisional application No. 61/694,981, filed Aug. 30, 3012, U.S. provisional application No. 61/695,001, filed Aug. 30, 3012, U.S. provisional application No. 61/695,044, filed Aug. 30, 2012, and U.S. provisional application No. 61/843,077, filed Jul. 5, 2013.

This application is a CIP of international application no. PCT/US13/56753, filed Aug. 27, 2013, which is incorporated here by reference in its entirety.

FIELD OF THE INVENTION

The present invention relates to surveillance, security, and messaging systems and, more particularly, to an interactive personal surveillance and security (IPSS) system that is situated in a wireless communication device (WCD), for example but not limited to, a cellular telephone, a smartphone, a tablet with wireless communication capabilities, etc., and that is capable of monitoring a user's human body physical activity (HBPA) and controlling modes of operation and surveillance information capture to help safeguard and protect the user. The HBPA may be, for example but not limited to, (a) the user travel method (e.g., car, bus, motorcycle, bike, snow skiing, skate boarding, bicycling, water vessel, airplane, train, swimming, etc.) and/or (b) the user motion (walking, running, climbing, falling, standing, laying down, bicycle peddling, swim strokes, etc.).

BACKGROUND OF THE INVENTION

Stationary surveillance systems capture information for protecting, among other things, buildings, homes, business operations, and individuals. In general, they are limited to protecting such things in predefined geographical areas.

SUMMARY OF THE INVENTION

The present invention provides, among other things, an interactive personal surveillance and security (IPSS) system designed to protect a user of carrying a portable wireless communication device (WCD). There are many situations when an individual, carrying a portable WCD, would benefit from an IPSS system which utilizes some, if not all, of the same hardware that the individual already has with him/her. Many individuals would benefit from the IPSS system that acted and reacted proactively based on their own individual and constantly changing requirements and environment. The IPSS system could protect a user anywhere and all the time and is not limited to specific geographical areas, but follows the user throughout the day, while traveling from home to business, shopping, banking, walking through a park, traveling, snow skiing, etc.

The present invention provides various embodiments relating to the IPSS system, some of which is generally summarized hereafter. In general, the embodiments of the IPSS system involve use of one or more WCDs that can communicate with one or more remotely located servers (RLSs).

One embodiment, among others, is an activity detection method for a wireless communications device (WCD) that can be generally summarized by the following steps: entering into a first mode of operation involving a first investigation process with one or more sensors, the first investigation process capturing first data with the one or more sensors; determining whether or not the first data is indicative of an activity relating to a user need for assistance, an accident, or a crime; and when the first data may involve criminal activity, entering into a second mode of operation involving a second investigation process that is different than the first investigation process and that involves the one or more sensors and/or one or more other sensors in order to capture second data that is further indicative of the activity. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is an activity detection method for a computer system that is remote from the WCD that can be generally summarized by the following steps: receiving sensed data from the WCD that produces the sensed data with a sensor associated with the WCD; comparing the sensed data with reference data; and communicating a message to the WCD indicating whether or not the sensed data involves an activity relating to a user need for assistance, an accident, or a crime, based upon the comparison. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment, among others, is an activity detection method for a WCD that can be generally summarized by the following steps: producing data from one or more sensors associated with the WCD; determining a human body physical activity (HBPA) associated with a WCD user based upon the data; instructions to select a mode of operation from a set of modes, based upon the determined HBPA, the set including different modes of operation involving initiation of different investigation processes that capture different types of data; and communicating the data to a remote computer system for further analysis, storage, etc. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a criminal activity detection method for a WCD that can be generally summarized by the following steps: producing data based at least upon sensing a local environmental event with a sensor; communicating the data to a remote computer to permit analysis of the data; and receiving an indication on whether or not the data corresponds to a criminal activity. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment is a criminal activity detection method for a computer system (remote from the WCD) that can be generally summarized by the following steps: receiving sensed data from a remote WCD that produces the sensed data with a sensor associated with the WCD; comparing the sensed data with reference data; and communicating a message to the WCD indicating whether or not the sensed data involves criminal activity based upon the comparing. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment is a criminal activity detection method for a computer system (remote from the WCD) that can be generally summarized by the following steps: maintaining a database of files, the database including: (a) one or more of the following: audio files, video files, or image files; and (b) reference location information corresponding to individual ones of the files; receiving sensed information from a WCD, the sensed information including audio, video, or an image of a thing and sensed location information; retrieving a file in the database based at least in part upon the reference location information and the sensed location information; and communicating the retrieved file or derivative thereof to the WCD or a computer system designated by a user of the WCD. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment is a criminal activity detection method for a computer system (remote from the WCD) that can be generally summarized by the following steps: maintaining a database of files, the database including: (a) one or more of the following: audio files, video files, or image files; (b) reference location information corresponding to individual ones of the files; and (c) reference time information corresponding to the individual ones of the files; receiving sensed information from a WCD, the sensed information including audio, video, or an image of a thing and sensed location information; and retrieving a file in the database based at least in part upon the reference location information, the reference time information, and the sensed location information. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment is a listen mode method for a WCD that can be generally summarized by the following steps: producing data based at least upon sensing a local environmental event with a sensor; communicating the data to a remote computer to permit analysis of the data; receiving a command from the remote computer system to enter into a listening mode; activating a microphone associated with the WCD; and communicating audio data to the remote computer system based at least in part on sound captured by the WCD microphone. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment is a listen mode method for a computer system (remote from a WCD) that can be generally summarized by the following steps: receiving sensed data from a remote WCD that produces the sensed data with a sensor associated with the WCD; determining whether or not the sensed data may involve criminal activity based at least in part upon the sensed data; and communicating a command to the WCD to enter into a listening mode by activating a microphone associated with the WCD. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment is alarm method for a WCD that can be generally summarized by the following steps: producing data based at least upon sensing a local environmental event with a sensor; communicating the data to a remote computer to permit analysis of the data; and receiving a command to initiate an alarm that is indicative of criminal activity. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment is alarm method for a computer system (remote from a WCD) that can be generally summarized by the following steps: receiving sensed data from a remote WCD that produces the sensed data with a sensor associated with the WCD; determining whether or not the sensed data may involve criminal activity based at least in part upon the sensed data: and when the determining indicates criminal activity, communicating a command to the WCD to initiate an alarm. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment is a type of surveillance (TOS) and risk level method for a computer system (remote from a WCD) or a WCD that can be generally summarized by the following steps: selecting a TOS to be implemented in connection with the WCD from a set of predetermined TOSs; selecting a risk level from a set of predetermined risk levels; and initiating a surveillance action based at least in part upon the risk level, the surveillance action involving activation of an input/output (I/O) device associated with the WCD. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment is a switching surveillance mode method for a WCD that can be generally summarized by the following steps: producing data based at least upon sensing a local environmental event with a sensor; communicating the data to an RLS to permit analysis of the data; and receiving an instruction from the RLS to enter into a different mode of operation that involves initiating a different investigation process with one or more sensors associated with the WCD. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment is a switching surveillance mode method for a WCD that can be generally summarized by the following steps: producing data based at least upon sensing a local environmental event with a sensor; determining that the sensed data may involve criminal activity; and entering into a different mode of operation that involves initiating a different investigation process with one or more sensors associated with the WCD. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment is a switching surveillance mode method for a computer system (remote from a WCD) that can be generally summarized by the following steps: receiving sensed data from a remote WCD that produces the sensed data with a sensor associated with the WCD; determining that the sensed data may involve criminal activity based at least in part upon the sensed data: communicating a message to the WCD requesting entry of a code; and determining whether or not to initiate a different surveillance mode based at least in part upon the code entry. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment is a switching surveillance mode method for a computer system (remote from a WCD) that can be generally summarized by the following steps: receiving sensed data from a remote WCD that produces the sensed data with a sensor associated with the WCD; determining a user activity based at least in part upon the sensed data; and selecting a type of surveillance (TOS) to be implemented in connection with the WCD from a set of predetermined TOSs. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment is a switching surveillance mode method for a computer system (remote from a WCD) that can be generally summarized by the following steps: receiving sensed data from a remote WCD that produces the sensed data with a sensor 130 associated with the WCD; determining that the sensed data may involve criminal activity based at least in part upon the sensed data; and communicating a message or command to the WCD requesting or instructing that the WCD enter into a different mode of operation that involves initiating a different investigation process with one or more sensors associated with the WCD. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment is a switching surveillance mode method for a computer system (remote from a WCD) that can be generally summarized by the following steps: receiving sensed data from a remote WCD that produces the sensed data with a sensor associated with the WCD; determining that the sensed data may involve criminal activity based at least in part upon the sensed data; and entering into a different mode of operation that involves initiating a different investigation process with one or more sensors associated with the WCD. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment is a cooperating WCD method for a computer system (remote from the WCDs) that can be generally summarized by the following steps: receiving sensed data from a remote WCD that produces the sensed data with a sensor associated with the WCD; determining whether or not the sensed data may involve criminal activity based at least in part upon the sensed data: and when the determining indicates criminal activity, communicating a command to one or more WCDs in close proximity of the WCD to initiate an action. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment is a cooperating WCD method for a computer system (remote from the WCDs) that can be generally summarized by the following steps: receiving first sensed data and first location information from a first WCD, the first sensed data produced with a first sensor associated with the first WCD, the first location information produced with a first GPS receiver or other device associated with the first WCD; receiving second sensed data and second location information from a second WCD, the second sensed data produced with a second sensor associated with the second WCD, the second location information produced with a second GPS receiver or other device associated with the second WCD; determining that the first WCD and the second WCD in close proximity based at least in part upon the first location information and the second location information; and detecting an event in an environment associated with the mobile vehicle based at least upon the first and second sensed data. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment is a request for user input method for a computer system (remote from the WCD) that can be generally summarized by the following steps: receiving sensed data from a remote WCD that produces the sensed data with a sensor associated with the WCD; attempting to determine whether or not the sensed data may involve criminal activity based at least in part upon the sensed data: communicating a request to a user of the WCD to initiate an action; determining that the sensed data involves criminal activity when the user action fails to initiate the user action; and determining that the sensed data does not involve criminal activity when the user action is initiated. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment is assistance entity selection method for a computer system (remote from the WCD) that can be generally summarized by the following steps: receiving sensed data from a remote WCD that produces the sensed data with a sensor associated with the WCD; determining whether or not a user of the WCD needs assistance based at least in part upon the sensed data: and when assistance is needed, communicating a request for the assistance to an appropriate assistance providing entity. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment is assistance entity selection method for a computer system (remote from the WCD) that can be generally summarized by the following steps: receiving sensed data and location information from a remote WCD that produces the sensed data with a sensor associated with the WCD; determining whether or not a user of the WCD needs assistance based at least in part upon the sensed data: determining a user activity; and selecting an assistance providing entity based at least in part upon the user activity and the location information. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Other systems, methods, apparatus, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The present invention can be better understood with reference to the following drawings. The drawings are not necessarily to scale, emphasis instead being placed upon clearly illustrating the principles of the present invention. Moreover, like reference numerals designate corresponding parts throughout the several views.

FIG. 1A is a diagram of a second set of embodiments of the IPSS system.

FIGS. 15 and 15A are diagrams of database sharing logic that may be employed in an IPSS system.

FIG. 18 is a diagram of WCD screens that can be generated by graphical user interface (GUI) logic in the IPSS system for enabling a user to modify surveillance modes and activations.

FIG. 30 is a flow chart of a second set of embodiments of criminal activity determination logic that can be implemented by the IPSS control software of the RLS.

FIG. 31 is a flow chart of a third set of embodiments of criminal activity determination logic that can be implemented by the IPSS control software of the RLS.

FIG. 34 is a flow chart of an embodiment of alarm logic that can be implemented by the IPSS control software of the WCD.

FIG. 35 is a flow chart of an embodiment of alarm logic that can be implemented by the IPSS control software of the RLS.

FIG. 36 is a flow chart of an embodiment of TOS/risk level logic that can be implemented by the IPSS control software of the WCD and/or RLS.

FIG. 37 is a flow chart of a first set of embodiments of switching surveillance mode logic that can be implemented by the IPSS control software of the RLS.

FIG. 38A is a flow chart of a third set of embodiments of switching surveillance mode logic that can be implemented by the IPSS control software of the RLS.

FIG. 38B is a flow chart of a fourth set of embodiments of switching surveillance mode logic that can be implemented by the IPSS control software of the RLS.

FIG. 40 is a flow chart of a second set of embodiments of cooperating WCD logic that can be implemented by the IPSS control software of the RLS.

FIG. 41 is a flow chart of an embodiment of request for user input logic that can be implemented by the IPSS control software of the RLS.

FIG. 42 is a flow chart of a first set of embodiments of assistance entity selection logic that can be implemented by the IPSS control software of the RLS.

FIG. 43 is a flow chart of a second set of embodiments of assistance entity selection logic that can be implemented by the IPSS control software of the RLS.

DETAILED DESCRIPTION

Figure 1:
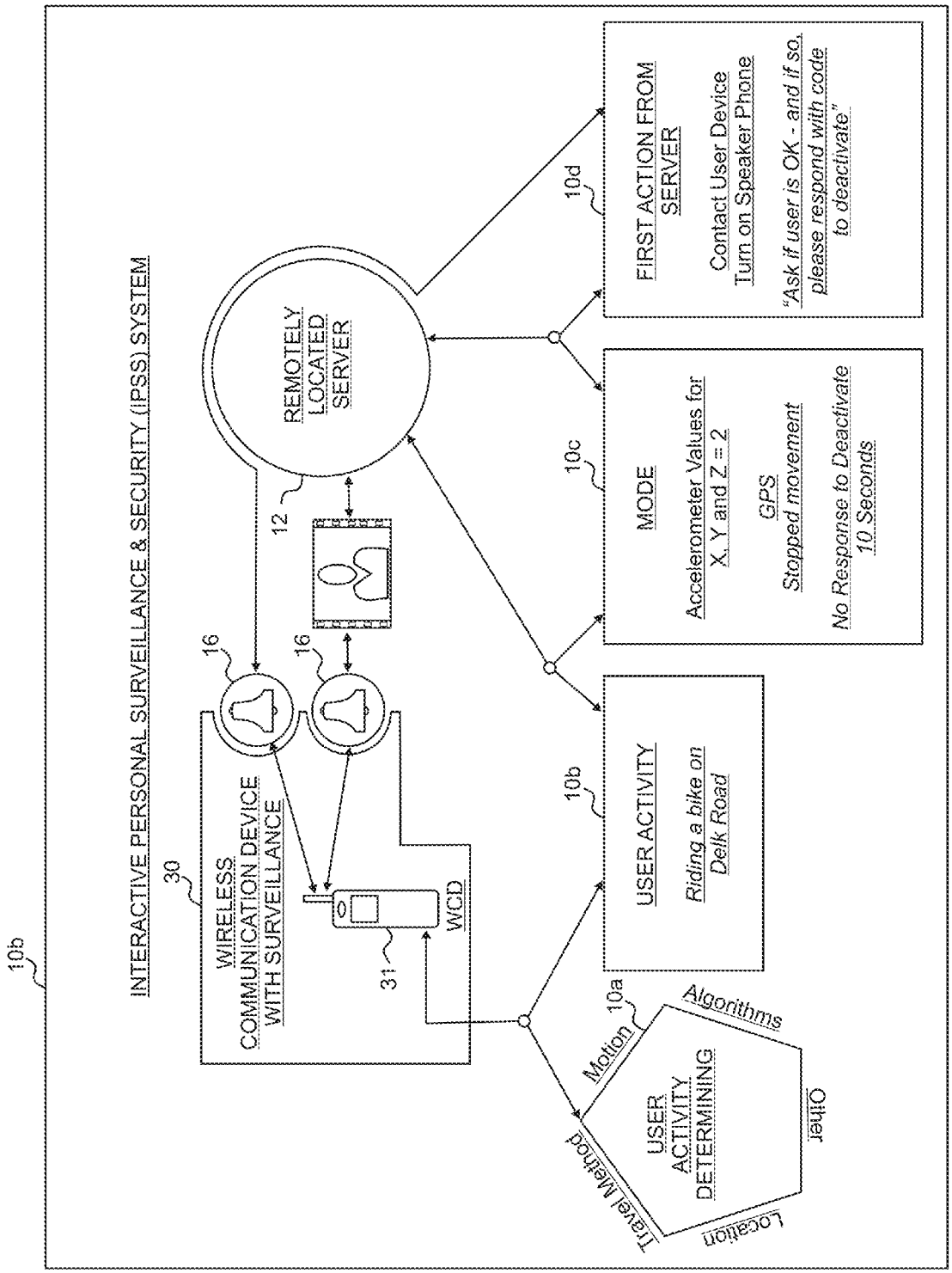
FIG. 1 is a diagram of a first set of embodiments of an interactive personal surveillance and security (IPSS) system that may be employed using a wireless communication device (WCD) and a remotely located server (RLS).

Referring now in more detail to the drawings, wherein like reference numerals designate corresponding parts throughout the several views, FIG. 1 is a diagram of a first embodiment of an interactive personal surveillance and security (IPSS) system 10 that may be employed in connection one or more wireless communication devices (WCDs) 31 and one or more remotely located servers 12. The WCD 31 is capable of determining movement and location and automatically activating security and surveillance measures. The WCD 31 can have sensors, for example, a GPS receiver and/or other location determination functionality, accelerometer, gyroscope, magnetometer, altimeter, thermometer, and/or other devices for determining the user's human body physical activity (HBPA). This data can be utilized to help automatically modify the user modes and to activate appropriate security alarms and/or surveillance measures. Furthermore, the WCD 31 can collect information, such as video, still images, and/or audio and can communicate such information to the RLS 12.

The RLS 12 can operate as, but not limited to, a remote storage area(s) for recordings (away from the WCD 31), a system for interacting with the user WCD 31, and a system for determining how to assist and for assisting the user, controlling the WCD 31 or one or more functions of the WCD 31, and for communicating with other systems, users, people and agencies/companies.

Remotely locating the surveillance information (video, image(s), sound, sensors, location, and other) helps to protect the information from be erased or stolen. In an example where a stranger is approaches the user and steals the user's WCD 31, the surveillance information of the criminal remains safe within the RLS 12. Additionally, the information within the surveillance information may be automatically analized.

This application is a CIP of application no. PCT/US13/56753, filed Aug. 27, 2013, which is incorporated here by reference in its entirety. This application discloses systems, methods, and apparatus for accurately identifying a mobile thing motion activity (MTMA) associated with a mobile thing (MT), such as a person, by analyzing data produced by one or more sensors associated with a WCD transported (e.g., carried, moved, etc.) by the MT, so as to enable or initiate a further one or more intelligent activity based actions, for example, but not limited to, initiation of a surveillance activity, changing of a surveillance mode, etc. The HBPAs of the present application are generally a subset of the MTMAs of application no. PCT/US13/56753. Accordingly, the systems, methods, and apparatus disclosed in application no. PCT/US13/56753 can be utilized herein in the various embodiments of the IPSS system 10 to accurately identify the HBPA associated with the WCD user. Also, many of the activity based actions described in application no. PCT/US13/56753 can also be implemented in connection the various embodiments of the IPSS system 10.

The IPSS system 10 includes software (or firmware) operating on the user WCD 31, which interacts or controls many of the WCD 31 features, including the camera, capable of capturing video or still images (and/or audio). The software controls communication that includes uploading 21 or sending live information 22 wirelessly to the RLS 12 for the purpose of storing surveillance information away and in a secure area from the user's WCD 31 and for activating and/or monitoring the user activity for future activation of alarms or assisting the user as needed or required. The software has the ability to listen (or compare images) for events that will change the surveillance mode/s or activation of alarms.

Figure 8:
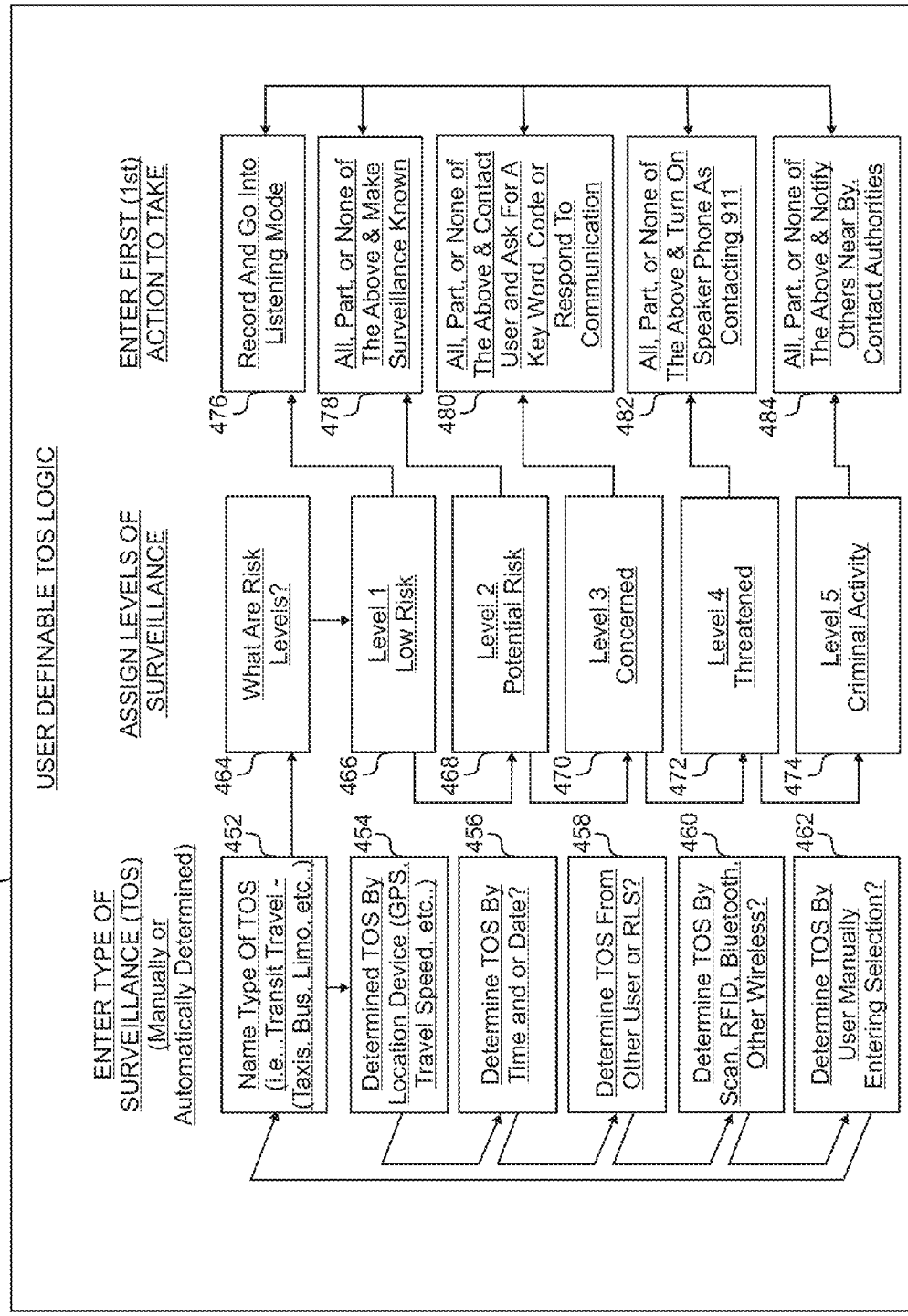
FIG. 8 is a diagram of user-definable type-of-surveillance (TOS) logic that may be employed in the IPSS system.

The RLS 12 can manage one or more WCDs 31, as depicted by FIG. 8. The RLS 12 may be configured to receive the user information at the user's own computer 510 and/or one or more servers 508 (or any online storage facility) for the purpose of securing the captured surveillance information and therefore making it almost impossible to delete or to destroy.

As configured in the IPSS system 10, the RLS 12, WCD 31, or both, automatically determines what, if any action is needed/required when surveillance is active or activated. Based on the user definable entries 82 and/or the system processes 84. some of the follow up actions require the RLS 12 to contact the user, others, and/or online databases for potentially increasing the users safety (or otherwise) through predefined criteria.

Activations of surveillance and alarms are determined automatically, based on user or system definitions/programming and/or manually. Listening Mode allows the WCD 31 to hear sounds, receive data from other WCDs 31 and take images or videos for determining if or when surveillance modes should change or when alarms are needed. This automatic Listening Mode may operate independent of the user or with user reminders or requests for instructions.

FIG. 1A is a diagram of a second embodiment of the IPSS system 10 that may optionally be employed in connection with a WCD 31 having a GPS receiver, accelerometer, and image, video, and sound capabilities. In this example, FIG. 1A depicts a WCD 31, such as a cellular telephone, in communication with the RLS 12, which in turn receives surveillance information and determines if any action is needed based on user requirements, then waits or communicates with the WCD 31 and/or others. Additionally, the WCD 31 has a listen mode that monitors sound, video, and/or still images, or wireless data/signals for automatically activating alarms or changing to different modes of surveillance for the user. Some images taken while the WCD 31 and RLS 12 are in certain surveillance modes are sent to a criminal matching database for identifying any known criminal. When the WCD 31 and RLS 12 are in other surveillance modes, the RLS 12 may be designed to send images to an OCR (optical character recognition) database for processing information (licenses, registrations, etc.) for the safety of the IPSS user.

Figure 2:
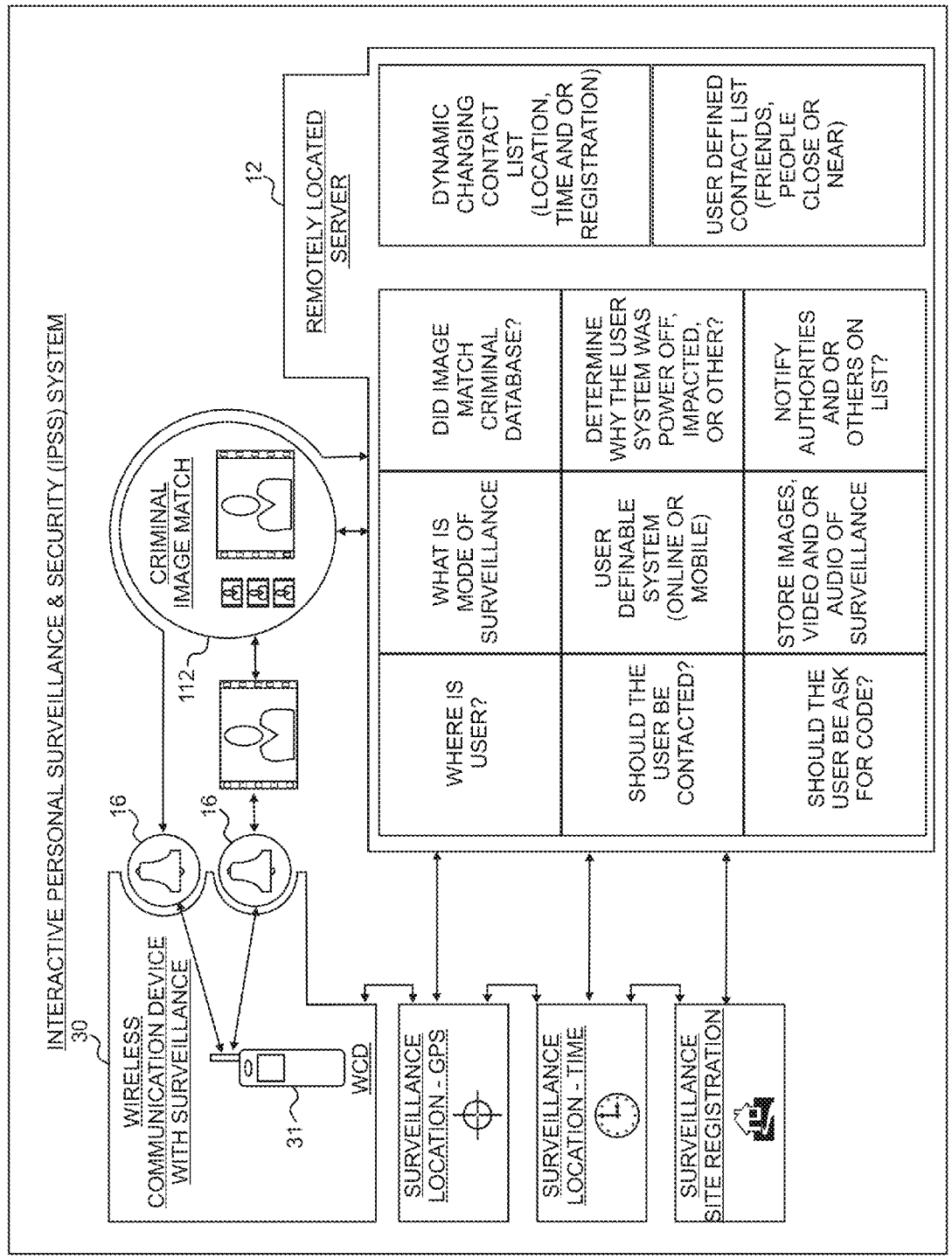
FIG. 2 is a diagram of a third set of embodiments of the IPSS system.

FIG. 2 is a diagram of a third embodiment of the IPSS system 10 that may optionally be employed in connection with a WCD 31 enabled with image or video capabilities. FIG. 2 depicts a WCD 31 capturing surveillance information within the WCD 31 itself or sending this information to be recorded within the RLS 12, and the ability to utilize one or more technologies to analyze surveillance information and determine if or when the user may need additional assistance. As an example, a database for criminal image matching may be utilized to determine and inform the user when the user is around or corresponding with a criminal awaiting capture. FIG. 2 also shows how the WCD 31 can utilize different methods and technologies to determine its location and how to best control its surveillance and alarms at these different locations.

Figure 3:
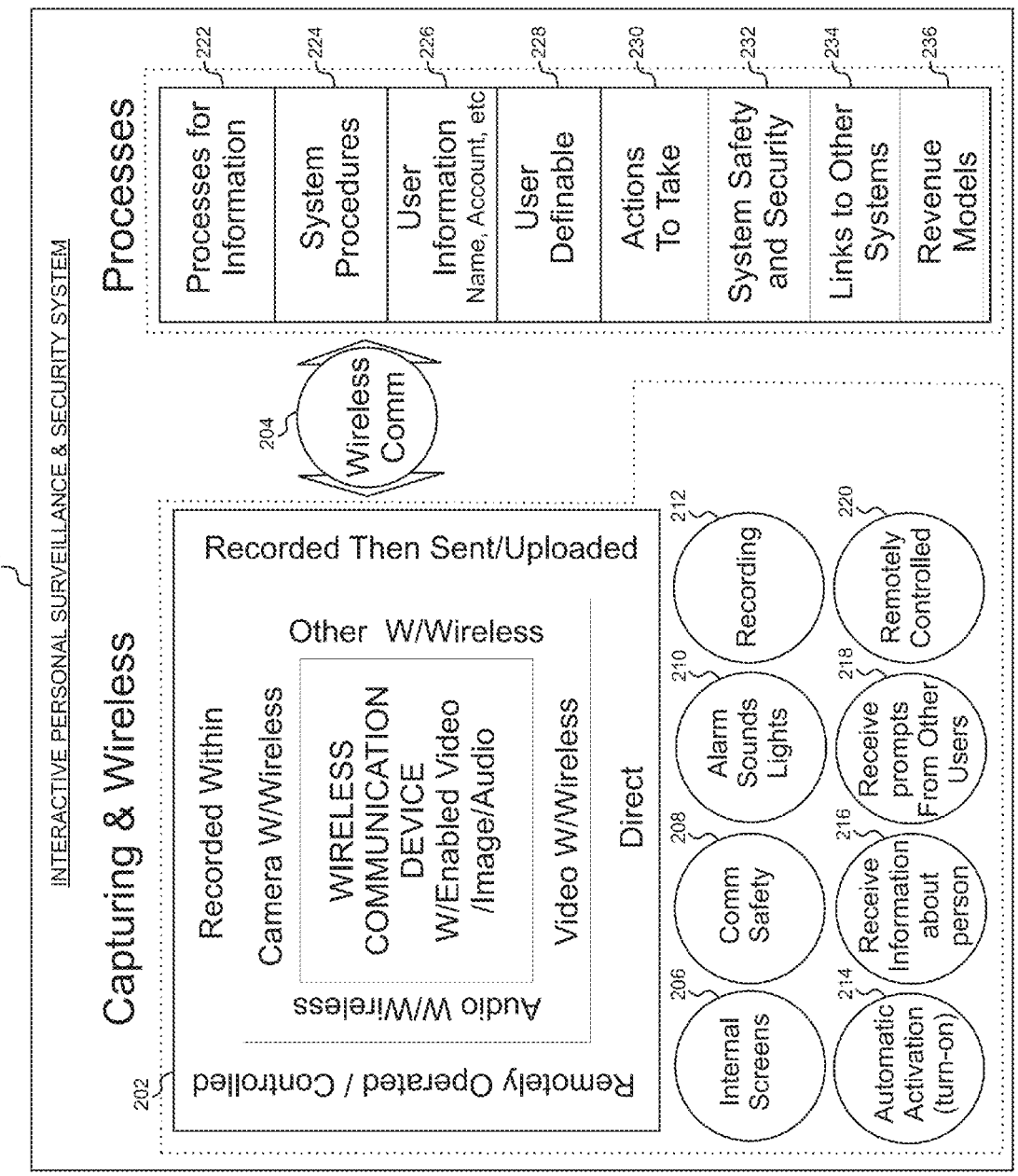
FIG. 3 is a diagram of a fourth set of embodiments of the IPSS system.

FIG. 3 is a diagram of a fourth embodiment of the IPSS system 10 that may optionally be employed in connection with a WCD 31 enabled with image or video capabilities. As indicated in this diagram, the IPSS system 10 may send information or process the information internally. Actions of the WCD 31 may include controlling internal screens, determining communication safety or availability, controlling alarms sounds and lights, recording, automatic activation or deactivation of functions, receiving information about a person or prompts from other users, allowing itself to be remotely controlled, connecting to other wireless surveillance equipment or systems. FIG. 3 also shows a high level view of some of the processes of the RLS 12 for responding to user or user WCD information and response activations.

Figure 4:
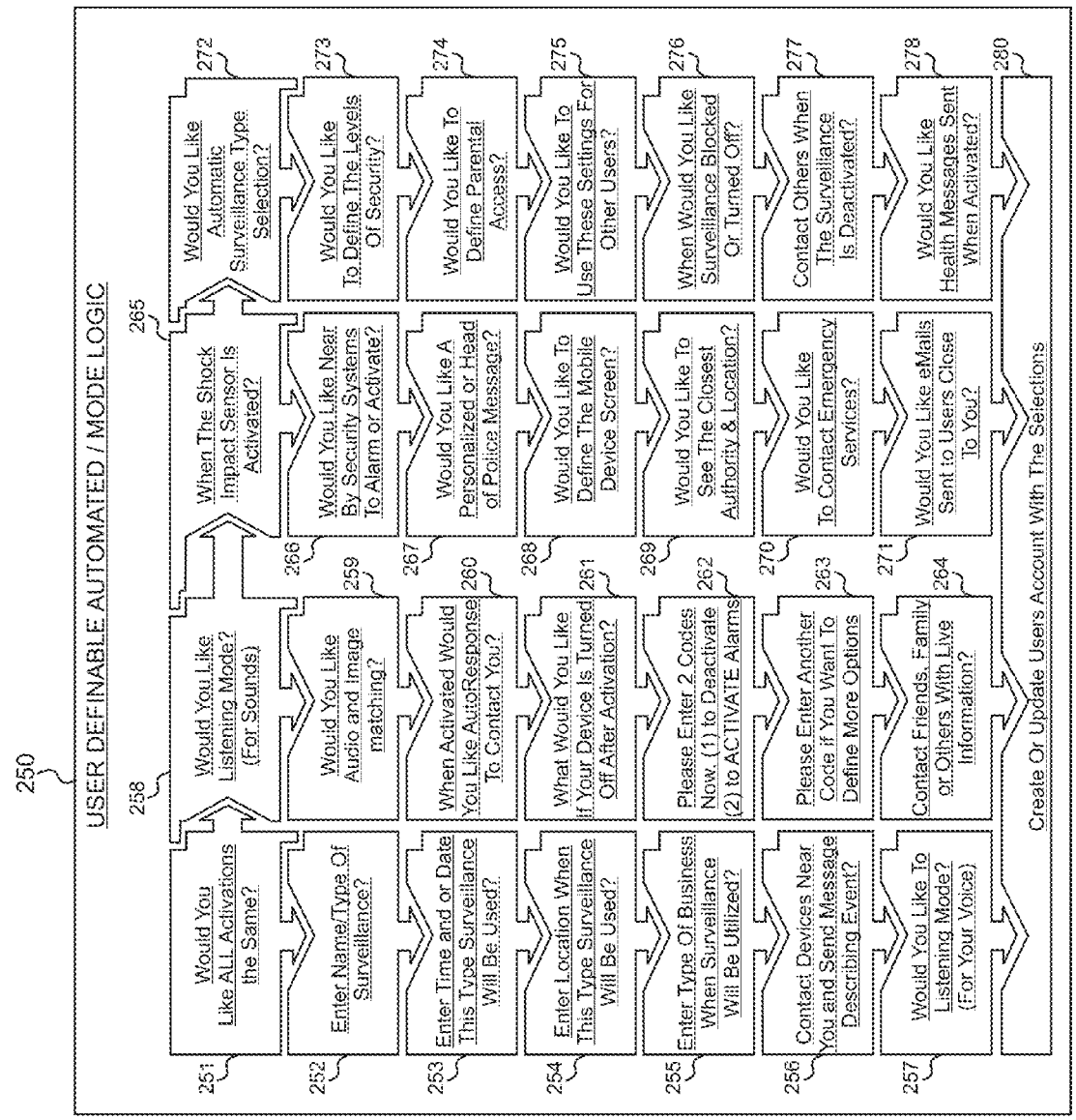
FIG. 4 is a diagram of user definable activation/mode logic that may be employed in the IPSS system.

FIG. 4 is a diagram of user definable activation/mode logic that may optionally be employed in the IPSS system 10 associated with a WCD 31 enabled with image or video capabilities. As indicated in this diagram, the IPSS system 10 can include user preferences functionality that allows each user to define what activations/deactivations and/or modes of operation will occur as information is triggered or sent to the RLS 12. As shown, one component allows the user to set all surveillance types the same or set each one differently. The surveillance types offer higher, lower, or different security options based on the user location or the user circumstance. For example, this offers a user that is walking home the ability to increase the immediacy for activating alarms and contacting others.

The listening sound and voice matching feature in some embodiments allows a user to have the WCD 31 pick up sounds and internally process them or have the RLS 12 (or combination of both) process the sounds to determine when the user needs additional help or surveillance. The system can be designed to hear sounds, such as but not limited to, key phrases or words, increased volume from the user (screaming, talking aggressively, etc.), or any other sound that may active or deactivate the alarms or surveillance.

In some embodiments, an image matching feature allows a user to capture video and/or images and have these matched in one or more databases in order to identify people who are threats or to identify potential criminal activity. When a match occurs, the WCD 31 may be configured to inform the WCD user and/or activate additional surveillance or alarms.

Also shown in FIG. 4 are features for contacting devices or users near or close by the WCD 31 causing activation of an alarm. This feature allows for automatic notification to people a short distance away from the user in order to help the user as soon as possible.

Still another embodiment of the present invention includes a WCD 31 with a shock sensor, impact sensor, or extreme deceleration sensor, that once triggered, may automatically notify authorities, emergency services, or others and, as a further option, activate speaker phone conferencing. Yet another embodiment of the IPSS system 10 may be designed to, when a party attempts to destroy the WCD 31, send out an emergency signal to the RLS 12.

Figure 5:
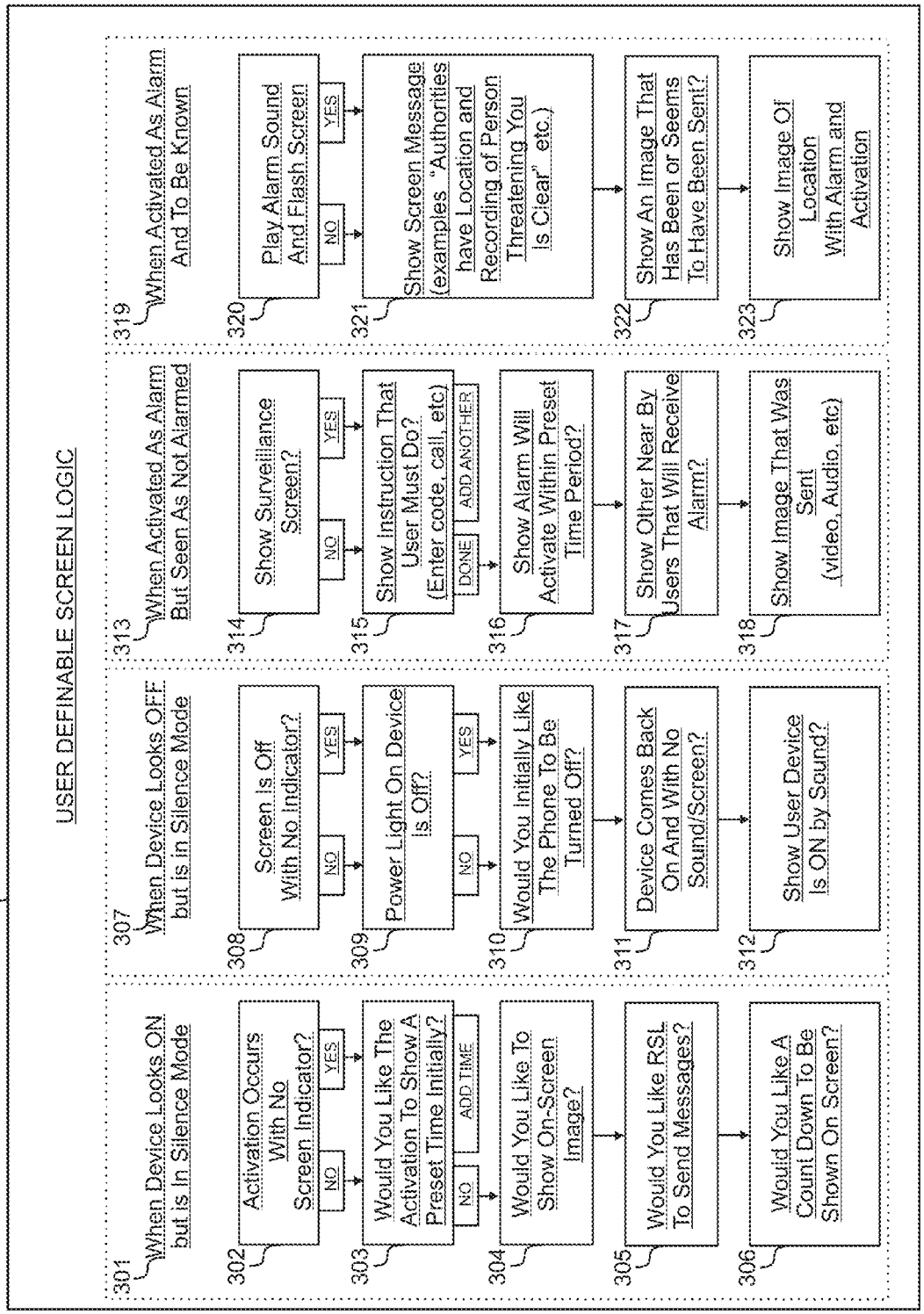
FIG. 5 is a diagram of user definable screen logic that may be employed in the IPSS system.

FIG. 5 is a diagram of user definable screen logic that may optionally be employed in the IPSS system 10 associated with a WCD 31 enabled with image or video capabilities. As indicated in this diagram, the IPSS system 10 allows the WCD 31 to hide the WCD mode of operation by looking like the WCD 31 is turned off when actually turned on or activated, to show or not show other parties its mode of operation, and act as if it has done or accomplished things when it has or has not. Another possible feature involves activation of alarms. Yet another possible feature involves showing images/audio that have been or appear to have been sent for surveillance.

Figure 6:
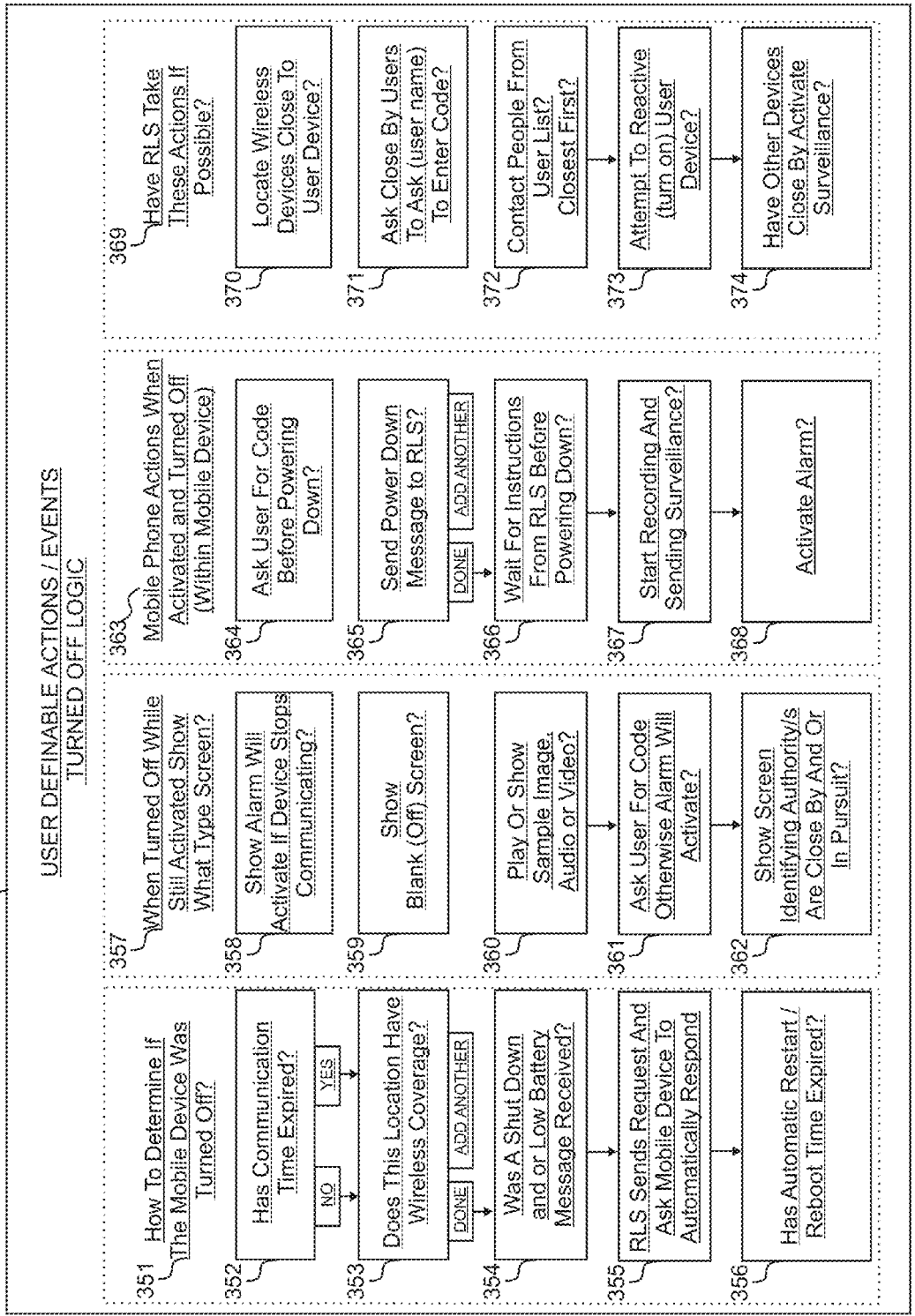
FIG. 6 is a diagram of user definable actions/events turn off logic that may be employed in the IPSS system.

FIG. 6 is a diagram of user definable actions/events turn off logic that may optionally be employed in the IPSS system 10 associated with a WCD 31 enabled with image or video capabilities. As indicated in this diagram, the IPSS system 10 determines when the WCD 31 is turned off and determines whether there is a security alert or whether the turning off operation was a user initiated (no security needed). The flow chart diagram shows the RLS 12 attempting to contact the WCD 31 and, after a preset time period, activating the next mode of security. The IPSS system 10 attempts to determine if wireless coverage is available for the WCD 31, if the battery power is low, and/or if the WCD 31 is automatically restarted.

Another possible feature is manipulating the screen to look off, but when surveillance was activated to not turn off but look off. Or, another feature is to ask the user to enter a code or an alarm will activate (or activate within a preset time frame).

Figure 7:
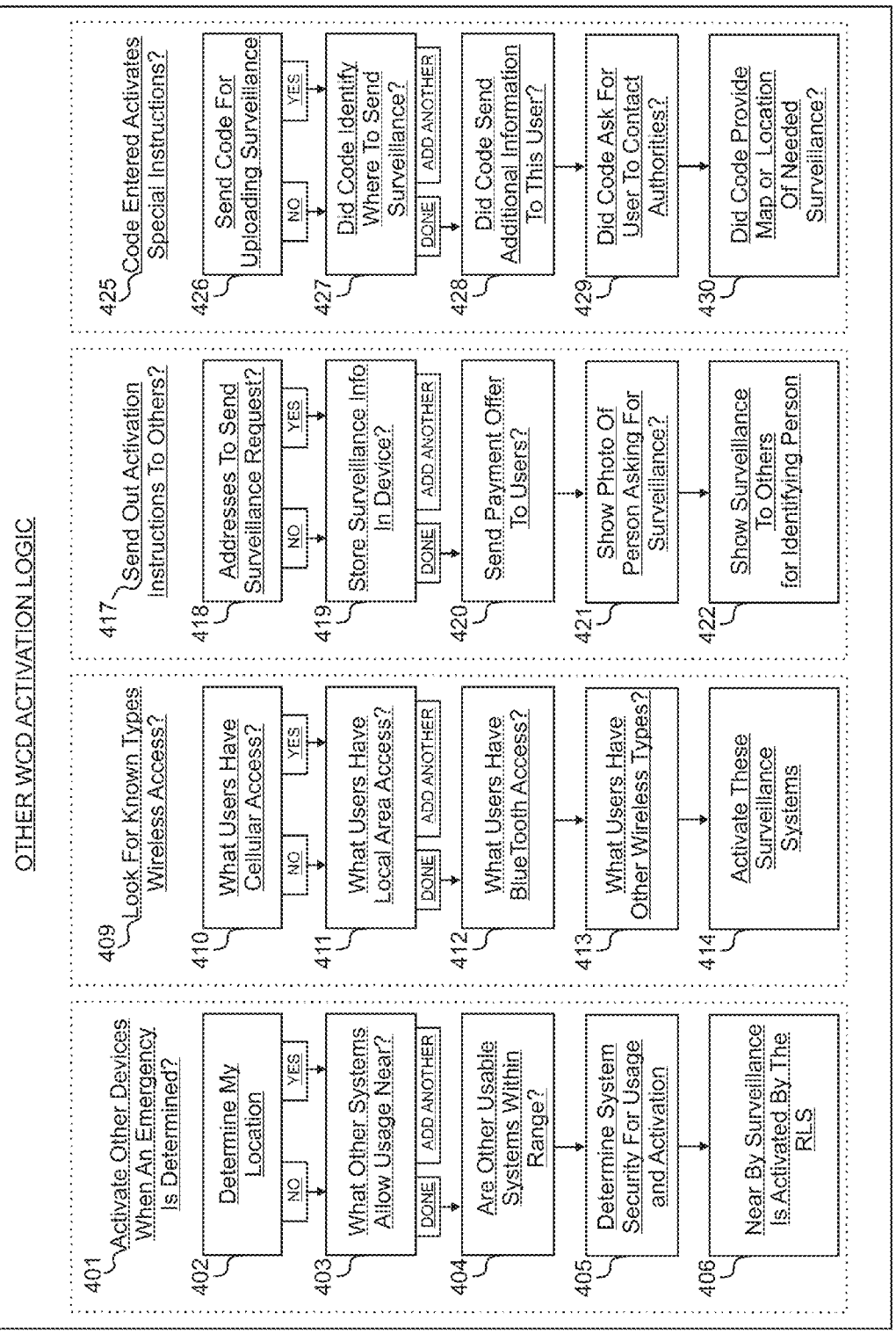
FIG. 7 is a diagram of other-WCD-activation logic that may be employed in the IPSS system 10.

FIG. 7 is a diagram of other WCD activation logic that may optionally be employed in the IPSS system 10 associated with a WCD 31 enabled with image or video capabilities. As indicated in this diagram, for surveillance purposes, the IPSS system 10 can allow usage of the IPSS system 10 by other IPSS system 10s that are in close proximity and can also allow usage of the other IPSS system 10s by the IPSS system 10. As a deterrent, criminal activity can be captured on a plurality of WCDs 31 and alarms can be activated to assist.

FIG. 8 is a diagram of user-definable type-of-surveillance (TOS) logic that may optionally be employed in the IPSS system 10 and/or the RLS 12. As indicated in this diagram, the IPSS system 10 can include the TOS functionality in the WCD 31 itself. The TOS functionality can also be situated in the RLS 12, and the IPSS system 10 can access it via the Internet. The TOS functionality allows a user to define surveillance settings that best suit the user needs in one or more environments. As shown in FIG. 8, levels of security or surveillance can be selected or otherwise input by the user, and these levels define (add to, change, or replace) the interactive actions to best accommodate each user environment. There are many ways to format the question and answers to obtain correct user definable criteria from one or more users of the IPSS system 10. Therefore, this flow chart focuses on the elements of "risk levels" and one, two or more "actions to take" based on the user risk level.

It should be noted that the TOS functionality can be designed to automatically increase or decrease the levels, based upon user risks or potential user risks. As an example, Level 3 may require the WCD 31 to ring (from within or from the RLS 12), but if not answered or replied to (or otherwise), the IPSS system 10 may automatically go from "Level 4" to "Level 5" (or any other levels). Or another example, as shown in the "Listening Mode" of 12345, any match may automatically increase or decrease the "risk level" and associated actions defined by the user.

Figure 9:
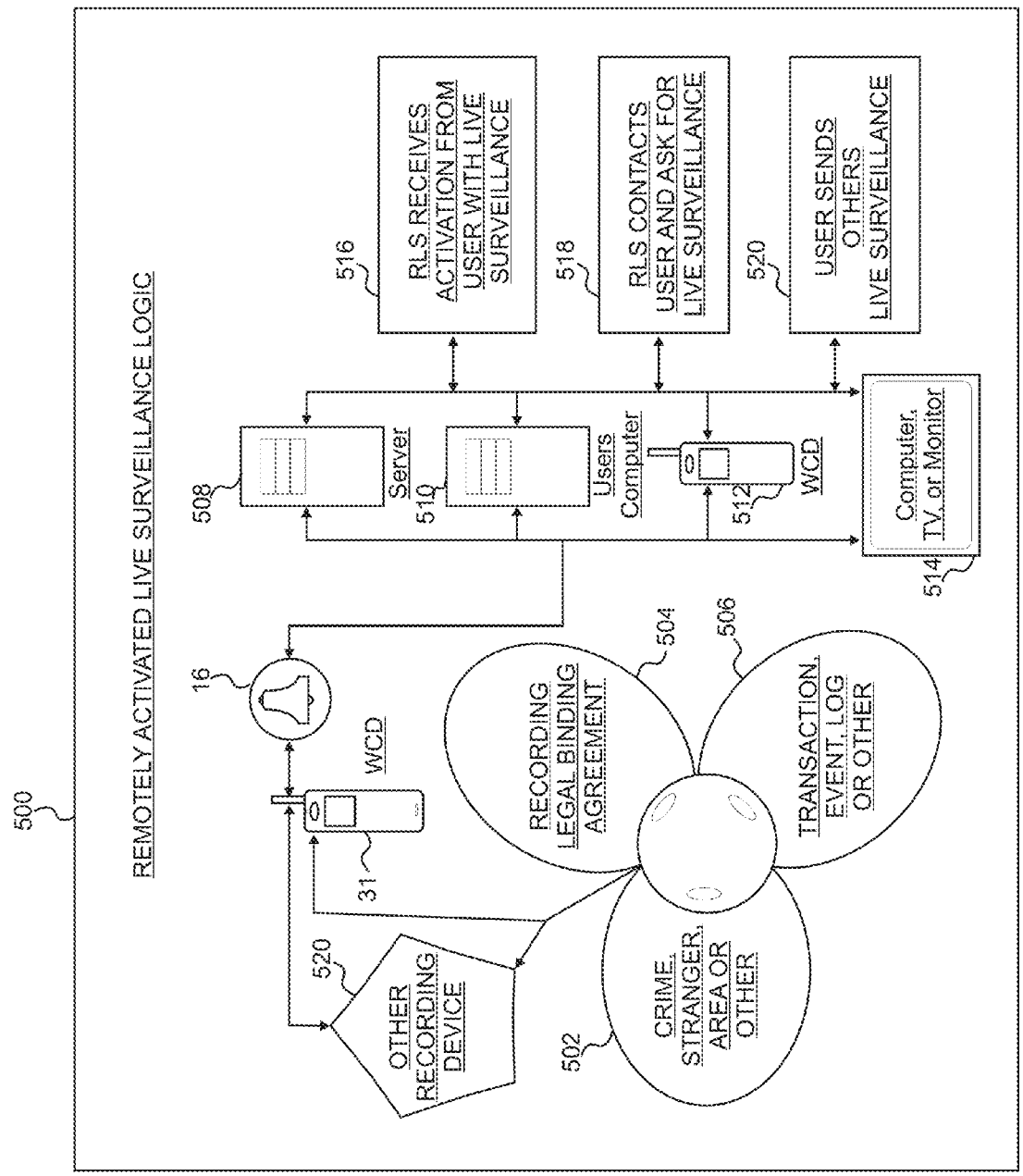
FIG. 9 is a diagram of remotely activated live surveillance logic that may be employed in the IPSS system.

FIG. 9 is a diagram of remotely activated live surveillance logic that may optionally be employed in an IPSS system 10 associated with a WCD 31 enabled with image or video capabilities. The IPSS system 10 may be used to capture agreements or documents and send them to legal or personal RLSs 12. Another usage of the IPSS system 10 is capturing events or logs that may be stored for later retrieval and usage. This feature could easily be used in place of signing by having the person say or agree verbally to a request. FIG. 9 also shows how the IPSS system 10 may be remotely activated or controlled for surveillance of the user. For example, a parent may automatically turn on a child's surveillance to hear or see (to check in on) how the child is doing.

Figure 10:
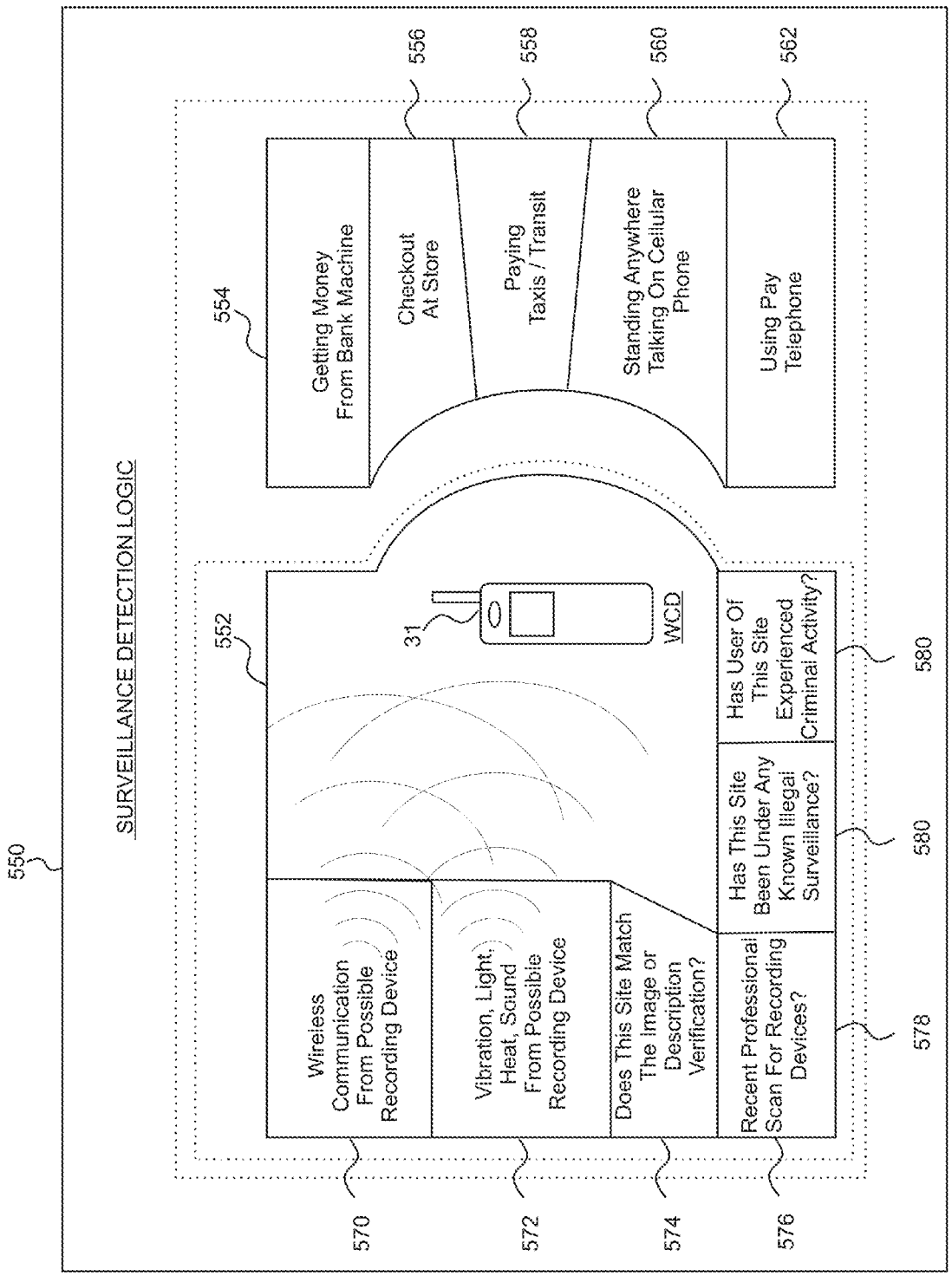
FIG. 10 is a diagram of surveillance detection logic that may be employed in the IPSS system.

FIG. 10 is a diagram of surveillance detection logic that may optionally be employed in an IPSS system 10 associated with a WCD 31 enabled with image or video capabilities. This surveillance detection logic uses surveillance to protect its user and the user assets in many different ways. As shown in the diagram, the IPSS system 10 may be used to protect a user from sharing personal information or from identity theft by detecting (with others who are recording) when the user of the IPSS system 10 is entering a confidential code or password, or is showing sensitive financial information (credit cards, account details, etc.) at facilities where illegal cameras, data-entry, or other capturing devices could take or steal the information.

Figure 11:
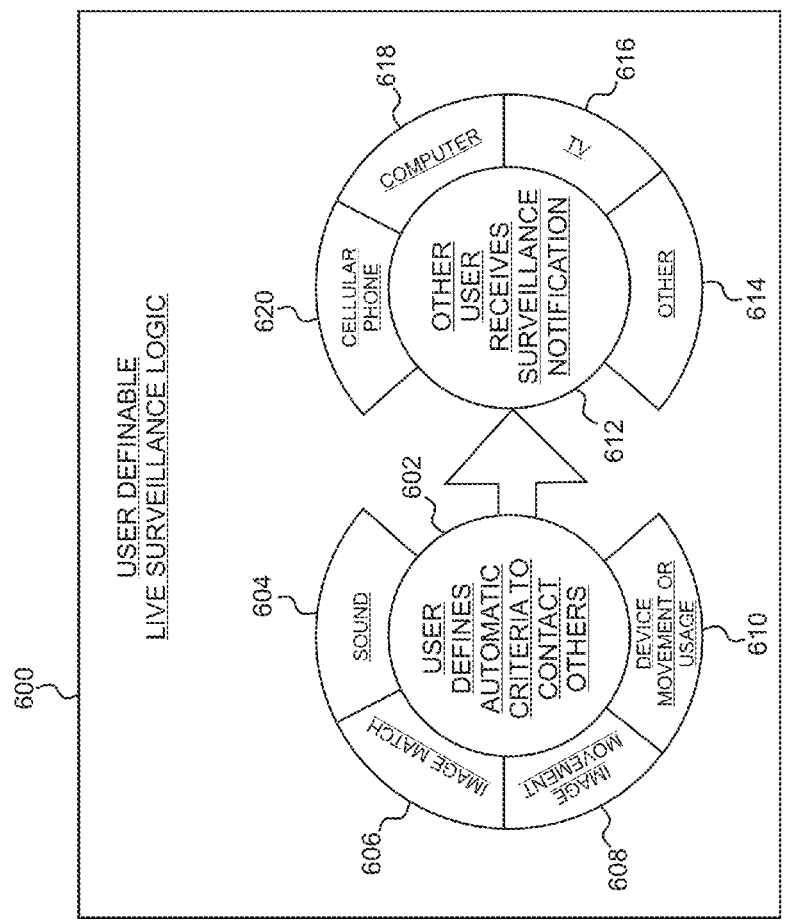
FIG. 11 is a diagram of live surveillance logic that may be employed in an IPSS system.

FIG. 11 is a diagram of live surveillance logic that may optionally be employed in an IPSS system 10 associated with a WCD 31 enabled with image or video capabilities. As shown in the diagram, the IPSS system 10 may be used to contact others when WCD 31 or image movement is determined and/or an image match or sound is determined. In this embodiment, the WCD 31 is capable of activating this functionality based on sound, movement, time lapse, location, buttons or switches, or any other alarm type activation or method. For example, when the internal imaging matching software is active (live surveillance) and a user staying at a hotel points a WCD camera at a hotel door, if anyone comes into the hotel room the system will automatically trigger an alarm.

Figure 12:
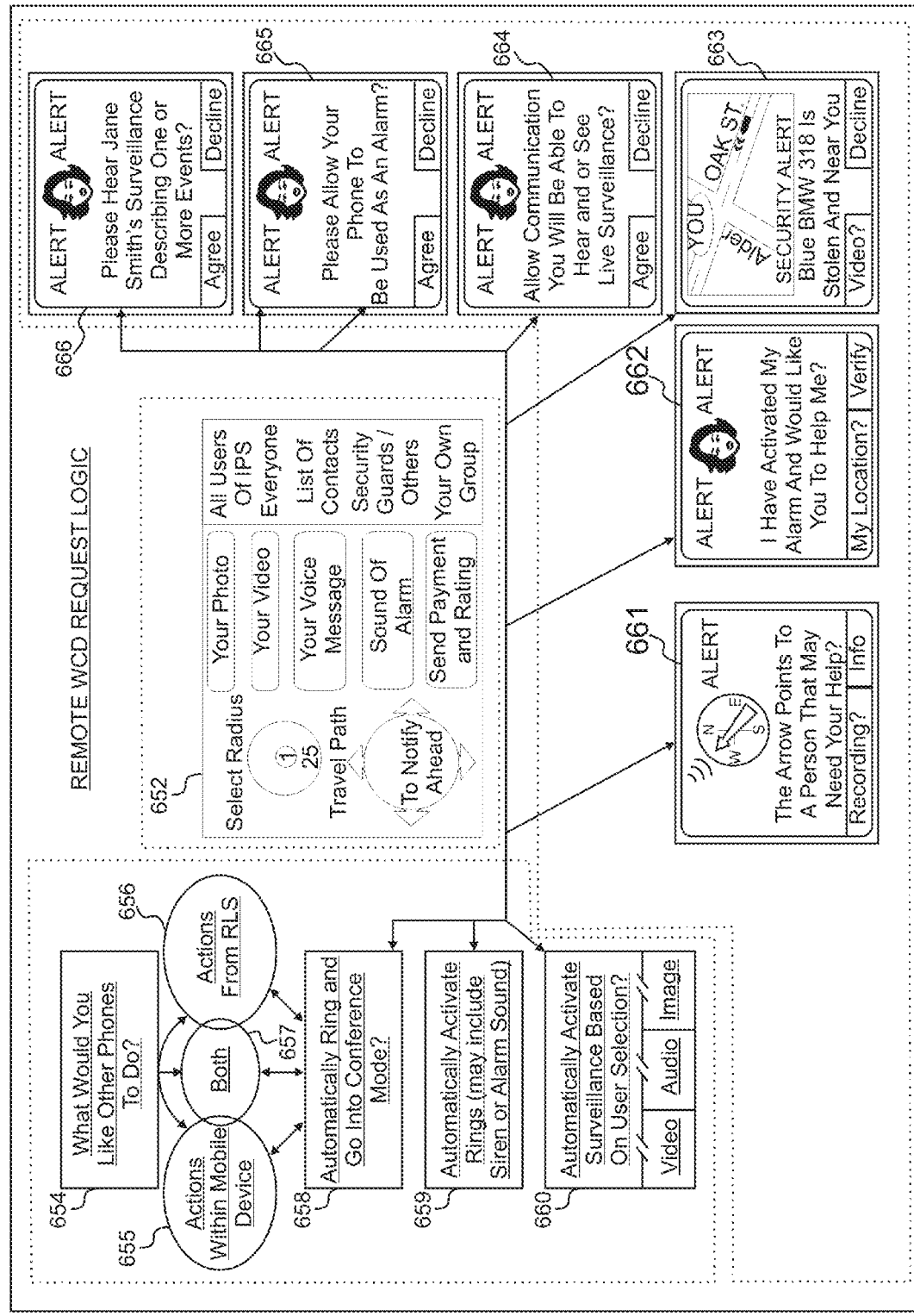
FIG. 12 is a diagram of remote WCD request logic that may be employed in an IPSS system.

FIG. 12 is a diagram of remote WCD request logic that may optionally be employed in an IPSS system 10 associated with a WCD 31 enabled with image or video capabilities. As indicated in this diagram, the IPSS system 10 may include this logic to contact other remote WCD users that are nearby and send these remote WCD users information that may help them. As shown in the diagram, the IPSS system 10 may send out the location of the alarm, the direction, information about the user that activated the alarm, and other information that may assist the remote WCD user.

Figure 13:
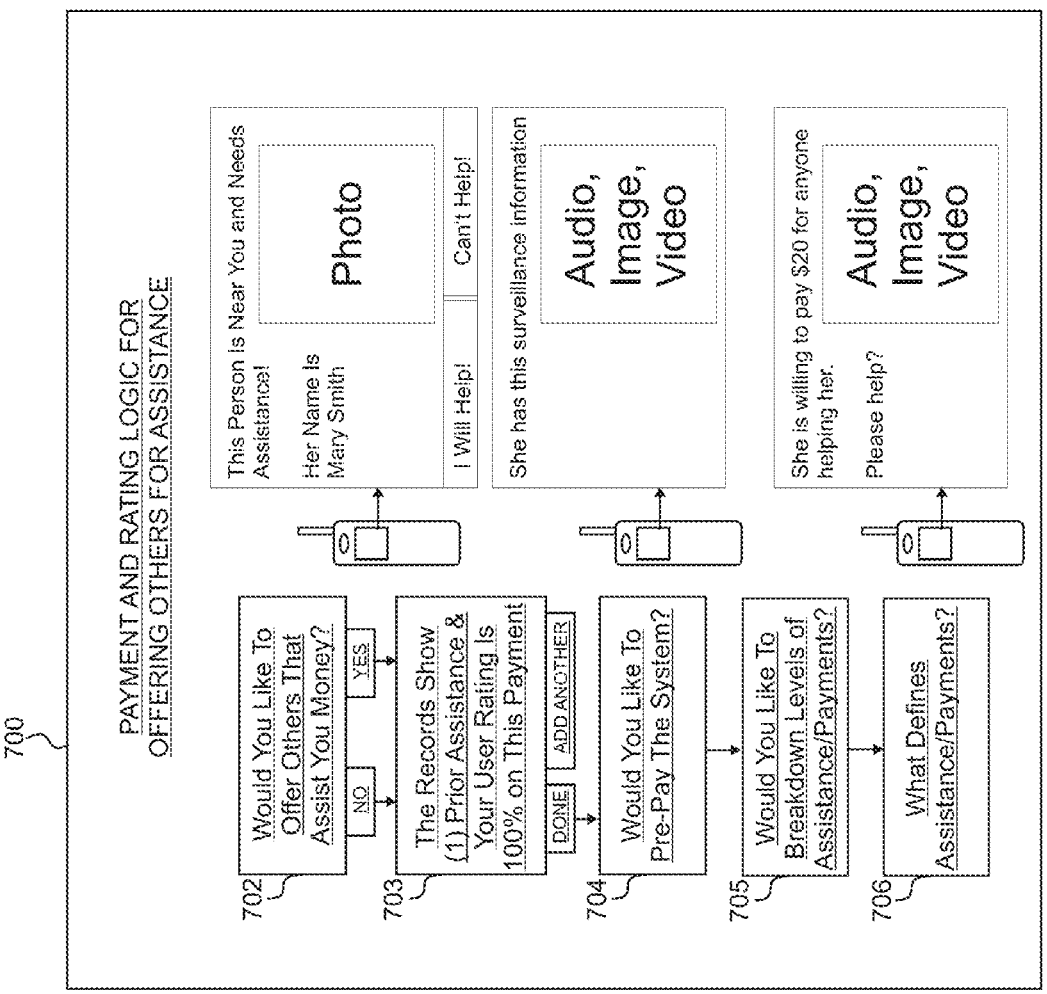
FIG. 13 is a diagram of payment and rating logic that may be employed in an IPSS system.

FIG. 13 is a diagram of payment and rating logic that may be employed in an IPSS system 10 associated with a WCD 31 enabled with image or video capabilities. As indicated in this diagram, the IPSS system 10 may be designed with payment and rating logic that causes the IPSS system 10 to send out information that will help a recipient WCD user to determine if the recipient WCD user will or should help the requesting WCD user. The information can include, for example, a payment or money offer for captured video or an image, a payment record or history if available, a prepayment system for having the payment already available for paying out to the requesting WCD users, information indicating if the person has a criminal record or has previously misused the system, an image of the requesting WCD user, a video or image of illegal activity, etc.

Figure 14:
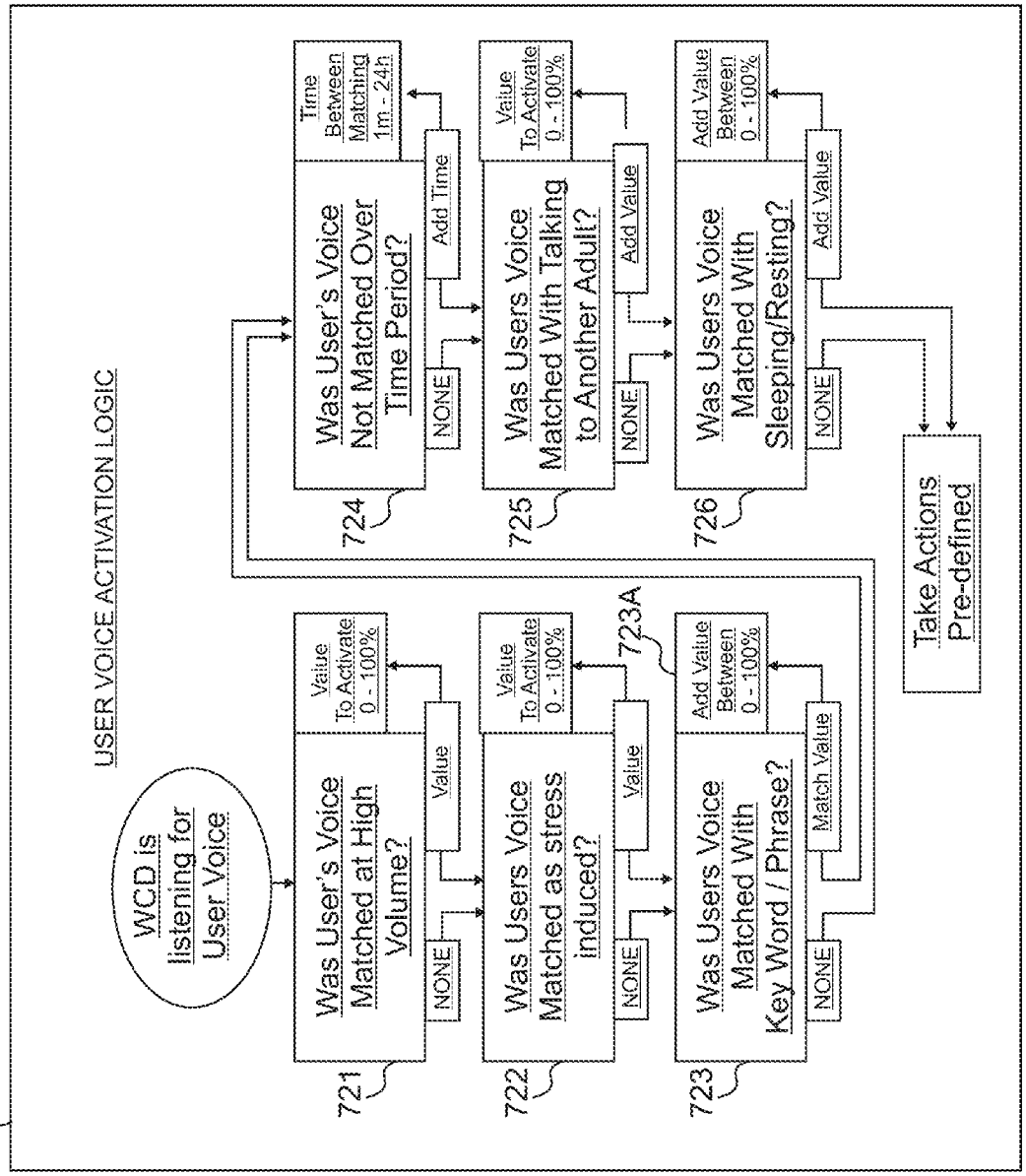
FIG. 14 is a diagram of user voice activation logic that may be employed in an IPSS system.

FIG. 14 is a diagram of user voice activation logic of the IPSS system 10 of the present invention as applied to a WCD 31 enabled with image or video capabilities. As indicated in this diagram, the user voice activation logic may listen for the user voice and then identify problems, security risks, or validation of normal activities. In some embodiments, the user voice logic may be designed to determine when the user voice is at a high volume or stressed, or when a keyword or phrase is mentioned. In some embodiments, the user voice logic may be designed to attempt matching for a preset time period and to take action when the time period expires without a match. In some embodiments, the user voice logic may be designed to match when the user is talking to another person or to match when the user is resting or sleeping.

Figure 15:
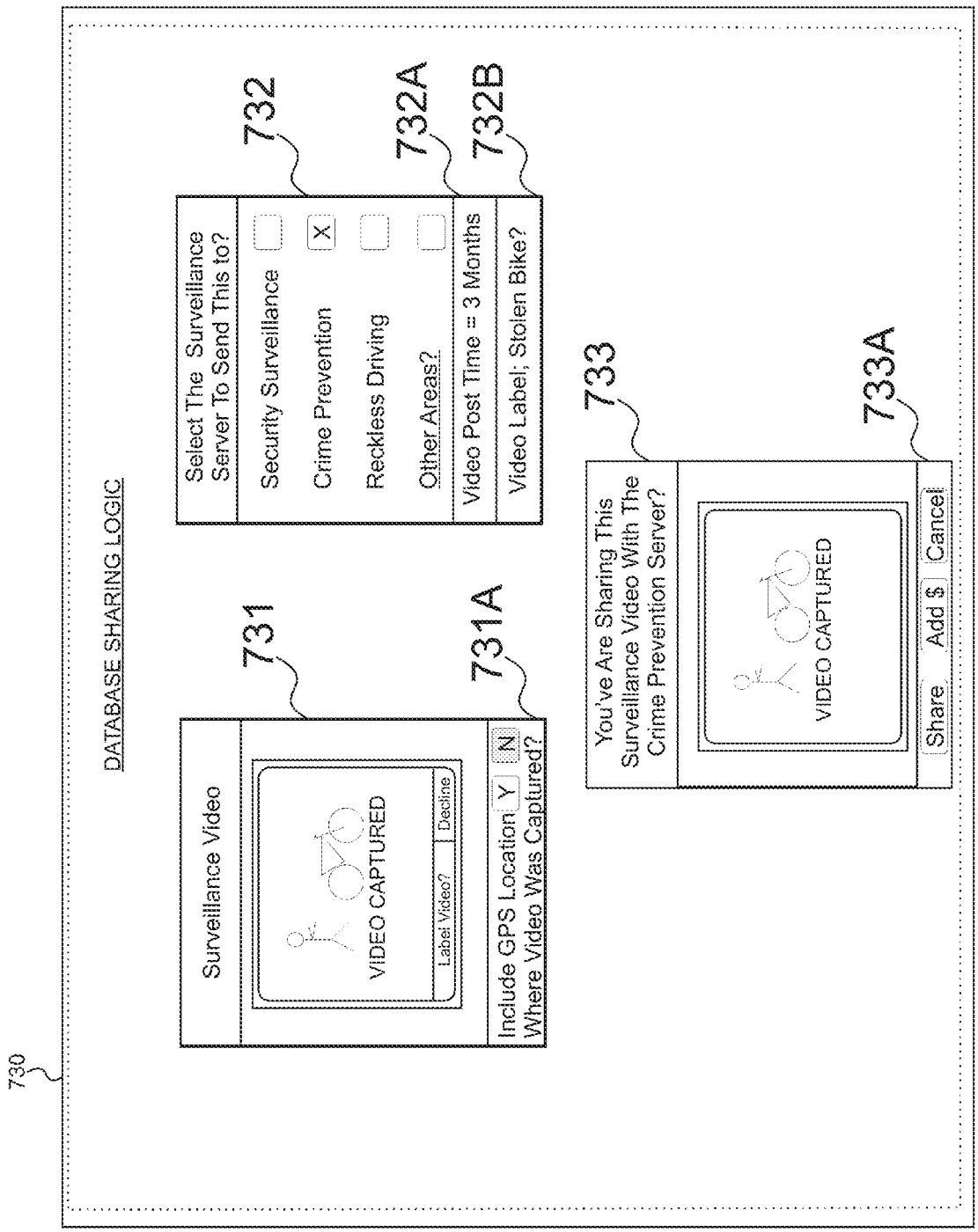

FIGS. 15 and 15A are diagrams of database sharing logic that may optionally be employed in an IPSS system 10 associated with a WCD 31 enabled with image or video capabilities. As indicated in this diagram, the database sharing logic of the IPSS system 10 may share or independently send surveillance information (videos, images, sound, sensor activity, user descriptions, etc.) to public "searchable" databases. For example, many WCD users will witness and capture criminal or other important activities. Supplying this information to individuals or authorities becomes almost impossible without searchable descriptions such as time-of-day, day-of-week, location, type of crime (stolen bicycle), and descriptive information that may not be captured within the surveillance information.

In some embodiments, the database sharing logic manages surveillance information as public, semi-public, and private. While many activities look like a crime or criminal activity, the person may be completely innocent. Therefore, the database sharing logic may identify activities as possible crimes and make publicly posted (or uploaded) surveillance information available to others that know a location, time or date, or other information pertaining to an activity. In some embodiments, the WCD user seeking random criminal activities must know part of the crime seen or crime in order to obtain the requested surveillance information.

Figure 16:
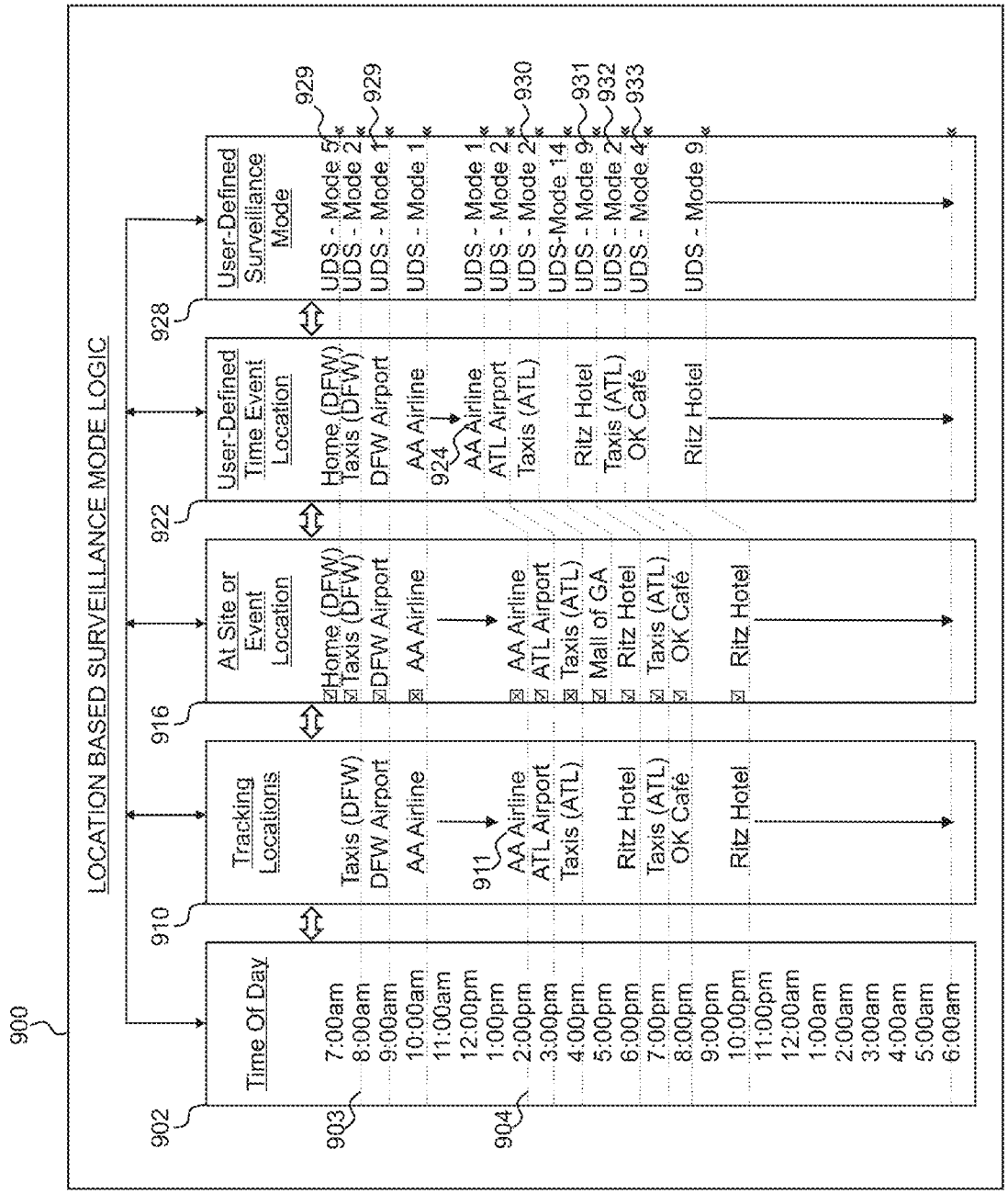
FIG. 16 is a diagram of location based surveillance mode logic that may be employed in the IPSS system.

FIG. 16 is a diagram of location based surveillance mode logic that may optionally be employed in an IPSS system of a WCD 31 that determines a surveillance mode based on the location of the WCD 31. As shown in the diagram, the logic uses different surveillance modes (SM) based on one or more tracking systems, onsite communication that identifies the user's location, and/or time, dates, or events. These different SMs are shown based on the user location.

As further shown in this diagram, the user can select or enter different SMs based on location. For example, the user can select or enter different instructions for surveillance, alarms, and actions for identifying problems for homes, taxis, airports and airlines, hotels, shopping, restaurants, etc. For at least the purposes of determining when higher/lower or different types of security is needed, modes may be changed by these tracking events.

Figure 17:
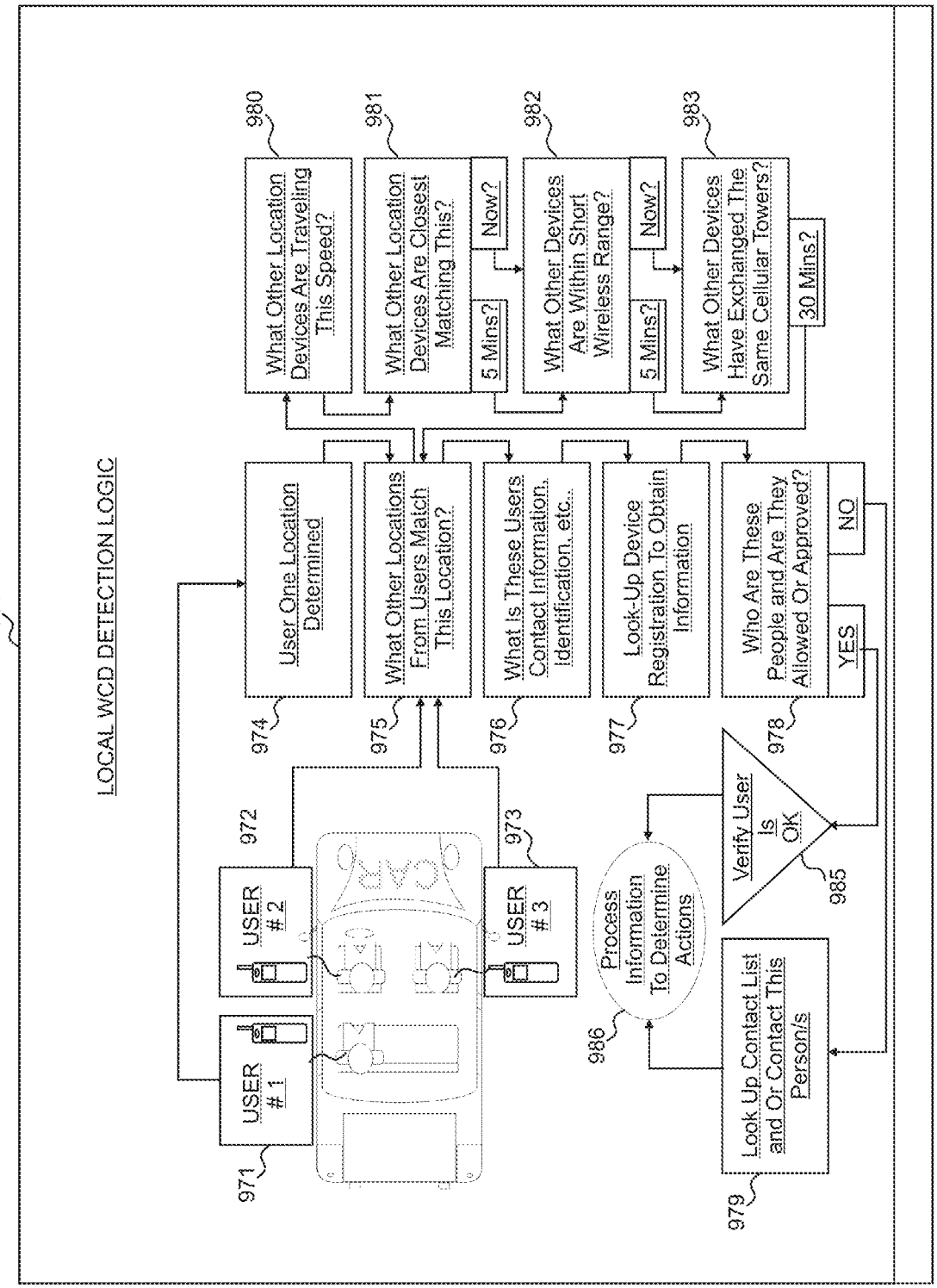
FIG. 17 is a diagram of local WCD detection logic that may be employed in the IPSS system.

FIG. 17 is a diagram of local WCD detection logic that may optionally be employed in an IPSS system of a WCD 31 for locating and identifying other WCDs 31 in its vicinity. As shown in the diagram, the logic of the WCD 31 uses different SMs based on one or more tracking systems and may use this information for determining what other people are also in close proximity to the WCD user. As shown in FIG. 17, by matching another person's tracking information with the WCD user location, one or more other WCD users riding in the same vehicle may be determined. After the other WCD users are determined, these other WCD users may be contacted by the IPSS system 10 or by authorities. Another example method for determining other WCDs 31 within a local area (car, room, distance, etc.) involves having the local WCD detection logic contact and obtain information directly from other local WCDs 31. It should be noted that capturing registration information and sending this encrypted information to the phone company for deciphering, is also a method for locating others within a close proximity.

FIG. 18 is a diagram of WCD screens that can be generated by graphical user interface (GUI) logic in the IPSS system for enabling a user to modify surveillance modes and activations. As shown in the diagram, the WCD screens allow the user to setup or change the IPSS system settings by storing user preferences. For example, the user may have a new work schedule and needs to modify the settings. Also note that the user may define these settings by maps or higher or lower known crime areas.

Figure 19:
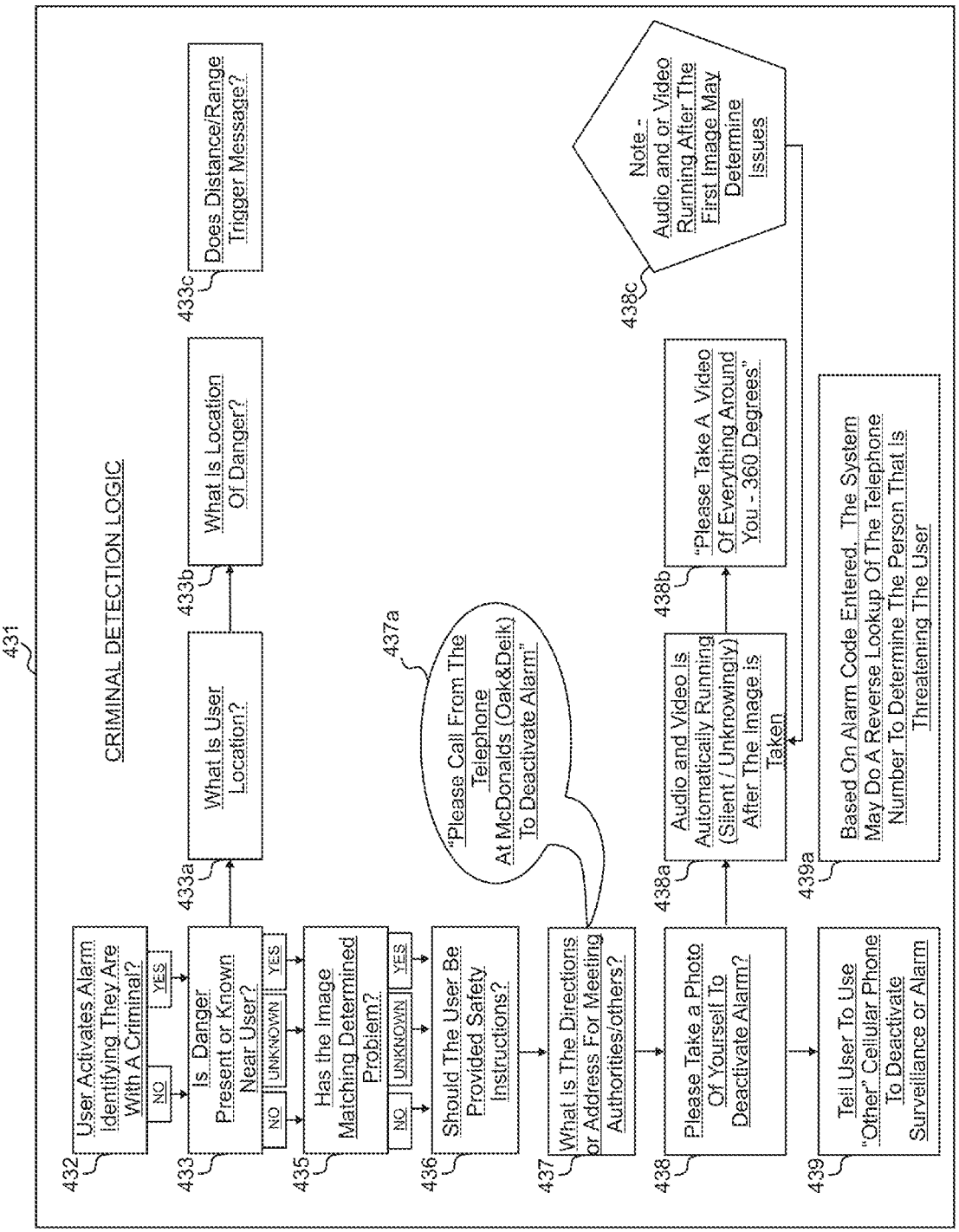
FIG. 19 is a diagram of criminal detection logic that may be employed in the IPSS system for enabling the WCD to detect and apprehend a criminal.

FIG. 19 is a diagram of criminal detection logic that may optionally be employed in an IPSS system for enabling the WCD 31 to detect and apprehend a criminal. As shown in the diagram, the logic uses the WCD 31 to detect criminal activity, confirm and obtain additional information about the criminal activity, and allure the WCD user and criminal to a capture area or an area that provides the user with a safer environment.

Figure 20:
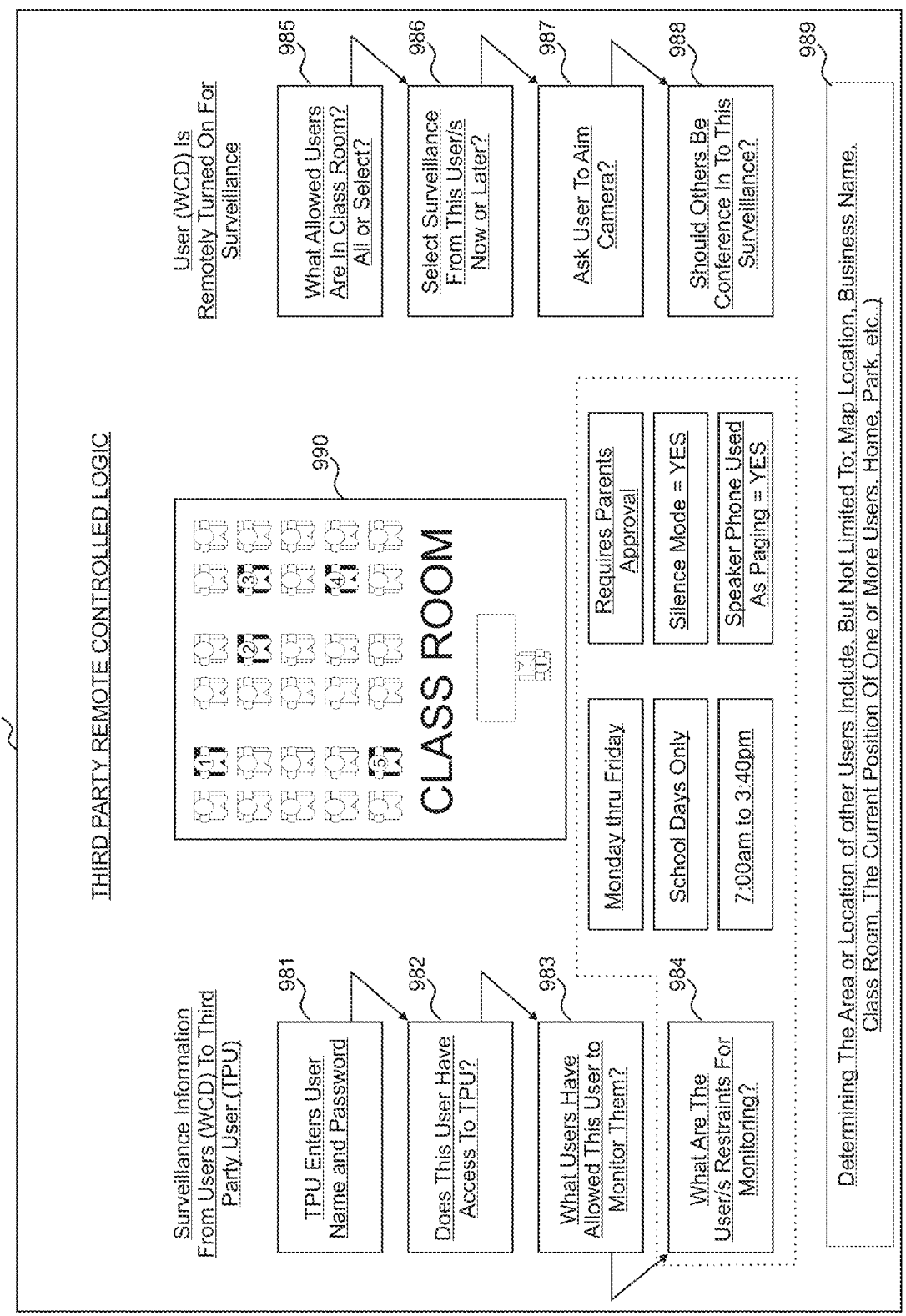
FIG. 20 is a diagram of third party remote control logic that may be employed in the IPSS system that shows how the system can allow third party activation, control, and monitoring of the WCD.

FIG. 20 is a diagram of third party remote control logic that may optionally be employed in an IPSS system that shows how the system can allow third party activation, control, and monitoring of the WCD 31.

Figure 21:
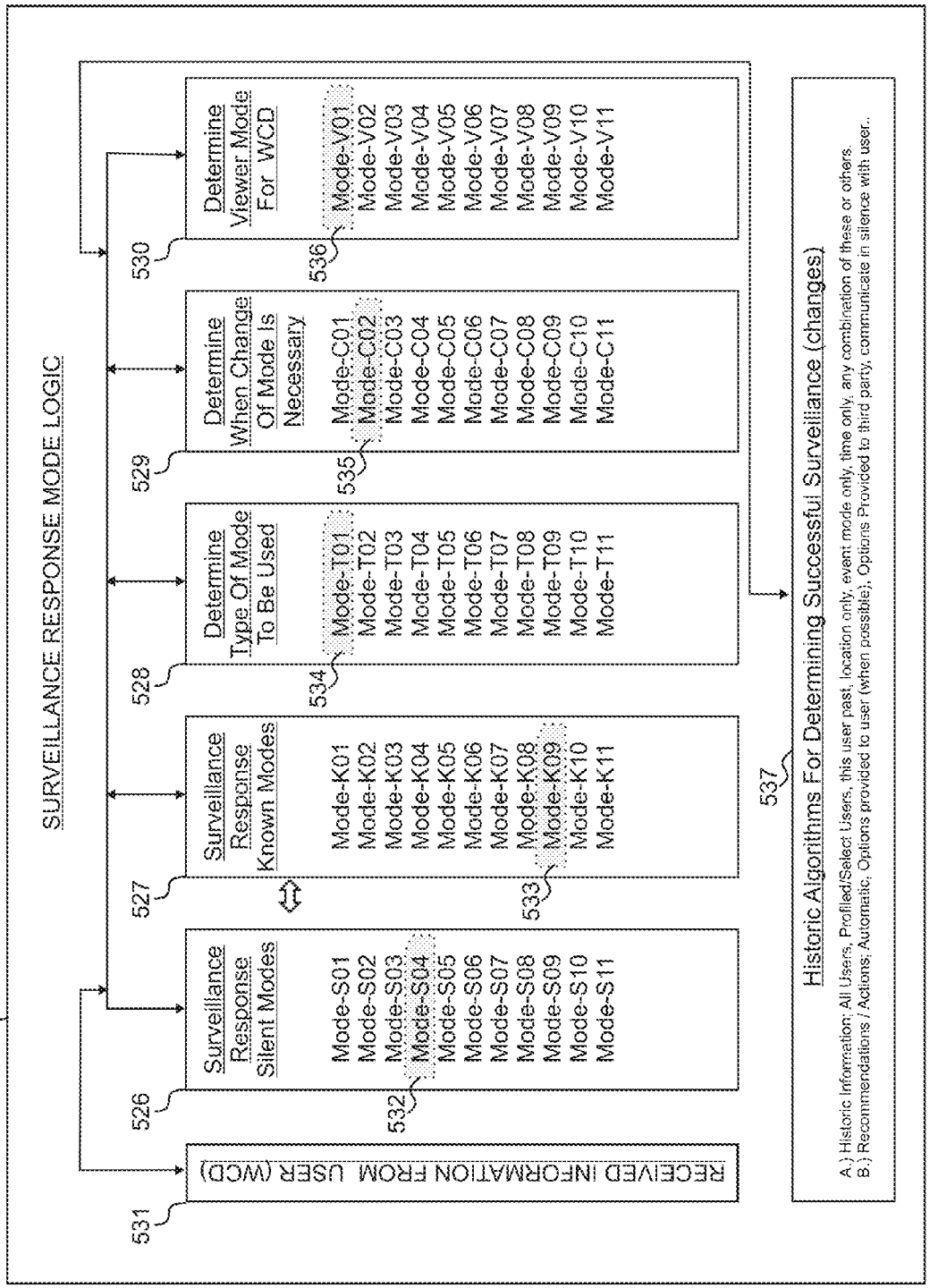
FIG. 21 is a diagram of surveillance response mode logic that may be employed in an IPSS system.

FIG. 21 is a diagram of surveillance response mode logic that may optionally be employed in an IPSS system 10 associated with a WCD 31. As shown in the diagram, the surveillance response mode logic determines surveillance response modes. Surveillance response modes may be dynamic and constantly changing based on the user location, time of day, safety or risk level, sensor activations, and many other factors. Surveillance response modes may include, but are not limited to, silent responses, known responses, control of the WCD 31 including the screen, lights, sound, camera, etc., and others. Algorithms for determining changes may also include historic successful modes, along with other current and user/system selected modes.

Figure 22:
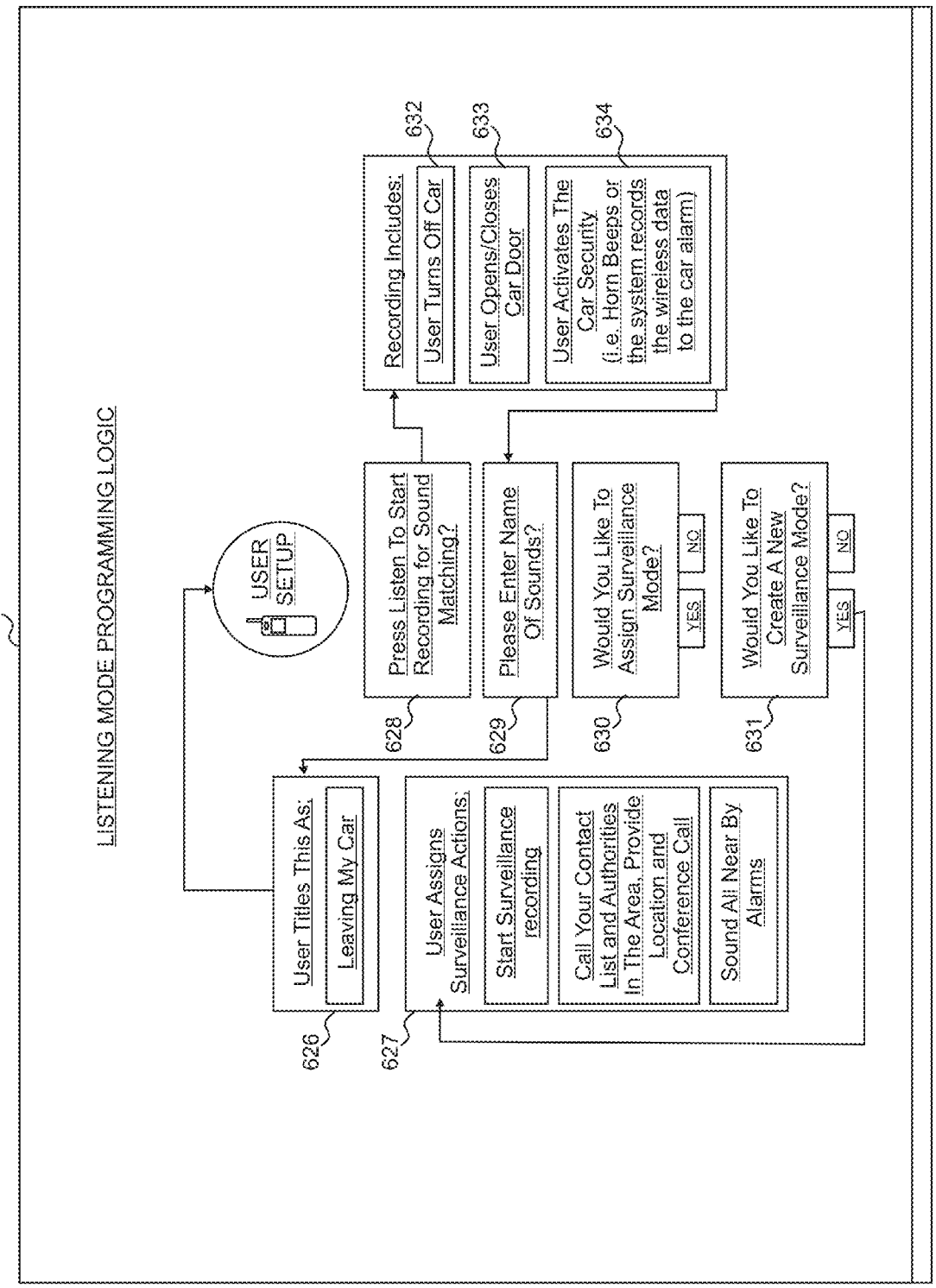
FIG. 22 is a diagram of listening mode programming logic that may be employed in the IPSS system.

FIG. 22 is a diagram of listening mode programming logic that may optionally be employed in an IPSS system 10 for enabling the programming of one or more listening modes. As an example, this diagram shows how the listening mode can be programmed. The user programs it for "leaving my car" and automatically identifies specific sounds (e.g., engine turning off, car door opening and closing, and the engagement of the car security system).

Figure 23:
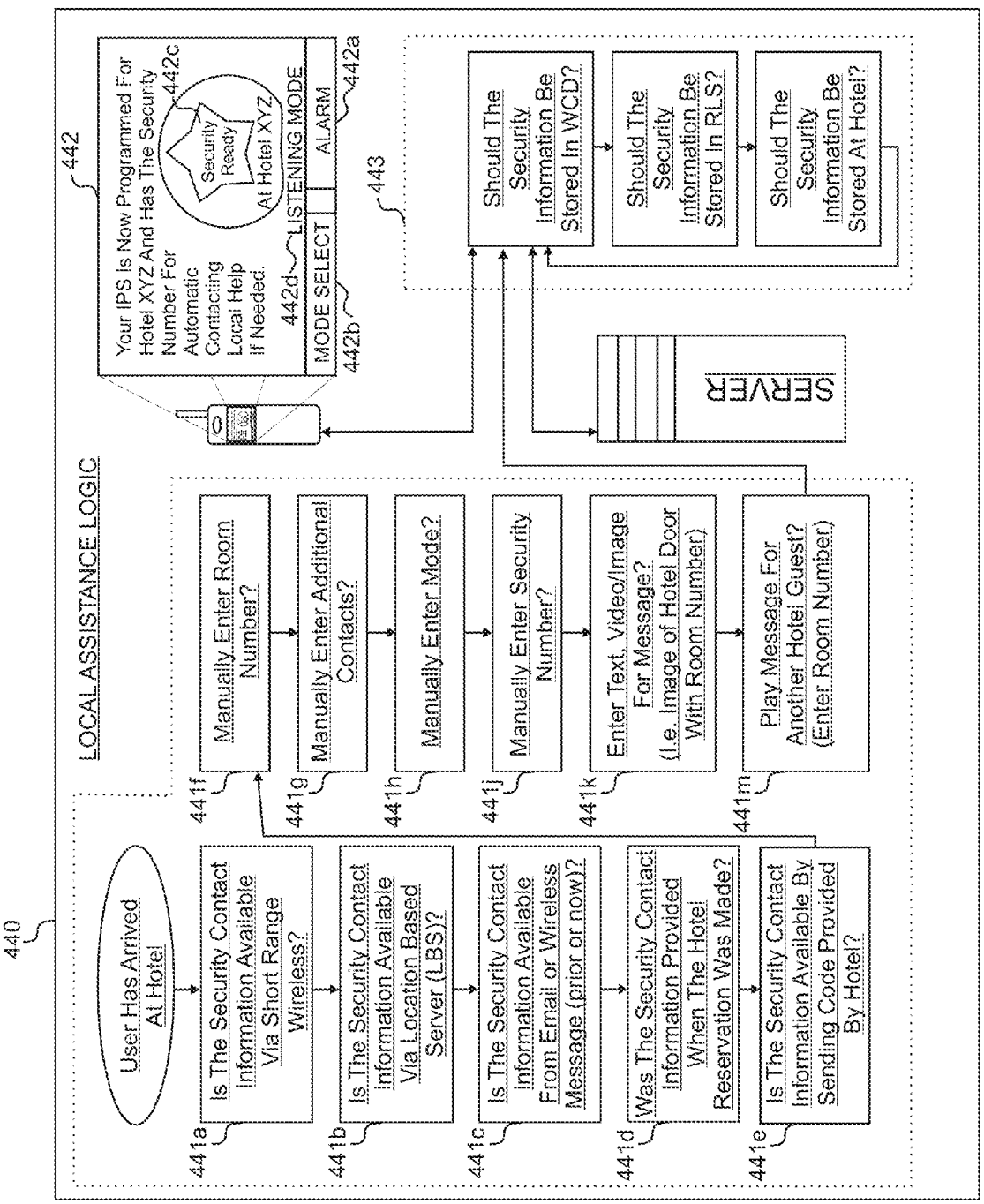
FIG. 23 is a diagram of local assistance logic that may be employed in the IPSS system.
Figure 24:
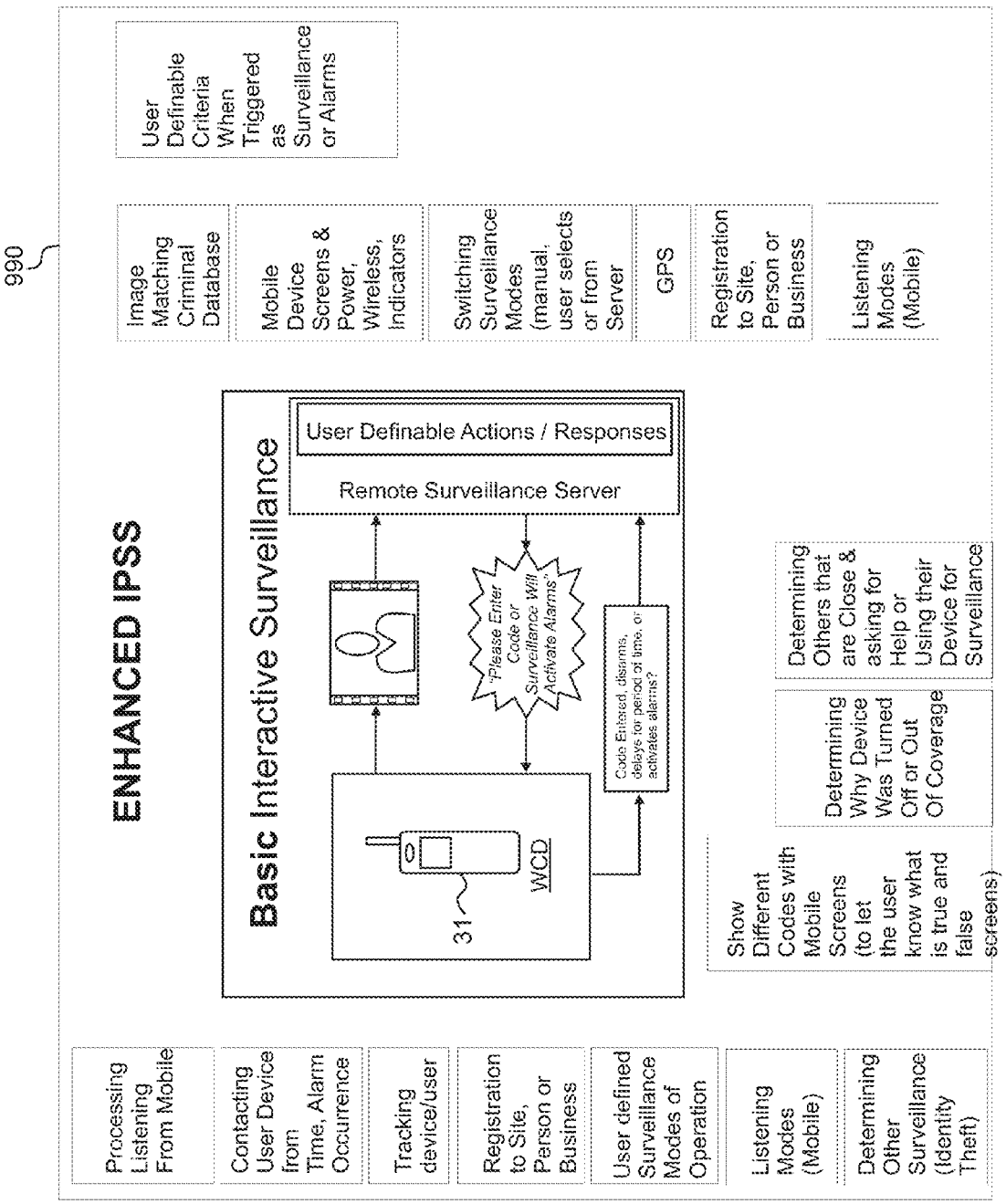
FIG. 24 is a diagram of enhanced IPSS logic that may be employed in the IPSS system.

FIG. 23 is a diagram of local assistance logic that may optionally be employed in an IPSS system for determining and preparing for close range assistance (when needed). This feature of the present invention allows the IPSS system 10 to quickly contact help that is close to the user. This diagram shows some of the methods for obtaining and sharing contact information. When an activation of an alarm occurs, the IPSS system will already be programmed with local contact information. In some embodiments, when an event causes an alarm, such as but not limited to, the WCD sounds an alarm, other nearby alarms are activated, other WCDs 31 associated with parties that are willing to help strangers close by are called, the police are called, a conference call is made, video is sent from the user WCD 31, mode changing based on events and time can occur, etc.

I. Specific Applications

Another aspect of many of the embodiments is the capability of capturing/taking surveillance information and remotely storing and/or processing the surveillance information away from the WCD 31 (that could be destroyed, disposed of, or damaged) in a safe area.

It may be desirable for a person to tailor the person's own automated personal surveillance system to meet the person's own personal needs and requirements. Effective surveillance must match each user's needs by fitting into the user's own environments, daily lives, activities, everywhere and all the time. In some embodiments, the user will be able to select, at least in part, how the surveillance system will determine when actions are needed to help or assist the user. Through a user-definable online area within the system it may be programmed differently at one location over another, when traveling, time of day, day of week, when near known criminals or high crime areas, when codes are entered or not entered when required, listening modes, allows another friend or person to receive live or recorded surveillance information for making a determination when authorities or help is needed, allowing others to remotely operate your surveillance WCD 31, allowing others users (parents) to program a particular surveillance mode or complete operation (for children), possibly through specialized WCD screens showing or not showing the operation of surveillance, contacting other near-by-users or closest authorities, activation of other surveillance systems, make the WCD 31 operational but have it seem to be in an off position, activate alarm sounds and lights, provide samples of surveillance information back to the WCD 31 and more options that allow this system to meet each users specific needs.

Criminal actions normally include a plan to get around people, systems and authorities, but the present invention provides embodiments that make it almost impossible to get around its security because every IPSS system 10 acts and reacts differently, based on each user's preferences or at least codes. As example, one users action may turn on/off the alarm or another person's IPSS may activate/deactivate an alarm. A user entered code that seemingly is turning off the IPSS system may actually turn on a silent or other alarm.

Another example of an embodiment involves a user being approached by a stranger on an isolated street. The user activates the surveillance by pressing a button or with an audible voice command and discretely (or obviously) aims the camera at the individual as the individual approaches. The information is sent to RLS 12. Based on the user defined personal criteria, the system may notify others within, for example, 15 minutes, if a deactivation code is not entered, or call/message the user back with or without another person knowing, or listen for the users "key phrases or loud voice" to immediately activate alarms.

Another example of an embodiment involves a user exiting a mall and walking to the user's car. The IPSS system 10 may manually or automatically (via location, tracking, sensors or wireless acknowledgments at the mall door) go into an active mode such as "listening" for the users voice as in key phrases ("what do you want, help, stop, don't, police, get away, etc.) or higher volume (screaming, yelling, etc.). Once the system determines the user needs help, it may contact the local security, police, friends, or other individuals near to the user. The interactive system may have the users alarm sound, trigger other alarms near by (car alarm/s, cellular phones, spot lights in areas, etc.), or turn on the speaker phone with 911 or other emergency agency person asking "is everything all right" or "police will be there immediately".

Some embodiments link this IPSS system 10 to home and business alarm systems. As an individual checks for noises or indications that an intruder may be inside the individual's premises, the IPSS may engage the activation of home and business alarm systems. The IPSS may go into this mode automatically based on location (e.g., GPS, logging into Wifi, sensors, etc.) or information determining a zone, once the user activates surveillance the system automatically starts sending audio, images and/or video to the RLS 12. It also may use the IPSS WCD 31 to respond back to the user and ask the user if they are ok, the user must input the correct code, voice match, or other acknowledgement, this cycle continues until the user enters a code and selects cancel surveillance. If the user does not respond, then the system will activate alarms and follow preset or user defined guidelines.

Another example of an embodiment involves a user catching a taxi in another country. The user, before getting into the taxi, activates the user's surveillance system and captures the license tag, driver's face, and posted taxi's license-of-operation. This information is sent to the RLS 12 and the text and images are annualized (OCR—optical character recognition, automatic number plate recognition (ANPR), face recognition algorithms for matching normalized gradients or others facial differences/similarities, etc.) identifies/verifies the taxi company and the drivers information. The drivers face may be sent to a database for criminal matching. The users may have programmed the system to place the WCD 31 into listening mode for matching "key phrases", determining stress within the voice, high volume speech, or any audible indicator from the user. In this case, the user has set-up many key phrases and without the driver knowing the activation the phrase "I'm not telling you again, Stop" is matched. The system has automatically previously determined the taxi company name and phone number, and has contacted the authorities (police), taxis company, driver and the user all on a conference call. Or in some cases an automatic message is played explaining the surveillance and the activation which identified the individual driver and company. The message explains "unless the user enters a deactivation code within 3 minutes the closest law enforcement will be notified". Because the user's WCD 31 or the taxi has GPS the message also mentions the taxi current address.

Another example of an embodiment involves a user activating the user's IPSS system, and the IPSS system is preprogrammed to contact one or more other users that are close by, and to activate their surveillance systems if they see the individual within the photo/description. If another user identifies the user within the photo and/or description, they will press a button that sends this information to the user's account (identifying one or more events of the same subject) that's requesting the information. It also should be noted, automatic payment or reward postings (such as $25 more/less) may also be included within the notification for actively engaging others to look for individuals.

Another example of an embodiment involves preprogrammed messages that are played to people or organizations when the surveillance is turned on, triggered, or security levels are increased/decreased. This feature may include a manual or automatic mode (security level) changes for sending different messages based on the time, location, or user activity. For example, "this is a surveillance message from John Smith. My location is the corner of Atlantic and Delk Road and I need help. Please come quickly and/or contact the police. Also, if my WCD 31 is turned on, please wait and you will hear live conversations between myself and anyone else within hearing range.

Some embodiments may include the ability to use 'other recording" devices or surveillance systems. As an example the system may provide the WCD 31 with an indicator (green light, map with location, etc.) showing where other surveillance systems are located. This information may be determined many ways, but an easy method is to have the RLS 12 check the company or business name, registration of surveillance devices/systems, and other IPSS users.

Some embodiments may incorporate a surveillance information protection (SIP) system that will not allow users to delete or change surveillance information. A predefined time period (1 to 20 years) where the IPSS system 10 or user cannot delete any surveillance information. This feature is used to keep criminals from demanding that the users delete surveillance recorded illegal activities. As an example, in a case where the user is forced to log-into the system and attempt to delete the recorded illegal activity information, the user may start the log-in procedure, enter a user log-in name and then while inputting the user's password, enter all the numbers or letters correctly, except one (or two or more, or a special code). This will activate a false response to the user that the information was deleted, or the information may be deleted from a certain location (e.g., library, local business nearby, etc.), while actually contacting authorities and telling the authorities where a criminal will be taking the user. The system will follow the predefined instructions set forth by the user and/or system.

Some embodiments may include an alarm feature. User activation of an alarm may be accomplished when a button is held down and then released. For example, the IPSS system 10 captures an image or video and sends this information to the RLS 12 when the user pressing the hot-key on the user's WCD 31, if the user releases this key and does not enter a cancel or repeat delay (5, 15, 30, or 50 minutes), then an alarm is activated.

Some embodiments may have the ability to disguise or hide alarms surveillance when activated. Another optional feather is the ability to interact with the WCD 31 that may assist the user (e.g., to negotiate or deal with criminal activity). This feature may indicate false screens on the WCD 31, for example; high level of wireless coverage (bars or meter for signal strength show good when actually no wireless is available), information was already sent (maybe even a review of part of the information supposedly sent), maybe a response that stays within the phone but seems to be coming from the RLS 12 or authorities (e.g., "your surveillance information was received and Authorities have been notified to your location—help is on the way"). It should be noted that only the user will know the difference between a fake or false screen and may have already programmed the messages that come onto the users screen (within the phone or RLS 12).

Some embodiments include software or firmware that after the activation, if the WCD 31 is turned off for a period of time or until the IPSS system 10 is deactivated, the IPSS system 10 will automatically turn the WCD 31 back on. This software is normally located within the WCD 31, but it is also accomplished by the RLS 12 communicating with the WCD 31 in silent, sleep and wake-up, or time based health type checks verifying the WCD 31 has not been destroyed or its battery removed.

In some embodiments, another call or text message is initiated to the closest cell phone(s) (location based) and the contacted party is informed of the surveillance activation. For example, if a user activates the IPSS system 10 in a taxi, the contact information of the driver of the taxi would be determined and called and be told of the surveillance, the driver's name identified, authorities are/will be notified, and the importance to follow the instructions of the user (riding in the taxi). This may also trigger another call to the taxi management and offer the taxi management the opportunity to review the surveillance recordings (normally after the individual is known to be safe or when authorities or system management feel this action is appropriate).

Some embodiments may include a location based IPSS system 10, which allows activation of other WCDs 31 that are in close proximity to the individual who has activated the surveillance. For example, other WCDs 31 capable of sending audio, images or video may be remotely turned on (or a request the user for allowance). A user may have an automatic setting that allows WCD 31 to be remotely turned on or, the user may want to be prompted or the user may refuse any surveillance information from the user's WCD 31.

Some embodiments may include a response check-in (RCI) feature. The WCD 31 allows the user to activate and enter a time for the RLS 12 or WCD 31 to check back with the user for verifying safety. The user may be required to enter a passcode or have a voice match or a key word voice match.

Some embodiments may include an automated programming listening mode. The listening mode is capable of capturing sounds and/or wireless communication from others systems and devices and allows the user to name, identify or associate these sounds or communication with a mode or action that helps the system determine the users environment. For example, the user's IPSS system 10 may record turning off the user's car engine, opening and closing the car door, and/or then setting the car alarm. The capturing of the car alarm may be a sound (such as the car horn, alarm chirp or other) or the capture of the wireless key security information sent wirelessly to the car's alarm system and IPSS system 10. Then the system may automatically change the surveillance mode [to walking] and based on time of day or the use of location technologies determine the condition [safety] of this area to walk thru and adjust the surveillance mode accordingly.

Some embodiments may be designed to send surveillance information to one or more public servers (areas) that are accessible and/or searchable by internet search engines. When the user summits uploaded (or directly sent) surveillance information to the public RLS 12, the surveillance videos, images, and/or audio includes at least one or more of these searchable areas, location, address, date and time, event name or category, and/or name describing video. When a user, as an example, finds the user's car broken into, the user can go to this website and enter the location, date, and time to see if anyone has photo's or videos, or other information about the event. If someone has surveillance information, then the information will be available from most common internet (or other) search engines.

It should also be noted that IPSS systems 10 may incorporate basic functionality, such as sending an email or electronic message with images or video, the message recipient software automatically processing the text within the title, sender address or other areas and automatically taking additional actions. These actions may notify others with the surveillance recording and ask them to take additional measures. Or, the system may respond back to the user with automated procedures and unless "deactivated" with a code, word or phrase the system takes additional measures to help the user.

II. Software Installation And/Or Setup On User WCD

The WCD 31 can be configured by the RLS 12. An example of the software options are as follows.

* Please identify your WCD 31 from list or enter model number.
* RLS 12 sends (uploads) surveillance software to the WCD 31
* Configuring software during installation (User's WCD 31, RLS website or both);

1.) Does your phone have an extra memory card? Y/N—If Yes what is size?
2.) Does your phone have a camera? For video and pictures both? Still images only?
3.) Does your phone have GPS or other location technologies? Y/N
4.) Does your phone have sensors, such as motion, light, Glass break, sound identifying, impact or others? Y/N/Do Not Know
5.) Does your phone have text messaging? Y/N
6.) Does your phone have internet access? Y/N
7.) The software will do a system check for determining more features your phone has to work with the IPSS system 10. Part of this system check will determine; the battery life per full charge cycle, communication options and abilities, if the WCD screen may be modified when surveillance (silence mode) and alarms are activated.
8.) Will you allow the surveillance software to stop the phone from being powered off, when alarms or surveillance is activated? Y/N (More Information—This feature stops anyone, except yourself from turning off and stopping your alarms and surveillance. You will be required to enter a code to turn the phone off when surveillance or alarms are activated.)
9.) Will you allow the surveillance software to control your WCD screens, lights and indicators? Y/N (More Information—This feature allows the RLS 12 and the WCD 31 to manipulate the WCD screen/indicators to imitate power off screens and looks, offer onscreen information and assist you in many ways when or if needed.)

10.) Select one or more hot-key/s for activation of Listening-Mode (LM)? (What is Listening-Mode?) This feature allows your voice and sounds to be monitoring for the activation of surveillance or alarms. For example, you say "help me" and this phrase activates an alarm. You may add as many phrases as you would like and tell the IPSS system 10 what to do afterwards.

11.) Select one or more special Hot-Key/s for activation of surveillance

12.) Select one or more special Hot-Key/s for activation of the alarm feature. You may select the same key as the surveillance activation but pressed three or more times in a row.

13.) Would you allow the phone to be programmed with sound matching? (More Information) This feature allows the IPSS system 10 to learn sounds and wireless data to match them with your own user-definable actions. For example, the sound of the car turning off and open door sound (bell ringing), will identify you existing your car and your IPSS system 10 could go into a higher level of security than when you were in your car traveling.

14.) Would you like the system to verify its working? Y/N (more information) Because the WCD 31 interacts with the RLS 12 for sharing information, it is recommended that all of the foregoing features be employed to provide redundant checking and control of communication. More specifically, the system menu within the RLS website offers scheduled communication checks between itself and the WCD 31 carried by the user or the setting may be defined within the WCD 31. It is recommended that communication is verified, based on time of day/night and activities. If this setting is set to global and communication is verified evenly 24/7 then 10 minutes to 1 hour is recommended.

15.) Would you like to activate the learning mode of the system? Y/N (More Information) The learning mode offers onscreen selections for helping the system identify and verify locations, businesses, transit, walking areas, friends places, and areas or events you encounter. For example, while traveling on the transit bus scroll down and select "Bus", the system may ask you additional questions such as, "do you ride the bus each day? Monday thru Friday? Please enter the time periods you travel on buses. Do you always travel to the same stops? This information is then shared with the RLS 12 and a surveillance mode will be assigned to this action. For example the surveillance mode may be listening for key phrases such as "get away from me", "security", "help me", etc.

16. Please allow the ring-tone "alarm" to be installed within your phone. (More Information) The ring-tone alarm is a special sound that is used when the surveillance alarm is activated. Additionally, if the special sound is heard (or data is shared) by other users' systems, their alarms (if sound matching is enabled) will be activated as well.

III. WCD User Interface Operation

After the software is installed, a tutorial is initiated on the WCD screen, and it asks the user to follow the basic (normally 4 minutes) or advanced (normally 10 minutes) instructions and final setup procedures. The user enters a user name (Mary Jones) and a password (12345678). As this is entered, the WCD 31 attempts to connect and verify the account and communication with the RLS 12. After this is verified, the IPSS system 10 starts the interactive programming process.

The user reads from the WCD screen phrases, such as; "Security, Security Guard, Police, I need Help, Get Away, and other preprogrammed phrases and the users voice is matched with each phrase. Then the system asks if the user would like to add any additional phrase? The user may type in the phrase and then record the word or phrase.

Next, the user will be shown possible surveillance modes. These are actions to take when particular events occur, etc. Surveillance modes are normally associated with one or more criteria, such as; risk levels, user activity, actions based on activity, interactions for changing the current status of surveillance or alarms, or many other possible circumstances of the user.

The user assigns an action with a phrase;
** Listening Phrase="Security Guard"
** Surveillance More="Level 4"

"When you mention the phrase "Security Guard", these actions will—[(1.) automatically or (2.) prompt you first or (3.) display on screen with count-down with/without sound prompts, then automatically activate unless cancelled with a code]—Activate a level 4 surveillance mode of programming; Level 4 includes start recording, make surveillance known by alarm sound, stop alarm sound and turn on speaker phone when connected with 911 or other security or monitoring agency.

In the example above, when the user's WCD 31 is in listening mode and hears the user's voice say "security guard," the phrase activates a level 4 surveillance mode. This activates a live recording of audio and video, sounds periodic alarms, sends a message to the RLS 12 to notify the closest security (mall security guard or 911), and turns on the speaker phone when the security agency answers the call from the RLS 12.

With reference to the surveillance modes, essentially an endless number of modes are possible, although the system normally provides a preset template of normally between 3 and 10 modes. In many cases, the modes are modified to include or exclude actions and are renamed.

Also, the WCD 31 and/or RLS 12 of the IPSS system 10 can be designed with a learning mode that asks the user questions as it receives sensor inputs ("are you walking" or "snow skiing") or observes images. The process may ask the user, if this sound or image name is correct; (as an example—"was this sound your transit bus?" Or "was this sound your home door bell ringing?" Or "is this sound street traffic or cars as you walk?" This allows the sounds to be matched more accurately with modes of surveillance. While modes are matched with many things (location, time, etc.) this helps to cross reference or provide the best decision if it's the only element available.

IV. Sharing Surveillance With Public RLS.

The IPSS system 10 can be set up to capture surveillance information to help the user and to keep the information private, but sometimes it may be used to help or assist others. Second party surveillance recordings (recording of others or crimes not involving the user) can be sent to a public (searchable) RLS 12, database, or internet website, and these user captured recordings can be accessed by victimized individuals. For example, if a user captures surveillance information that may or may not involve a crime, such as someone breaking into a car, someone breaking a lock and taking a bike, or a strange or suspicious van parked in a driveway, this information can be posted or otherwise made accessible on an internet assessable website (automatically sent to search engines) and made available to anyone seeking evidence of an activity. In some embodiments, users that upload content can be paid for such content.

To post this information on a website, the user selects "send to public website" on the WCD user interface screen and then enters a user password. Additional information such as time, date, location, etc., may be automatically sent and other details may be manually entered.

V. RLS Online User-Definable Surveillance Preferences

In some embodiments, the user can define one or more surveillance preferences, a few of which are set out hereafter.

Automatically Determining Modes and Changes to Modes of Operations (security level or operational changes)

- automatically determines user activity through sensor activities, manual inputs or both (i.e., user is in car/bus—determined by GPS travel speed of 50 mph, user is jogging—determined by accelerometer sensor movement and/or algorithms and/or GPS travel speed, etc)
- Automatically determines safety level of user location or ask user first (GPS location matched with area, such as Mall parking lot, bank machine (ATM), high or potential crime area—determined by census bureaus data,
- The IPSS system 10 automatically determines safety level by time of day Automatically Communicates With RLS 12 or ask user first when

- Sensor input(s) causes alarm to be activated
- Mode level starts Remote Surveillance Monitoring (RSM)—(alarmed or no alarm can occur)—when a user is within a high risk area, Remote Surveillance Monitoring (RSM) may be used without alarm activation
- Sensor determines user activity (biking, running, not moving, etc.)
- RLS 12 automatically communicates with WCD 31
- attempting to verify user status (need help, help not needed, is system working, etc)
- changing the mode or safely level
- informing the user of potential risks (WCD 31 may vibrate (or audible sound/image) when user is in a high risk area, near a recent crime, etc.)
- informing the user of a person or vehicle and/or image, to look for (criminal, person willing to help (police, individual near by, security, etc.), vehicle that was stolen or involving a crime,
- Informing the user of directions to the closest law enforcement or safe area such as an embassy, or high traffic area such as a mall, store or other.
  - Informing the user directions by vibrations for which turn to make (one long vibration informs the user to turn right and repeated short vibrations informs the user to turn left)—this allows a person walking or running away from potential danger
  - Informing the user directions by speaker phone via audible directions
- Acknowledging surveillance and/or security measures are activated
- Instructing the user in how to help (i.e. point camera at criminal, show criminal the images sent to RLS 12 which cannot be erased, etc.)
- Showing screens for the criminal to view (law enforcement arriving in 2 minutes and 12 seconds, images have been sent to local law enforcement, etc.)
- Engaging telephone or video conferencing between the WCD 31 and RLS 12 and/or third party person or agency.

VI. WCD Architecture

Figure 25A:
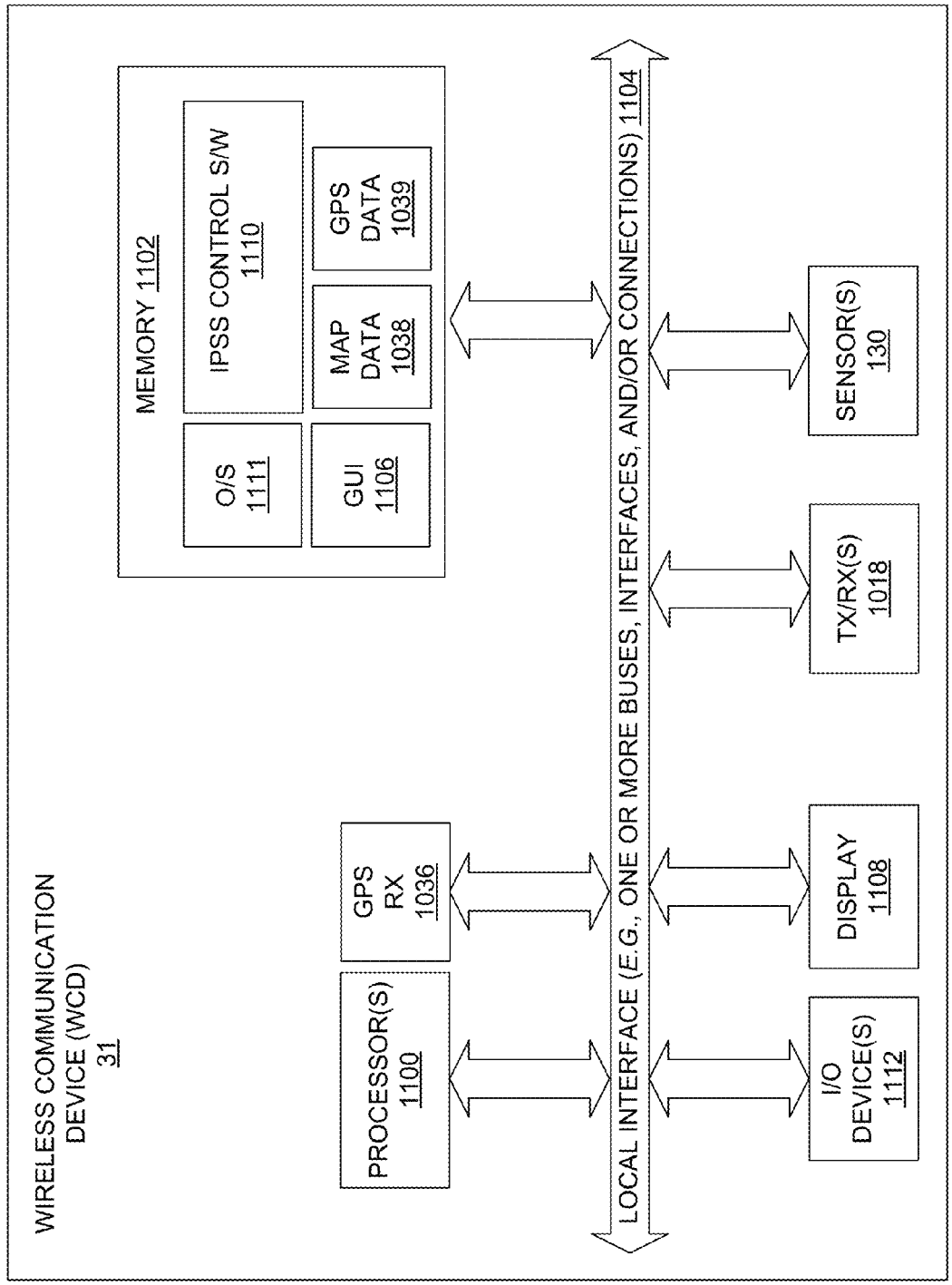
FIG. 25A is a diagram of an example architecture of the WCD.

FIG. 25A is a block diagram illustrating an example of a WCD 31 with a computer based architecture. In this embodiment, the IPSS system 10 is implemented in computer software (S/W) 1110 within the WCD 31.

With reference to FIG. 25A, the WCD 31 includes at least a processor(s) 1110, such as a microprocessor, a memory(ies) 1102, a transmitter(s) and/or a receiver(s) (TX/RX(s)) 1018, and a sensor(s) 130, for example but not limited to, an accelerometer, a gyroscope, a magnetometer, a pressure sensor, a GPS receiver, a microphone, an altimeter, a heat sensor, a humidity sensor, barometer, gas sensor, air quality sensor, chemical sensor, radiation sensor (dosimeter), light sensor, proximity sensor, etc. All of the foregoing are communicatively coupled via a local interface(s) 1104.

In terms of hardware, the memory 1102 comprises all volatile and non-volatile memory elements, including but not limited to, RAM, ROM, etc. In terms of software, the memory 1102 comprises at least the following software: an operating system (O/S) 1111 and the IPSS control software. The computer program code (instructions) associated with the software in memory 1102 is executed by the processor 1100 in order to perform the methodologies of the present disclosure.

In terms of software, the memory 1102 includes the IPSS control software 1110 and an operating system (O/S) 1111. The memory 1102 may further include a graphical user interface (GUI) 1106 as well as map data 1038 and/or GPS data 1039 (or other location data) that may be utilized in connection with the methodologies described herein.

The IPSS control software 1110 (as well as the other computer software and software logic described in this document), which comprises an ordered listing of executable instructions for implementing logical functions, can be embodied in any non-transitory computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable medium" can be any means that can contain or store the program for use by or in connection with the instruction execution system, apparatus, or device. The non-transitory computer readable medium can be, for example but not limited to, an electronic, magnetic, optical, electromagnetic, infrared, or semiconductor system, apparatus, or device. More specific examples (a non-exhaustive list) of the non-transitory computer-readable medium would include the following: a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) or DVD (optical).

The WCD 31 may be equipped with a user input device(s), a user output device, or a combination thereof, denoted by I/O device(s) 1112. For example, the WCD 31 may be equipped with a keyboard (soft or hard), a display, etc.

VII. RLS Architecture

Figure 25B:
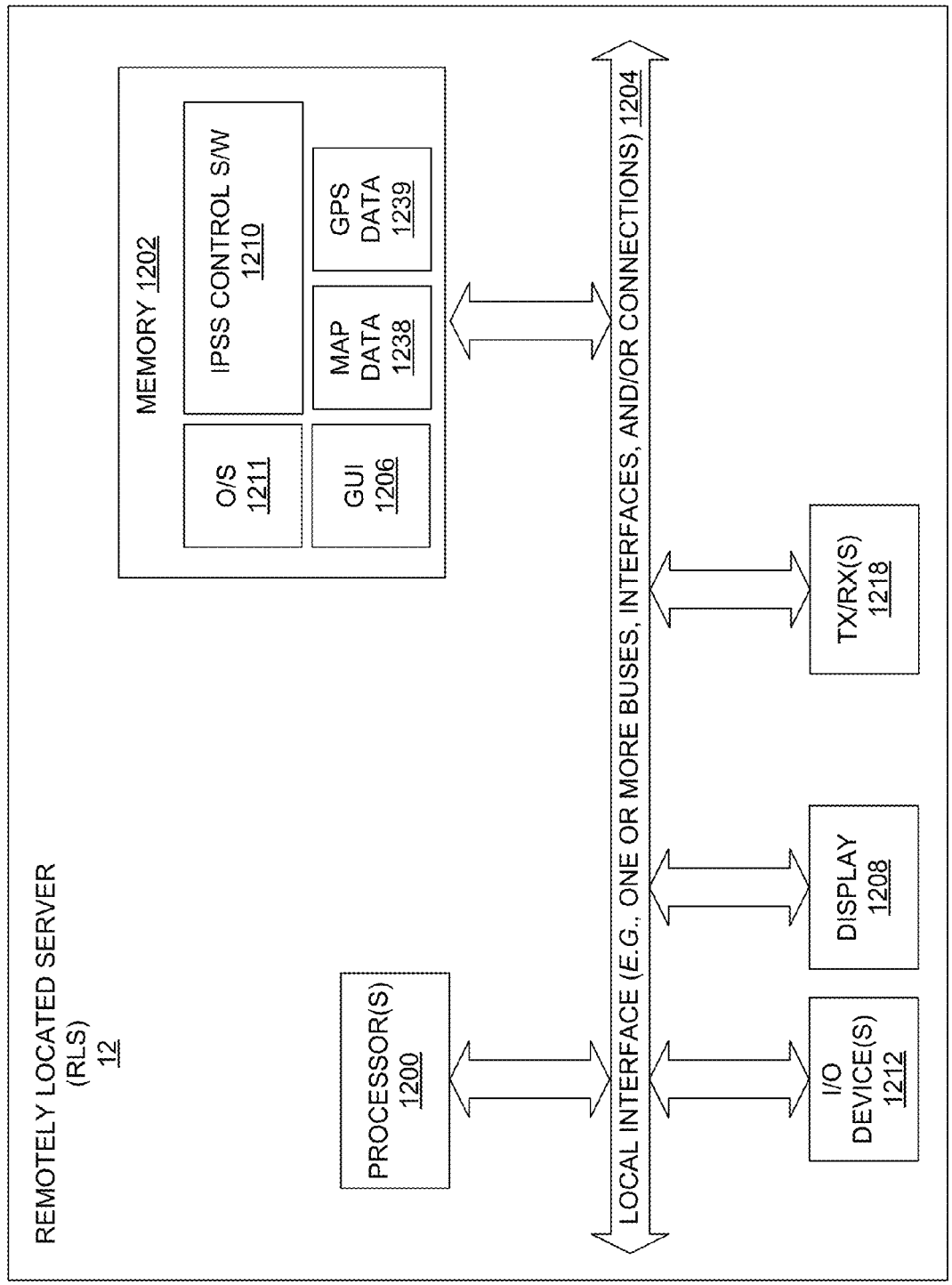
FIG. 25B is a diagram of an example architecture of the RLS.

FIG. 25B is a block diagram illustrating an example of an RLS 12 with a computer based architecture. In this embodiment, the IPSS system 10 is implemented in computer software (S/W) 1210 within the RLS 12.

With reference to FIG. 25B, the RLS 12 includes at least a processor(s) 1110, such as a microprocessor(s), a memory (ies) 1102, a transmitter(s) and/or a receiver(s) (TX/RX(s)) 1018. All of the foregoing are communicatively coupled via a local interface(s) 1104.

In terms of hardware, the memory 1202 comprises all volatile and non-volatile memory elements, including but not limited to, RAM, ROM, etc. In terms of software, the memory 1202 comprises at least the following software: an operating system (O/S) 1211 and the IPSS control software 1210. The computer program code (instructions) associated with the software in memory 1202 is executed by the processor 1100 in order to perform the methodologies of the present disclosure.

In terms of software, the memory 1202 includes the IPSS control software 1210 and an operating system (O/S) 1211. The memory 1202 may further include a graphical user interface (GUI) 1206 as well as map data 1238 and/or GPS data 1239 (or other location data) that may be utilized in connection with the methodologies described herein.

The IPSS control software 1210 (as well as the other computer software and software logic described in this document), which comprises an ordered listing of executable instructions for implementing logical functions, can be embodied in any non-transitory computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable medium" can be any means that can contain or store the program for use by or in connection with the instruction execution system, apparatus, or device. The non-transitory computer readable medium can be, for example but not limited to, an electronic, magnetic, optical, electromagnetic, infrared, or semiconductor system, apparatus, or device. More specific examples (a non-exhaustive list) of the non-transitory computer-readable medium would include the following: a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) or DVD (optical).

The RLS 12 may be equipped with a user input device(s), a user output device, or a combination thereof, denoted by I/O device(s) 1212. For example, the RLS 12 may be equipped with a keyboard (soft or hard), a display, etc.

VIII. IPSS Control Software (S/W)

Figure 26:
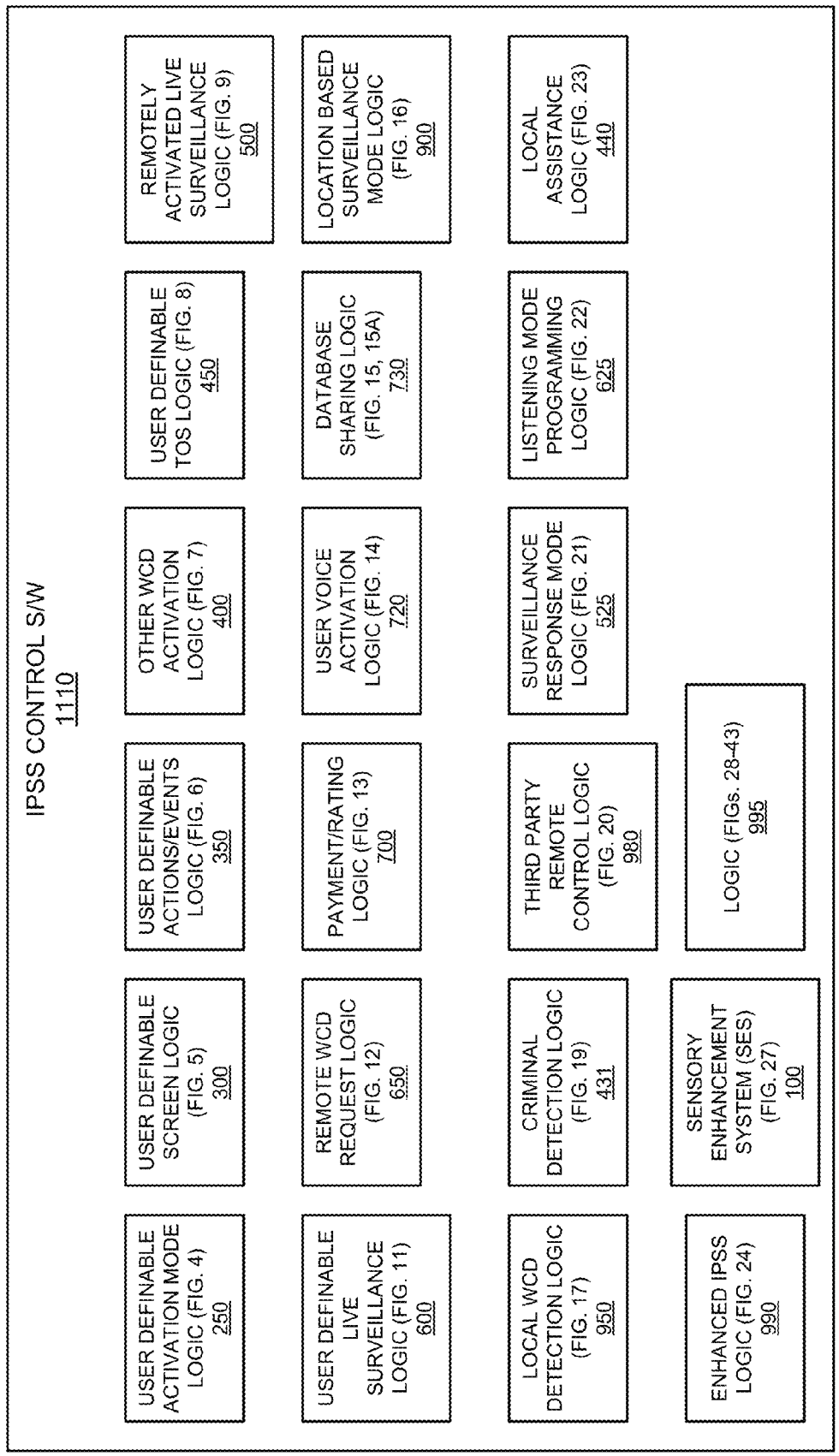
FIG. 26 is a diagram of the IPSS control software of the WCD of FIG. 25A.

FIG. 26 is a diagram of an example of possible software modules that can be implemented in the IPSS control software 1110 of the WCD 31 of FIG. 25A and/or the IPSS control software 1210 of the RLS 12 of FIG. 25B. As shown, the IPSS control software 1110 can include: user definable activation mode logic 250 (FIG. 4), user definable screen logic 300 (FIG. 5), user definable actions/events logic 350 (FIG. 6), other WCD activation logic 400 (FIG. 7), user definable TOS logic 450 (FIG. 8), remotely activated live surveillance logic 500 (FIG. 9), user definable live surveillance logic 600 (FIG. 11), remote WCD request logic 650 (FIG. 12), payment/rating logic 700 (FIG. 13), user voice activation logic 720 (FIG. 14), database sharing logic 730 (FIG. 15, 15A), location based surveillance logic 900 (FIG. 16), local WCD detection logic 950 (FIG. 17), criminal detection logic 431 (FIG. 19), third party remote control logic 980 (FIG. 20), surveillance response mode logic 525 (FIG. 21), listening mode programming logic 625 (FIG. 22), local assistance logic 440 (FIG. 23), enhanced IPSS logic 990 (FIG. 240, and/or sensory enhancement system (SES) logic 100.

The IPSS control software 1210 determines how to assist and manage information that it receives. The SSCP control software 1210 is also preferably configured so as to be capable of determining what each individual user wants or requires based on alarms, received surveillance information, or sensor inputs that are known by the control processes. For example, each system control process may have a unique action, for instance, a command signal initiating a simple on/off communication with a WCD speaker phone. It may turn on/off a system component comprising a camera, GPS, accelerometer, gyroscopes, or other devices when additional information may be utilized. The command signal may direct the WCD 31 to display an alarm or blank the user screen. Further, in instances where the system comprises a microphone, the command signal may direct the audio device to increase or decrease a volume level, and then broadcast audio data to third parties (friends, law enforcement, security staff, or the like). One skilled in the art will thus appreciate that the functionality of the IPSS control software 1210 may be appropriately adapted and configured in correspondence to the nature of the system components, the users level of protection, and the level of information that any communication device is capable of.

IX. Sensory Enhancement System (SES)

Figure 27:
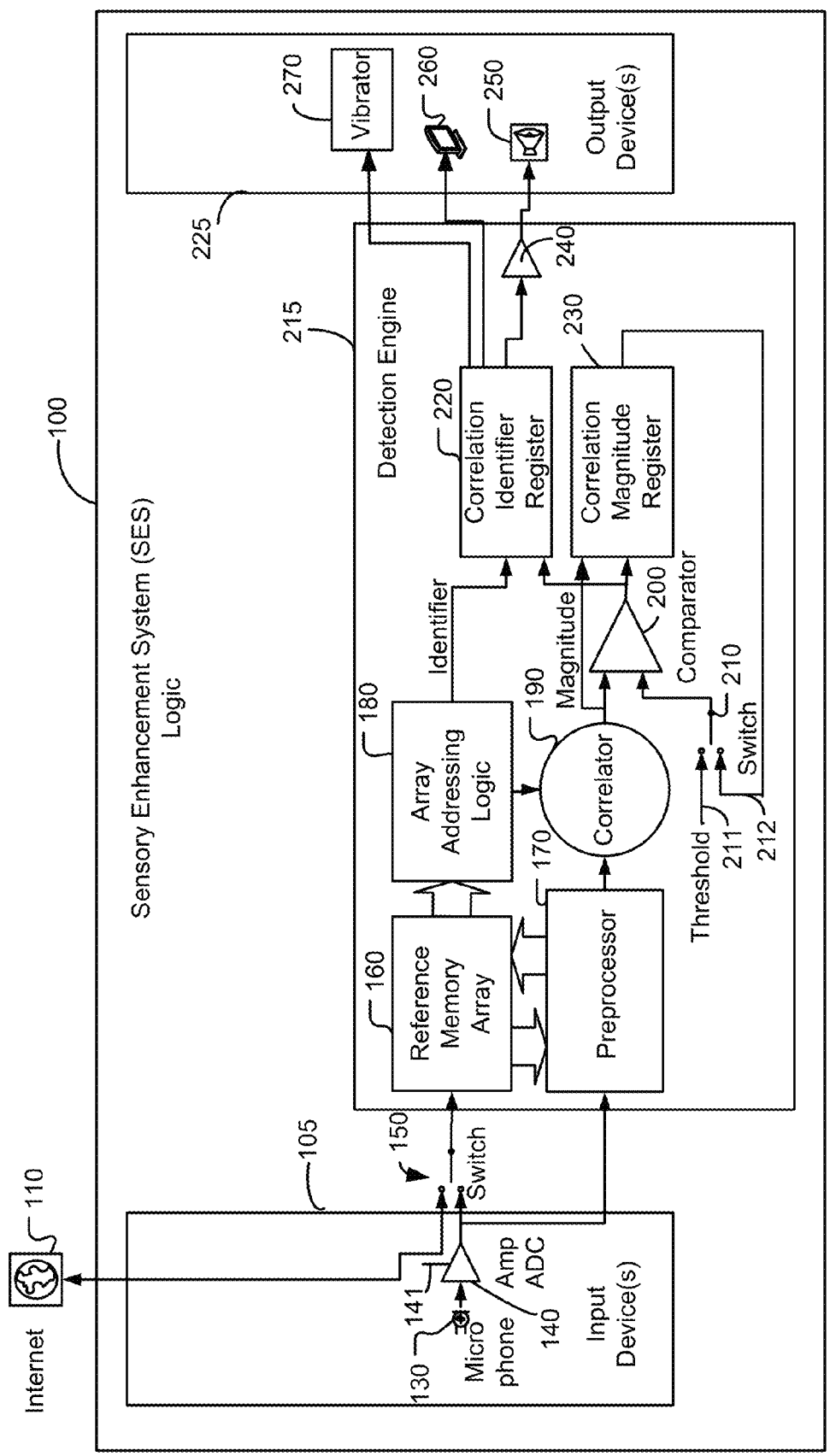
FIG. 27 is a diagram of a sensor enhancement system that can be employed in the WCD or the remote server to identify captured signals.

FIG. 27 is a diagram of a sensor enhancement system that can be employed in the WCD or the RLS 12 to identify captured signals. In these possible embodiments, the SES 100 uses a mathematical correlation process to identify the HBPA. As shown in FIG. 27, the SES 100 has a detection engine 215 (logic) designed to receive data from one or more sensors 130 of the WCD 31; correlate the movement data with a reference signature; and identify the HBPA based upon the correlation. In some embodiments, the SES 100 may be designed with logic for storing identification information relating to a plurality of HBPAs and with logic for enabling the user to select which of the HBPAs will be detected. Furthermore, the HBPA detection engine 215 may also be designed to also access and receive reference signatures from a remote computer via the TX/RX 1018 and the Internet 110.

The HBPA detection engine 215 stores the one or more HBPA reference signatures in memory 102 (FIG. 25) that are used to identify HBPAs, correlates sensed signal data with the reference signatures, and detects occurrences of the HBPAs. A non-limiting example of such a detection engine 215 is described in U.S. Pat. No. 7,872,574, which is incorporated herein by reference in its entirety. The discussion hereafter will describe incorporation of the latter detection engine 215 in the architecture of the present disclosure.

The HBPA event detection engine 215 is designed to be operated in several modes. The architecture and operation of the HBPA detection engine 215 will be apparent as each of these modes is described in detail hereafter.

A. First Mode

In a first mode, a remote computer is connected to a reference memory array 160 by a switch 150. One or more reference signatures, such as data indicative of the HBPA, are collected by the remote computer 316, transferred to the WCD 31, and loaded into the reference memory array 160. These reference signatures can be stored locally on the WCD 31 and used for future comparisons, or these can be requested in real time when a sensed signature is being analyzed to identify an HBPA.

A preprocessor 170 extracts the reference signature data from the reference memory array 160 and reformats the data to facilitate rapid correlation. The frequency domain is a preferred format, but time domain correlation or a combination thereof can also be employed. The preprocessor 170 analyzes each signature by a sequence of Fourier transforms taken repeatedly over a period of time corresponding to the duration of the signature. The Fourier transform is preferably a two-dimensional vector, but a single measure of amplitude versus frequency is sufficient. In the preferred embodiment, among many possible embodiments, the HBPA detection engine 215 processes a 3-dimensional array of amplitude, frequency, and time. The transformed signature arrays are stored back into a reference memory array 160 for subsequent rapid correlation. Preferably, each reference signature array includes an identifier field associated with the signature. As an example, for an HBPA of running, "running" may be the name and a picture/image of a running man may be associated with the signature.

B. Second Mode

In a second mode of operation, HBPA detection engine 215 can acquire the reference signature data directly from the local environment via a sensor(s) 130. The data sensed by the sensor 130 is selected by the user via the switch 150 and loaded directly into the reference memory array 160. Preferably, several seconds of signal are collected in this particular application. Then, the preprocessor 170 reformats the reference data for rapid correlation, preferably by Fourier transform.

C. Third Mode

In a third mode of operation, the HBPA detection engine 215 monitors the sensor data continuously (at discrete successive short time intervals due to the computer-based architecture) for data that matches those stored in the reference memory array 160. To reduce computational burden, the preprocessor 170 is designed to monitor the sensor 130 for a preset threshold level of signal data before beginning the correlation process. When the signal data exceeds the preset threshold level, the preprocessor 170 begins executing a Fourier transform. After several seconds or a period equal to the period of the reference signatures, the transformed active sensed data is stored at the output of the preprocessor 370. Then, array addressing logic 180 begins selecting one reference signature at a time for correlation. Each reference signature is correlated by a correlator 190 with the active sensed data to determine if the reference signature matches the active sensed data.

A comparator 200 compares the magnitude of the output of the correlator 190 with a threshold to determine a match. When searching for a match, the correlator 190 is compared with a fixed threshold. In this case, the switch 210 selects a fixed threshold 211 for comparison. If the correlation magnitude exceeds the fixed threshold 211, then the comparator 200 has detected a match. The comparator 200 then activates the correlation identifier register 220 and the correlation magnitude register 230. The magnitude of the comparison result is stored in the correlation magnitude register 230, and the identity of the HBPA is stored in the correlation identifier register 220. The fixed threshold 211 can be predefined by a programmer or the user of the WCD 31.

After HBPA detection by the HBPA detection engine 215, the process is stopped and the array addressing logic 180 is reset. A search for new active sensed data then resumes.

D. Fourth Mode

In a fourth mode of operation, the HBPA detection engine 215 searches for the best match for the sensed data. In this case, the correlation magnitude register 230 is first cleared. Then, the switch 210 selects the output 212 of the correlation magnitude register 230 as the threshold input to the comparator 200. The array addressing logic 180 then sequentially selects all stored references of a set for correlation. After each reference in the set is correlated, the comparator 200 compares the result with previous correlations stored in the correlation magnitude register 230. If the new correlation magnitude is higher, then the new correlation magnitude is loaded into the correlation magnitude register 230, and the respective identifier is loaded into the correlation identifier register 220.

In an alternative embodiment, the correlation process can be performed by an associative process, where the active reference is associated directly with the stored references in a parallel operation that is faster than the sequential operation. New device technologies may enable associative processing. For example, reference memory array 160 can utilize content addressable memory devices for associative processing. ASIC devices and devices, such as the Texas Instruments TNETX3151 Ethernet switch incorporate content addressable memory. U.S. Pat. No. 5,216,541, entitled "Optical Associative Identifier with Joint Transform Correlator," which is incorporated herein by reference, describes optical associative correlation that can be utilized.

This correlation process continues until all stored reference signatures in the set under analysis have been correlated. When the correlation process is complete, the correlation identifier register 220 holds the best match of the identity of the source of the active signal. An alarm can be generated via vibrator 270 and/or speaker 250, if desired. The identity of the HBPA can also be displayed as a photo or text description on a display 260 or as a verbal announcement via a speaker 250. If the final correlation magnitude is lower than a predetermined threshold, then the active signature can be loaded into the reference memory array 160 as a new unknown source.

X. Other Embodiments

A. Criminal Activity Determination

1. WCD

Figures 28, 29:
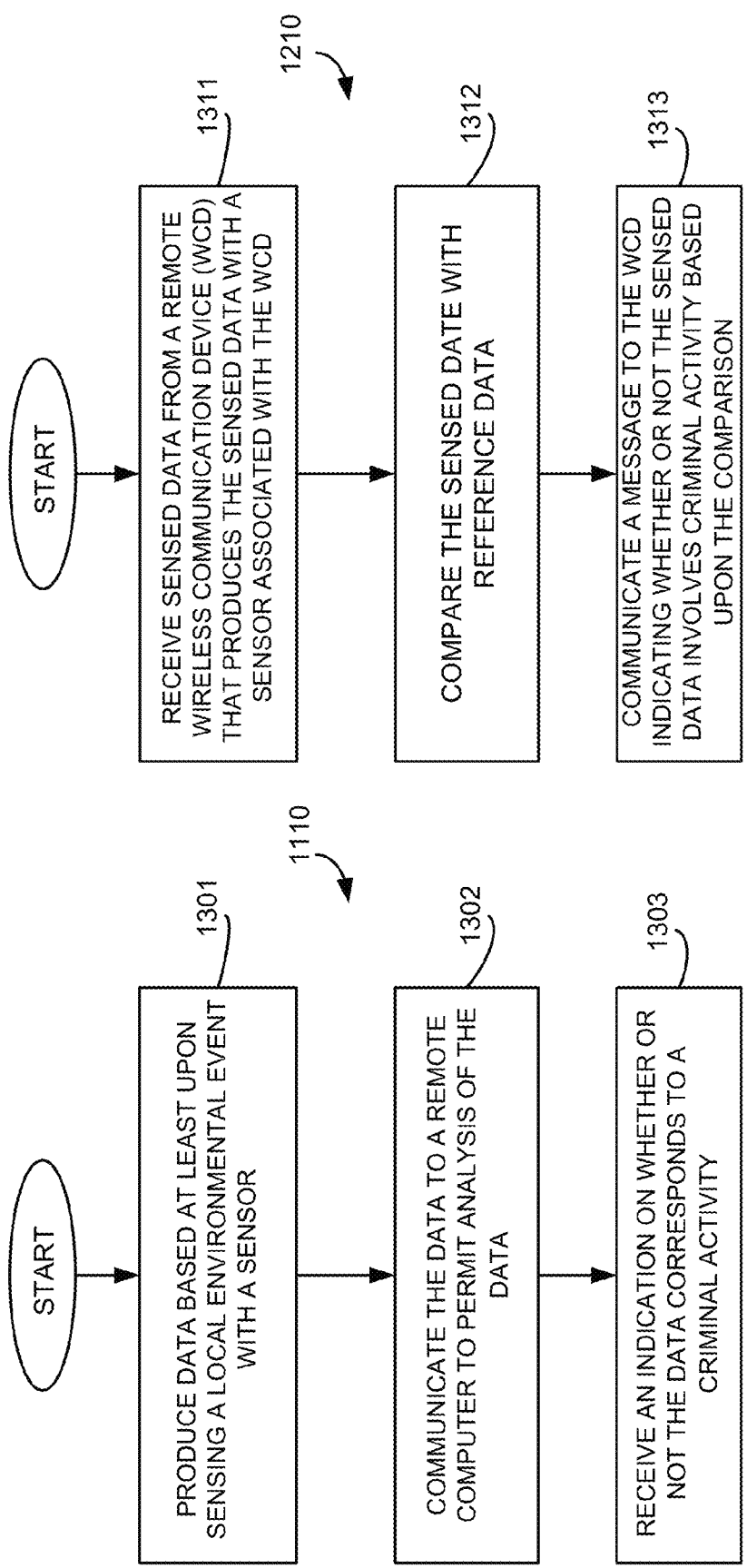
FIG. 28 is a flow chart of an embodiment of criminal activity determination logic that can be implemented by the IPSS control software of the WCD.
FIG. 29 is a flow chart of a first set of embodiments of criminal activity determination logic that can be implemented by the IPSS control software of the RLS.

FIG. 28 is a flowchart of an example of an embodiment of the IPSS control software 1110 (FIG. 25A) of the WCD 31. As shown in FIG. 28, the IPSS control software 1110 includes at least the following program code (or logic): program code 1301 designed to produce data based at least upon sensing a local environmental event with a sensor 130; program code 1302 designed to communicate the data to an RLS 12 to permit analysis of the data; and program code 1303 designed to receive an indication on whether or not the data corresponds to a criminal activity. The data can be an image, a video sample, and/or an audio sample.

In some embodiments, the program code 1301 is designed to determine an HBPA associated with the WCD user based at least in part upon sensor data that is indicative of movement. Then, the program code 1301 is designed to communicate activity identification information to the RLS 12 to permit analysis in connection with whether or not the data corresponds to criminal activity.

In some embodiments, the program code 1301 may be designed to receive a command from the RLS 12 to activate one or more sensors on the WCD 31 in order to produce the data.

In some embodiments, the WCD 31 may further comprise program code that initiates an alarm at the WCD 31 when the indication corresponds to criminal activity. As an example, a user preference can be set by the WCD user to initiate such an alarm. As another example, the WCD program code could be commanded to initiate an alarm by the RLS 12.

In some embodiments, a request to initiate an alarm to a device (e.g., another WCD 31, another WCD 31 in a motor vehicle, etc.) in close proximity of the WCD can be initiated. This can be accomplished by having the WCD 31 directly communicate wirelessly (e.g., WiFi, Bluetooth, RF, etc.) with such a device. This can also be accomplished by having the WCD 31 communicate a request to the RLS 12, which in turn, can communicate such an alarm initiation request to the device.

2. RLS a. First Set of Embodiments

FIG. 29 is a flowchart of an example of a first set of embodiments of the IPSS control software 1210 (FIG. 25B) of the RLS 12. As shown in FIG. 29, the IPSS control software 1210 includes at least the following program code (or logic):

program code 1311 designed to receive sensed data from a remote WCD 31 that produces the sensed data with a sensor associated with the WCD 31; program code 1312 designed to compare the sensed data with reference data; and program code 1313 designed to communicate a message to the WCD 31 indicating whether or not the sensed data involves criminal activity based upon the comparison. The sensed data can be an image, a video sample, and/or an audio sample.

In some of these embodiments, the RLS 12 receives activity information from the WCD 31 indicative of an HBPA associated with a WCD user. The RLS 12 can be equipped with program code that determines whether or not the sensed data involves criminal activity based at least in part upon the comparison performed by the program code 1312 as well as the HBPA information.

b. Second Set of Embodiments

FIG. 30 is a flowchart of an example of a second set of embodiments of the IPSS control software 1210 (FIG. 25B) of the RLS 12. As shown in FIG. 30, the IPSS control software 1210 includes at least the following program code (or logic): program code 1321 designed to maintain a database of files, the database including: (a) one or more of the following: audio files, video files, or image files; and (b) reference location information corresponding to individual ones of the files; program code 1322 designed to receive sensed information from a WCD, the sensed information including audio, video, or an image of a thing (e.g., a person, object, person's face, etc.) and sensed location information; program code 1323 designed to retrieve a file in the database based at least in part upon the reference location information and the sensed location information; and program code 1324 designed to communicate the retrieved file or derivative thereof to the WCD 31 or a computer system designated by a user of the WCD 31.

In some embodiments, the thing is a person's face and the RLS 12 is further designed with program code that determines that the face corresponds to a person having a criminal record or is wanted for a crime and changes from a current surveillance mode to a heightened surveillance mode based upon the determination.

In some embodiments, the database further includes reference time information corresponding to individual ones of the files. The RLS 12 is further designed with program code that associates time information with the sensed information and performs the retrieving at least in part upon the associated time information and the reference time information.

In some embodiments, a fee may be charged to the user for retrieving the file. This can be accomplished, for example, by prompting the user for bank account information or credit card information and charging the account. This can all be automated with program code associated with the RLS 12.

In some embodiments, the RLS 12 may be designed to receive uploads of files from various WCDs 31 and maintain the uploaded files in the database. A fee can be paid to parties that upload a file when the file is retrieved or when the file is uploaded, in order to encourage participation.

c. Third Set of Embodiments

FIG. 31 is a flowchart of an example of a second set of embodiments of the IPSS control software 1210 (FIG. 25B) of the RLS 12. As shown in FIG. 31, the IPSS control software 1210 includes at least the following program code (or logic): program code 1331 designed to maintain a database of files, the database including: (a) one or more of the following: audio files, video files, or image files; (b) reference location information corresponding to individual ones of the files; and (c) reference time information corresponding to the individual ones of the files; program code 1332 designed to receive sensed information from a WCD, the sensed information including audio, video, or an image of a thing and sensed location information; and program code 1333 designed to retrieve a file in the database based at least in part upon the reference location information, the reference time information, and the sensed location information.

B. Listening Mode

1. WCD

Figures 32, 33:
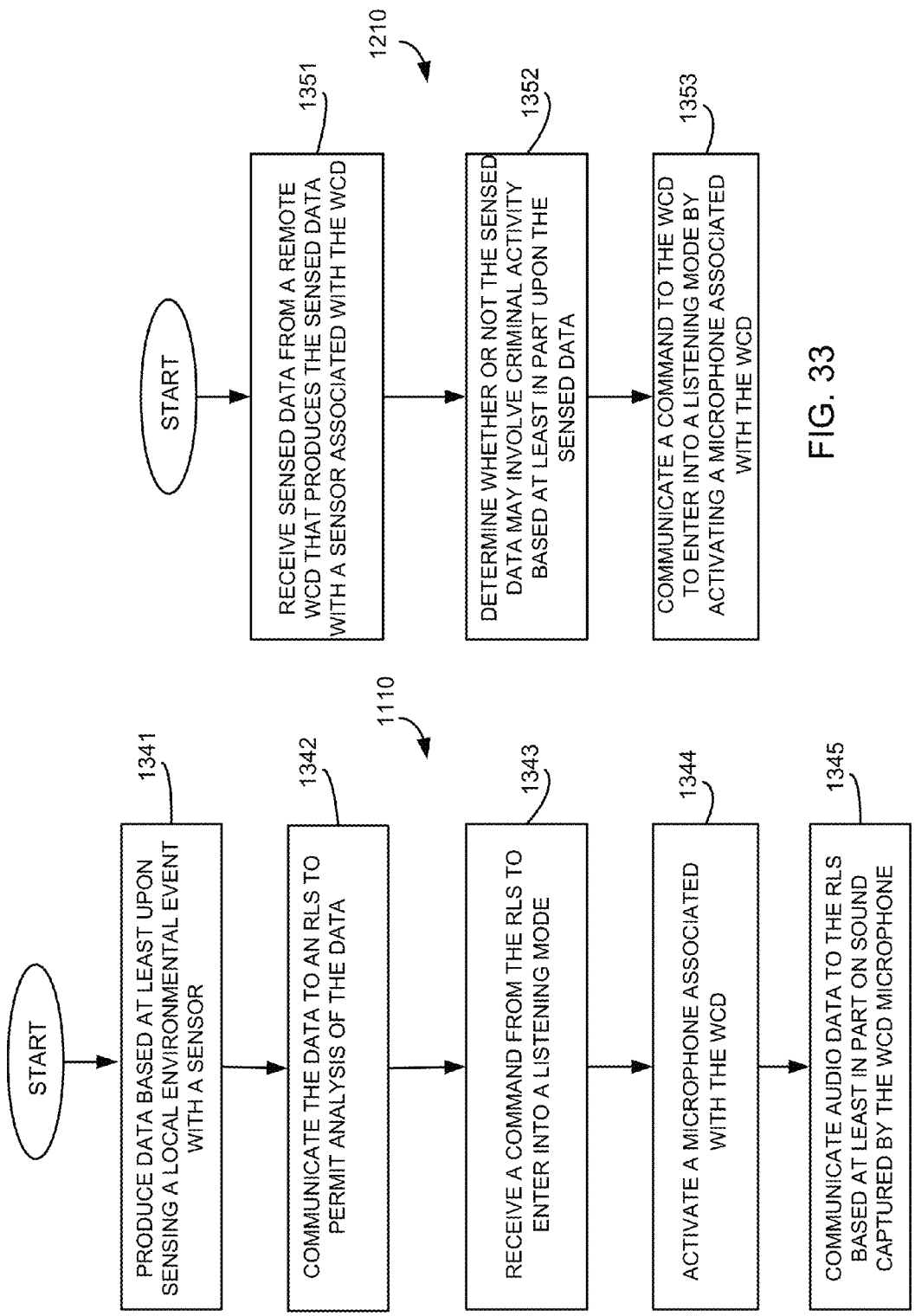
FIG. 32 is a flow chart of an embodiment of listening mode logic that can be implemented by the IPSS control software of the WCD.
FIG. 33 is a flow chart of an embodiment of listening mode logic that can be implemented by the IPSS control software of the RLS.

FIG. 32 is a flowchart of an example of an embodiment of the IPSS control software 1110 (FIG. 25A) of the WCD 31. As shown in FIG. 32, the IPSS control software 1110 includes at least the following program code (or logic): program code 1341 designed to produce data based at least upon sensing a local environmental event with a sensor; program code 1342 designed to communicate the data to an RLS 12 to permit analysis of the data; program code 1343 designed to receive a command from the RLS 12 to enter into a listening mode; program code 1344 designed to activate a microphone 130 associated with the WCD 31; and program code 1345 designed to communicate audio data to the RLS 12 based at least in part on sound captured by the WCD microphone 130.

2. RLS

FIG. 31 is a flowchart of an example of a second set of embodiments of the IPSS control software 1210 (FIG. 25B) of the RLS 12. As shown in FIG. 31, the IPSS control software 1210 includes at least the following program code (or logic): program code 1351 designed to receive sensed data from a remote WCD 31 that produces the sensed data with a sensor associated with the WCD 31; program code 1352 designed to determine whether or not the sensed data may involve criminal activity based at least in part upon the sensed data; and program code 1352 designed to communicate a command to the WCD 31 to enter into a listening mode by activating a microphone 130 associated with the WCD 31.

In some embodiments, the RLS 12 receives audio data from the WCD 31 and has program code that determines whether or not there is criminal activity based at least in part upon the audio data.

C. Alarm

1. WCD

FIG. 34 is a flowchart of an example of an embodiment of the IPSS control software 1110 (FIG. 25A) of the WCD 31. As shown in FIG. 34, the IPSS control software 1110 includes at least the following program code (or logic): program code 1361 designed to produce data based at least upon sensing a local environmental event with a sensor; program code 1362 designed to communicate the data to an RLS 12 to permit analysis of the data; and program code 1363 designed to receive a command to initiate an alarm that is indicative of criminal activity.

In some embodiments, a request to initiate an alarm to a device (e.g., another WCD 31, another WCD 31 in a motor vehicle, etc.) in close proximity of the WCD can be initiated. This can be accomplished by having the WCD 31 directly communicate wirelessly (e.g., WiFi, Bluetooth, RF, etc.) with such a device. This can also be accomplished by having the WCD 31 communicate a request to the RLS 12, which in turn, can communicate such an alarm initiation request to the device.

2. RLS

FIG. 35 is a flowchart of an example of an embodiment of the IPSS control software 1210 (FIG. 25B) of the RLS 12. As shown in FIG. 35, the IPSS control software 1210 includes at least the following program code (or logic): program code 1371 designed to receive sensed data from a remote WCD 31 that produces the sensed data with a sensor associated with the WCD 31; program code 1372 designed to determine whether or not the sensed data may involve criminal activity based at least in part upon the sensed data: and program code 1373 designed to, when the determining indicates criminal activity, communicate a command to the WCD 31 to initiate an alarm.

D. TOS/Risk Levels

1. WCD and/or RLS

FIG. 36 is a flowchart of an example of an embodiment of the IPSS control software 1110 (FIG. 25A) of the WCD 31 and/or the IPSS control software 1210 (FIG. 25B) of the RLS 12. As shown in FIG. 36, the IPSS control software 1110, 1210 includes at least the following program code (or logic): program code 1381 designed to select a type of surveillance (TOS) to be implemented in connection with the WCD 31 from a set of predetermined TOSs; program code 1382 designed to select a risk level from a set of predetermined risk levels; and program code 1383 designed to initiate a surveillance action based at least in part upon the risk level, the surveillance action involving activation of an input/output (I/O) device 1112 (FIG. 25A) associated with the WCD 31.

E. Switching Surveillance Modes

1. WCD a. First Set of Embodiments

Figures 36A, 36B:
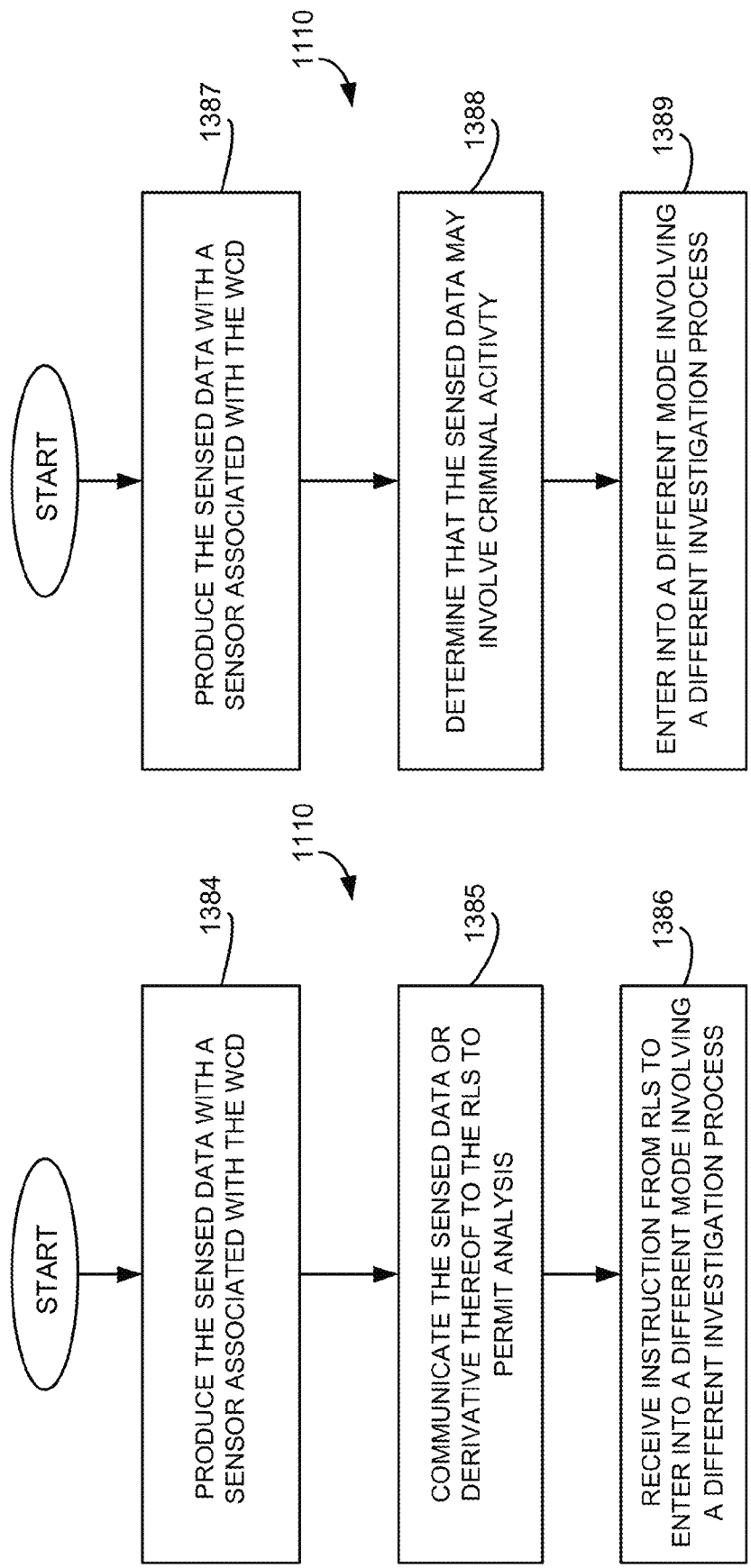
FIG. 36A is a flow chart of a first set of embodiments of switching surveillance mode logic that can be implemented by the IPSS control software of the WCD.
FIG. 36B is a flow chart of a second set of embodiments of switching surveillance mode logic that can be implemented by the IPSS control software of the WCD.

FIG. 36A is a flowchart of an example of a first set of embodiments of the IPSS control software 1110 (FIG. 25A) of the WCD 31. As shown in FIG. 36A, the IPSS control software 1110 includes at least the following program code (or logic): program code 1384 designed to produce data based at least upon sensing a local environmental event with a sensor 130; program code 1385 designed to communicate the data to an RLS 12 to permit analysis of the data; and program code 1386 designed to receive an instruction from the RLS 12 to enter into a different mode of operation that involves initiating a different investigation process with one or more sensors 130 associated with the WCD 31. The process can involve capturing more or other data with the sensors 130, drawing some preliminary conclusions from some of the data, activation or deactivation of one or more of the I/O devices 1112, a request that the WCD user take an action, etc.

b. Second Set of Embodiments

FIG. 36B is a flowchart of an example of a second set of embodiments of the IPSS control software 1110 (FIG. 25A) of the WCD 31. As shown in FIG. 36B, the IPSS control software 1110 includes at least the following program code (or logic): program code 1387 designed to produce data based at least upon sensing a local environmental event with a sensor 130; program code 1388 designed to determine that the sensed data may involve criminal activity; and program code 1389 designed to enter into a different mode of operation that involves initiating a different investigation process with one or more sensors 130 associated with the WCD 31. The process can involve capturing more or other data with the sensors 130, drawing some preliminary conclusions from some of the data, activation or deactivation of one or more of the I/O devices 1112, a request that the WCD user take an action, etc. The data can be communicated to an RLS 12 to permit analysis of the data and the IPSS Control software 1110 may receive an indication that the sensed data may involve the criminal activity from the RLS 12.

b. Third Set of Embodiments

Figure 36C:
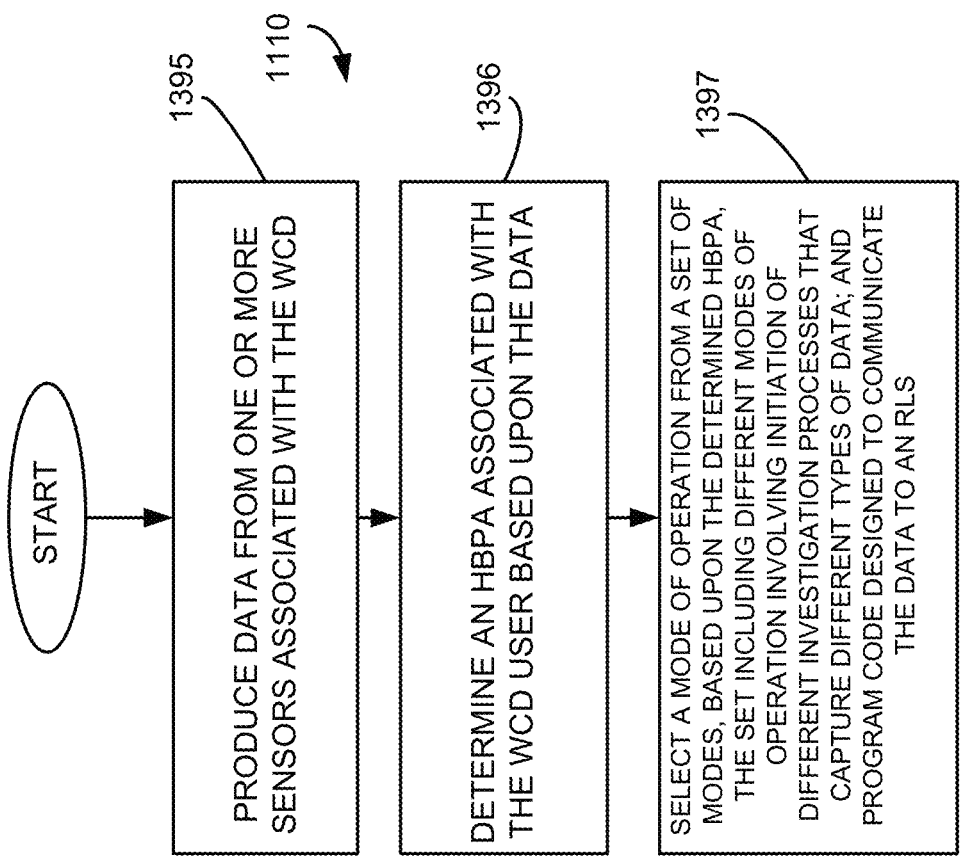
FIG. 36C is a flow chart of a third set of embodiments of switching surveillance mode logic that can be implemented by the IPSS control software of the WCD.

FIG. 36C is a flowchart of an example of a third set of embodiments of the IPSS control software 1110 (FIG. 25A) of the WCD 31. As shown in FIG. 36c, the IPSS control software 1110 includes at least the following program code (or logic): program code 1395 designed to produce data from one or more sensors associated with the WCD 31; program code 1396 designed to determine an HBPA associated with the WCD user based upon the data; program code 1397 designed to select a mode of operation from a set of modes, based upon the determined HBPA, the set including different modes of operation involving initiation of different investigation processes that capture different types of data; and program code 1398 designed to communicate the data to an RLS 12.

2. RLS a. First Set of Embodiments

FIG. 37 is a flowchart of an example of a first set of embodiments of the IPSS control software 1210 (FIG. 25B) of the RLS 12. As shown in FIG. 37, the IPSS control software 1210 includes at least the following program code (or logic): program code 1391 designed to receive sensed data from a remote WCD 31 that produces the sensed data with a sensor associated with the WCD 31; program code 1392 designed to determine that the sensed data may involve criminal activity based at least in part upon the sensed data: program code 1393 designed to communicate a message to the WCD 31 requesting entry of a code; and program code 1394 designed to determine whether or not to initiate a different surveillance mode based at least in part upon the code entry.

In some of these embodiments, the different surveillance mode involves at least one of the following: activation of an alarm, initiate a communication session with a user defined contact, initiate a communication session with an authority that can provide assistance, causing the WCD 31 to activate one or more other WCD sensors, causing the WCD 31 to implement a different investigation with the WCD sensors, etc.

b. Second Set of Embodiments

Figures 38, 39:
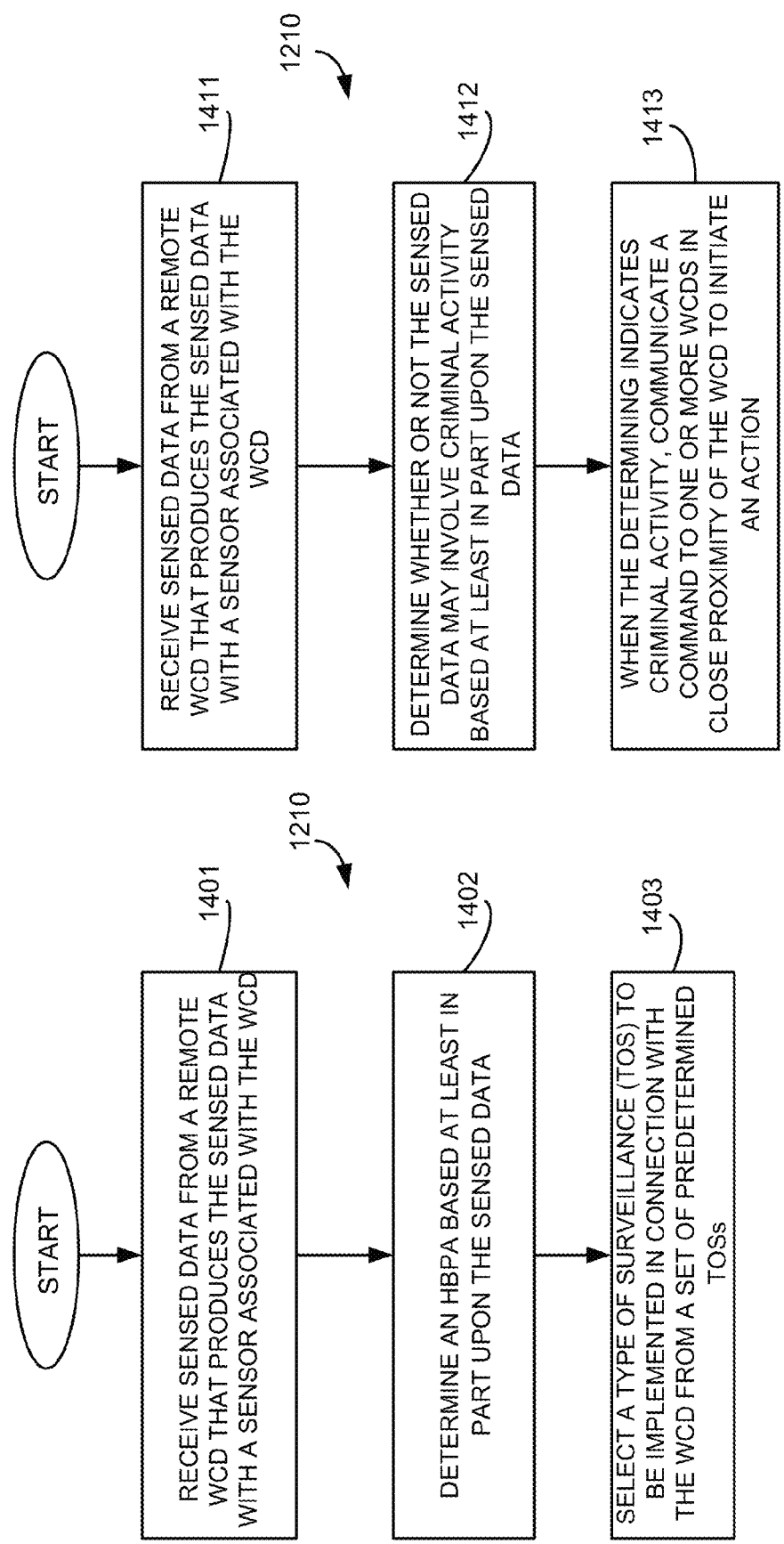
FIG. 38 is a flow chart of a second set of embodiments of switching surveillance mode logic that can be implemented by the IPSS control software of the RLS.
FIG. 39 is a flow chart of a first set of embodiments of cooperating WCD logic that can be implemented by the IPSS control software of the RLS.

FIG. 38 is a flowchart of an example of a second set of embodiments of the IPSS control software 1210 (FIG. 25B) of the RLS 12. As shown in FIG. 38, the IPSS control software 1210 includes at least the following program code (or logic): program code 1401 designed to receive sensed data from a remote WCD 31 that produces the sensed data with a sensor associated with the WCD 31; program code 1402 designed to determine an HBPA based at least in part upon the sensed data; and program code 1403 designed to select a type of surveillance (TOS) to be implemented in connection with the WCD 31 from a set of predetermined TOSs.

c. Third Set of Embodiments

FIG. 38A is a flowchart of an example of a third set of embodiments of the IPSS control software 1210 (FIG. 25B) of the RLS 12. As shown in FIG. 38A, the IPSS control software 1210 includes at least the following program code (or logic): program code 1404 designed to receive sensed data from a remote WCD 31 that produces the sensed data with a sensor 130 associated with the WCD 31; program code 1405 designed to determine that the sensed data may involve criminal activity based at least in part upon the sensed data; and program code 1406 designed to communicate a message to the WCD 31 requesting that the WCD 31 enter into a different mode of operation that involves initiating a different investigation process with one or more sensors 130 associated with the WCD. Data is collected by or based upon the one or more sensors 130 and communicated by the WCD 31 to the RLS 12. The IPSS control software 1210 analyzes this data and makes further decisions, for example, on whether or not to change the mode again, initiate a remedial action, etc.

d. Fourth Set of Embodiments

FIG. 38B is a flowchart of an example of a fourth set of embodiments of the IPSS control software 1210 (FIG. 25B) of the RLS 12. As shown in FIG. 38B, the IPSS control software 1210 includes at least the following program code (or logic): program code 1407 designed to receive sensed data from a remote WCD 31 that produces the sensed data with a sensor 130 associated with the WCD 31; program code 1408 designed to determine that the sensed data may involve criminal activity based at least in part upon the sensed data; and program code 1409 designed to enter into a different mode of operation that involves initiating a different investigation process with one or more sensors 130 associated with the WCD. Data is collected by or based upon the one or more sensors 130 and communicated by the WCD 31 to the RLS 12. The IPSS control software 1210 analyzes this data and makes further decisions, for example, on whether or not to change the mode again, initiate a remedial action, etc.

F. RLS with Cooperating WCDs
1. RLS
a. First Set of Embodiments

FIG. 39 is a flowchart of an example of a first set of embodiments of the IPSS control software 1210 (FIG. 25B) of the RLS 12. As shown in FIG. 39, the IPSS control software 1210 includes at least the following program code (or logic): program code 1411 designed to receive sensed data from a remote WCD 31 that produces the sensed data with a sensor associated with the WCD 31; program code 1412 designed to determine whether or not the sensed data may involve criminal activity based at least in part upon the sensed data: and program code 1413 designed to, when the determination indicates criminal activity, communicate a command to one or more WCDs 31 in close proximity of the WCD 31 to initiate an action.

In some of these embodiments, the action is to activate a device associated with the one or more WCDs. As nonlimiting examples, the action can be any one or more of the following: initiate an alarm, activate a microphone and record sound information, activate a camera and record video information, cause the WCD 31 in close proximity to communicate recorded sound and/or video information from it to the RLS 12.

In some of these embodiments, the RLS 12 may be further equipped with software that communicates requests to a plurality of WCDs 31 to cooperate, stores contact information associated with those WCDs 31 that will cooperate, and accesses the contact information when communicating the command to cooperate.

In some of these embodiments, the RLS 12 receives location information from the WCD 31. The RLS 12 is equipped with program code that communicates the WCD location information or derivative thereof to the one or more WCDs 31. The WCD location information can include a map.

b. Second Set of Embodiments

FIG. 40 is a flowchart of an example of a second set of embodiments of the IPSS control software 1210 (FIG. 25B) of the RLS 12. As shown in FIG. 40, the IPSS control software 1210 includes at least the following program code (or logic): program code 1421 designed to receive first sensed data and first location information from a first WCD 31, the first sensed data produced with a first sensor associated with the first WCD 31, the first location information produced with a first GPS receiver 1036 (FIG. 25A) associated with the first WCD 31; program code 1422 designed to receive second sensed data and second location information from a second WCD 31, the second sensed data produced with a second sensor associated with the second WCD 31, the second location information produced with a second GPS receiver 1036 (FIG. 25A) associated with the second WCD 31; program code 1423 designed to determine that the first WCD 31 and the second WCD 31 in close proximity based at least in part upon the first location information and the second location information; and program code 1424 designed to detect an event in an environment associated with the mobile vehicle based at least upon the first and second sensed data. In some situations, the first and second WCDs 31 are travelling together in the same mobile vehicle.

G. Request for User Input
1. RLS

FIG. 41 is a flowchart of an example of an embodiment of the IPSS control software 1210 (FIG. 25B) of the RLS 12. As shown in FIG. 41, the IPSS control software 1210 includes at least the following program code (or logic): program code 1431 designed to receive sensed data from a remote WCD 31 that produces the sensed data with a sensor associated with the WCD 31; program code 1432 designed to attempt to determine whether or not the sensed data may involve criminal activity based at least in part upon the sensed data; program code 1433 designed to communicate a request to a user of the WCD 31 to initiate an action; program code 1434 designed to determine that the sensed data involves criminal activity when the user action fails to initiate the user action; and program code 1435 designed to determine that the sensed data does not involve criminal activity when the user action is initiated. As nonlimiting examples, the action can be entry of a passcode by the user, speak a keyword or voice command into a microphone 130 associated with the WCD 31, etc.

In some of these embodiments, the program code 1434 is designed to determine whether or not the user initiates the action based upon whether or not the action occurs within a predetermined time period.

H. Assistance Entity Selection
1. RLS
a. First Set of Embodiments

FIG. 42 is a flowchart of an example of a first set of embodiments of the IPSS control software 1210 (FIG. 25B) of the RLS 12. As shown in FIG. 42, the IPSS control software 1210 includes at least the following program code (or logic): program code 1441 designed to receive sensed data from a remote WCD 31 that produces the sensed data with a sensor associated with the WCD 31; program code 1442 designed to determine whether or not a user of the WCD 31 needs assistance based at least in part upon the sensed data: and program code 1443 designed to, when assistance is needed, communicate a request for the assistance to an appropriate assistance providing entity.

In some of these embodiments, the RLS 12 receives location information from the WCD 31 and has program code that communicates the location information or a derivative thereof to the assistance providing entity.

In some of these embodiments, the assistance providing entity is selected by the program code 1443 based at least in part upon a close proximity of the entity to the user of the WCD 31.

In some of these embodiments, the RLS 12 receives location information from the WCD 31. The RLS 12 has software code that determines an HBPA and selects the assistance providing entity based at least in part upon the HPPA and the location information.

b. Second Set of Embodiments

FIG. 43 is a flowchart of an example of a second set of embodiments of the IPSS control software 1210 (FIG. 25B) of the RLS 12. As shown in FIG. 43, the IPSS control software 1210 includes at least the following program code (or logic): program code 1451 designed to receive sensed data and location information from a remote WCD 31 that produces the sensed data with a sensor associated with the WCD 31; program code 1452 designed to determine whether or not a user of the WCD 31 needs assistance based at least in part upon the sensed data: program code 1453 designed to determine an HBPA; and program code 1454 designed to select an assistance providing entity based at least in part upon the user activity and the location information. The HBPA is determined by the RLS 12 based at least in part upon information received from the WCD 31, such as an HBPA identified by the WCD 31, other user activity identification information received from the WCD 31, sensed data or a derivative thereof sensed by and received from the WCD 31, etc.

In some of these embodiments, the program code 1454 is designed to select the assistance providing entity based at least in part upon a close proximity of the entity to the user of the WCD 31.

XI. Variations And Modifications

It should be emphasized that the above-described embodiments of the present invention, particularly, any "preferred" embodiments, are merely possible nonlimiting examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention.

With respect to variations, note that although one or more elements/steps of one embodiment may not be described in connection with other embodiments, the elements/steps can typically be employed in the other embodiments.

At least the following is claimed:

1. A computer system designed to communicate with a remote wireless communication device (WCD), the computer system comprising:
   one or more memories that store computer program code; and
   one or more processors that execute the computer program code, the computer program code comprising:
      instructions to receive sensed data from the WCD that derives the sensed data with one or more sensors associated with the WCD;
      instructions to make a comparison of the sensed data with reference data;
      instructions to communicate a message to the WCD indicating whether or not the sensed data involves an activity relating to at least one of a user need for assistance, an accident, and a crime, based upon the comparison;
      instructions to, when the sensed data involves the activity, enable one or more additional sensors associated with the WCD; and
      instructions to receive additional sensed data from the WCD that derives the additional sensed data from the one or more additional sensors.

2. The system of claim 1, wherein the sensed data is at least one of an image, a video sample, and an audio sample.

3. The system of claim 1, wherein the computer program code further comprises:
   instructions to receive human body physical activity (HBPA) information from the WCD indicative of an HBPA associated with a user of the WCD; and
   instructions to determine whether or not the sensed data involves the activity based at least in part upon the comparison as well as the HBPA information.

4. The system of claim 1, wherein the sensed data includes (a) at least one of an audio, a video, and an image of a thing and (b) a sensed location information and wherein the computer program code further comprises:
   a database includes (a) a plurality of files comprising at least one of audio files, video files, and image files; and
   (b) a reference location information corresponding to individual ones of the plurality of files;
   instructions to retrieve one of the plurality of files in the database based at least in part upon the reference location information and the sensed location information; and
   instructions to communicate the retrieved one of the plurality of files or derivative thereof to the WCD or a computer system designated by a user of the WCD.

5. The system of claim 1, wherein the sensed data includes (a) at least one of an audio, a video, and an image of a thing, (b) a sensed location information, and (c) a sensed time information, and wherein the computer program code further comprises:
   a database including (a) a plurality of files comprising at least one of audio files, video files, and image files; (b) a reference location information corresponding to individual ones of the plurality of files; and (c) a reference time information corresponding to the individual ones of the plurality of files; and
   instructions to retrieve one of the plurality of files in the database based at least in part upon the reference location information, the reference time information, the sensed location information, and the sensed time information.

6. The system of claim 1, wherein the computer program code further comprises instructions to communicate a command to the WCD to enter into a listening mode that causes the WCD to activate at least one of a microphone and a camera associated with the WCD to capture at least one of audio, video, and image information.

7. The system of claim 1, wherein the computer program code further comprises:
   instructions to select a risk level from a set of predetermined risk levels based at least in part upon the sensed data; and
   instructions to initiate a surveillance action based at least in part upon the risk level, the surveillance action involving activation of an input/output (I/O) device associated with the WCD.

8. The system of claim 1, wherein the computer program code further comprises:
   instructions to communicate a message to the WCD requesting entry of a code; and
   instructions to determine whether or not to initiate a surveillance action based at least in part upon the code entry.

9. The system of claim 1, wherein the computer program code further comprises:
   instructions to, when the sensed data involves the activity, communicate a command to at least one additional WCD in close proximity of the WCD to initiate an action.

10. The system of claim 1, wherein the computer program code further comprises:
    instructions to communicate a request to a user of the WCD to initiate a user action;
    instructions to determine that the sensed data involves the activity when initiation of the user action fails; and
    instructions to determine that the sensed data does not involve the activity when the user action is initiated.

11. A method for implementation in a computer system designed to communicate with a remote wireless communication device (WCD), the method comprising:
    receiving sensed data from the WCD that is derived from one or more sensors associated with the WCD;

making a comparison of the sensed data with reference data;

communicating a message to the WCD indicating whether or not the sensed data involves an activity relating to at least one of a user need for assistance, an accident, and a crime, based at least in part upon the comparison;

enabling, when the sensed data involves the activity, one or more additional sensors associated with the WCD; and receiving additional sensed data from the WCD that is derived from the one or more additional sensors associated with the WCD.

12. The method of claim 11, wherein the sensed data is at least one of an image, a video sample, and an audio sample.

13. The method of claim 11, further comprising:
receiving human body physical activity (HBPA) information from the WCD indicative of an HBPA associated with a user of the WCD; and
determining whether or not the sensed data involves the activity based at least in part upon the comparison as well as the HBPA information.

14. The method of claim 11, (1) wherein the sensed data includes at least one of (a) an audio, a video, and an image of a thing and (b) a sensed location information, (2) wherein the computer system further comprises a database that includes (a) a plurality of files comprising at least one of audio files, video files, and image files; and (b) a reference location information corresponding to individual ones of the plurality of files, and (3) further comprising:
retrieving one of the plurality of files in the database based at least in part upon the reference location information and the sensed location information; and
communicating the retrieved one of the plurality of files or derivative thereof to the WCD or to another computer system designated by a user of the WCD.

15. The method of claim 11, (1) wherein the sensed data includes (a) at least one of audio, video, and an image of a thing, (b) a sensed location information, and (c) a sensed time information, (2) wherein the computer system further comprises a database that includes (a) a plurality of files comprising at least one of audio files, video files, and image files; (b) a reference location information corresponding to individual ones of the plurality of files; and (c) a reference time information corresponding to the individual ones of the plurality of files; and (3) further comprising:
retrieving one of the plurality of files in the database based at least in part upon the reference location information, the reference time information, the sensed location information, and the sensed time information.

16. The method of claim 11, further comprising communicating a command to the WCD to enter into a listening mode that causes the WCD to activate at least one of a microphone and camera associated with the WCD to capture at least one of an audio, a video, and an image information.

17. The method of claim 11, further comprising:
selecting a risk level from a set of predetermined risk levels based at least in part upon the sensed data; and
initiating a surveillance action based at least in part upon the risk level, the surveillance action involving activation of an input/output (I/O) device associated with the WCD.

18. The method of claim 11, further comprising:
communicating a message to the WCD requesting entry of a code; and
determining whether or not to initiate a surveillance action based at least in part upon the code.

19. The method of claim 11, further comprising:
when the sensed data involves the activity, communicating a command to at least one additional WCD in close proximity of the WCD to initiate an action.

20. The method of claim 11, further comprising:
communicating a request to a user of the WCD to initiate a user action;
determining that the sensed data involves the activity when initiating the user action fails; and
determining that the sensed data does not involve the activity when the user action is initiated.

21. A computer system designed to communicate with a remote wireless communication device (WCD), the computer system comprising:
means for receiving sensed data from the WCD that is derived from one or more sensors associated with the WCD;
means for making a comparison the sensed data with reference data;
means for communicating a message to the WCD indicating whether or not the sensed data involves an activity relating to at least one of a user need for assistance, an accident, and a crime, based at least in part upon the comparison;
means for enabling, when the sensed data involves the activity, one or more additional sensors associated with the WCD; and
means for receiving additional sensed data from the WCD that is derived from the one or more additional sensors associated with the WCD.

* * * * *